United States Patent
Breed et al.

(10) Patent No.: US 6,768,944 B2
(45) Date of Patent: *Jul. 27, 2004

(54) METHOD AND SYSTEM FOR CONTROLLING A VEHICLE

(75) Inventors: David S. Breed, Boonton Township, Morris County, NJ (US); Wendell C. Johnson, Signal Hill, CA (US); Wilbur E. DuVall, Kimberling City, MO (US)

(73) Assignee: Intelligent Technologies International, Inc., Denville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/216,633

(22) Filed: Aug. 9, 2002

(65) Prior Publication Data

US 2003/0191568 A1 Oct. 9, 2003

Related U.S. Application Data

(63) Continuation-in-part of application No. 10/118,858, filed on Apr. 9, 2002.

(51) Int. Cl.[7] .......................... G01C 23/00; G06F 19/00
(52) U.S. Cl. ...................................... 701/301; 213/36
(58) Field of Search .................... 701/301, 208, 701/211, 36, 213, 216, 220; 342/357.06, 357.09, 357.14; 348/118

(56) References Cited

U.S. PATENT DOCUMENTS

| | | | | | |
|---|---|---|---|---|---|
| 3,702,477 | A | * | 11/1972 | Brown | 342/451 |
| 5,177,685 | A | | 1/1993 | Davis et al. | 364/443 |
| 5,332,180 | A | * | 7/1994 | Peterson et al. | 246/3 |
| 5,381,338 | A | | 1/1995 | Wysocki et al. | 364/449 |
| 5,504,482 | A | | 4/1996 | Schreder | 340/995 |
| 5,570,087 | A | | 10/1996 | Lemelson | 340/870.05 |
| 5,617,317 | A | * | 4/1997 | Ignagni | 701/215 |
| 5,760,737 | A | * | 6/1998 | Brenner | 342/357.02 |
| 5,841,367 | A | | 11/1998 | Giovanni | 340/903 |
| 5,890,083 | A | * | 3/1999 | Franke et al. | 701/45 |
| 5,926,117 | A | | 7/1999 | Gunji et al. | 340/988 |
| 5,983,161 | A | | 11/1999 | Lemelson et al. | 701/301 |
| 6,014,608 | A | | 1/2000 | Seo | 701/207 |
| 6,311,129 | B1 | * | 10/2001 | Lin | 701/214 |
| 6,370,475 | B1 | | 4/2002 | Breed et al. | 701/301 |
| 6,405,132 | B1 | | 6/2002 | Breed et al. | 701/301 |
| 6,453,238 | B1 | * | 9/2002 | Brodie et al. | 701/216 |
| 6,459,990 | B1 | * | 10/2002 | McCall et al. | 701/220 |
| 6,516,273 | B1 | * | 2/2003 | Pierowicz et al. | 701/301 |
| 6,560,535 | B2 | * | 5/2003 | Hohman et al. | 701/213 |
| 2003/0025597 | A1 | * | 2/2003 | Schofield | 340/435 |
| 2003/0112132 | A1 | * | 6/2003 | Trajkovic et al. | 340/435 |

FOREIGN PATENT DOCUMENTS

WO   0150088   7/2001

OTHER PUBLICATIONS

SRI International, Centimeter–Level GPS for Highway Systems, J.W. Sinko et al., Jul., 1998.

(List continued on next page.)

Primary Examiner—Michael J. Zanelli
(74) Attorney, Agent, or Firm—Brian Roffe

(57) ABSTRACT

Control system and method for controlling a vehicle or a component of a vehicle in which an inertial reference unit includes accelerometers and gyroscopes which provide data on vehicle motion and a processor processes the data and controls the vehicle or the component of the vehicle based thereon. Movement of the vehicle may be controlled via control over servos, such as a servo associated with the braking system, a servo associated with the drive train or throttle and a servo associated with the steering system. A display to the driver can also be controlled by the processor to provide data on vehicle motion or data or information derived from the data on vehicle motion. Optionally, a Kalman filter is coupled to the processor for optimizing the data on vehicle motion from the inertial reference unit.

37 Claims, 20 Drawing Sheets

OTHER PUBLICATIONS

SRI International, An Evolutionary Automated Highway System Concept Based on GPS, J.W. Sinko, Sep., 1996 (p. 5, second column to p. 7).

SRI International, Using GPS for Automated Vehicle Convoying, T.M. Nguyen, Sep. 1998.

V. Morellas et al., Preview Based Control of a Tractor Trailer Using DGPS for Preventing Road Departure Accidents, 1998 IEEE International Conference on Intelligent Vehicles, pp. 797–805.

S. Bajikar et al., Evaluation of In–Vehicle GPS–Based Lane Position Sensing for Preventing Road Departure, 1998 IEEE International Conference on Intelligent Vehicle, pp. 397–402.

B. Schiller et al., Collision Avoidance for Highway Vehicles Using the Virtual Bumper Controller, 1998 IEEE International Conference on Intelligent Vehicles, pp. 149–155.

M. O'Shea and V. Shuman, Looking Ahead: Map Database in Predictive Positioning and Safety Systems, no Date.

J. Pierowicz, Use of Map Data Information in an On–Board Intersection Violation Detection System, 1998 IEEE.

Goran M. Djuknic and Robert E. Richton, Geolocation and Assisted GPS, Feb. 2001.

H. Weinberg, MEMS Sensors Are Driving the Automotive Industry, Sensors, Feb. 2002.

R. Grace, The Growing Presence of MEMS and MST in Automotive Applications, Sensors, Sep. 1999.

D. Singh et al., Autonomous Vehicle Using WADGPS, Proceedings of Intelligent Vehicles '95 Symposium, Sep. 25–26, 1995, pp. 370–375.

\* cited by examiner

Data acquisition module

METHOD AND SYSTEM FOR CONTROLLING A VEHICLE

CROSS REFERENCE TO RELATED APPLICATIONS

This application is a continuation in part of U.S. patent application Ser. No. 10/118,858 filed Apr. 9, 2002.

This application is related to, on the grounds that it includes common subject matter, U.S. patent application Ser. No. 09/177,041 filed Oct. 22, 1998, now U.S. Pat. No. 6,370,475, U.S. patent application Ser. No. 09/679,317 filed Oct. 4, 2000, now U.S. Pat. No. 6,405,132, and U.S. patent application Ser. No. 09/909,466 filed Jul. 19, 2001. Both of these patents are incorporated by reference herein.

1. BACKGROUND OF THE INVENTION

1.1 Field of the Invention

This invention is in the fields of automobile safety, intelligent highway safety systems, accident avoidance, accident elimination, collision avoidance, blind spot detection, anticipatory sensing, automatic vehicle control, intelligent cruise control, vehicle navigation, vehicle to vehicle communication, vehicle to non-vehicle communication and non-vehicle to vehicle communication and other automobile, truck and train safety, navigation, communication and control related fields.

The invention relates generally to methods for vehicle-to-vehicle communication and communication between a vehicle and non-vehicles and more particularly to apparatus and methods using coded spread spectrum, ultrawideband, noise radar or similar technologies. The coding scheme can use may be implemented using multiple access communication methods analogous to frequency division multiple access (FDMA), timed division multiple access (TDMA), or code division multiple access (CDMA) in a manner to permit simultaneous communication with and between a multiplicity of vehicles but without the use of a carrier frequency.

The invention also relates generally to an apparatus and method for precisely determining the location and orientation of a host vehicle operating on a roadway and location of multiple moving or fixed obstacles that represent potential collision hazards with the host vehicle to thereby eliminate collisions with such hazards. In the early stages of implementation of the apparatus and method and when collisions with such hazards cannot be eliminated, the apparatus and method will generate warning signals and possibly initiate avoidance maneuvers to minimize the probability of a collision and the consequences thereof. More particularly, the invention relates to the use of a Global Positioning System ("GPS"), differential GPS ("DGPS"), other infrastructure-based location aids, cameras, radar and laser radar and an inertial navigation system as the primary host vehicle and target locating system with centimeter level accuracy. The invention is further supplemented by a digital computer system to detect, recognize and track all relevant potential obstacles, including other vehicles, pedestrians, animals, and other objects on or near the roadway. More particularly, the invention further relates to the use of centimeter-accurate maps for determining the location of the host vehicle and obstacles on or adjacent the roadway. Even more particularly, the invention further relates to an inter-vehicle and vehicle to infrastructure communication systems for transmitting GPS and DGPS position data, as well as, relevant target data to other vehicles for information and control action. The present invention still further relates to the use of neural networks and neural-fuzzy rule sets for recognizing and categorizing obstacles and generating and developing optimal avoidance maneuvers where necessary.

Automobile accidents are one of the most serious problems facing society today, both in terms of deaths and injuries, and in financial losses suffered as a result of accidents. The suffering caused by death or injury from such accidents is immense. The costs related to medical treatment, permanent injury to accident victims and the resulting loss of employment opportunities, and financial losses resulting from damage to property involved in such accidents are staggering. Providing the improved systems and methods to eventually eliminate these deaths, injuries and other losses deserves the highest priority. The increase in population and use of automobiles worldwide with the concomitant increased congestion on roadways makes development of systems for collision elimination even more urgent. While many advances have been made in vehicle safety, including, for example, the use of seatbelts, airbags and safer automobile structures, much room for improvement exists in automotive safety and accident prevention systems.

There are two major efforts underway that will significantly affect the design of automobiles and highways. The first is involved with preventing deaths and serious injuries from automobile accidents. The second involves the attempt to reduce the congestion on highways. In the first case, there are approximately forty two thousand (42,000) people killed each year in the United States by automobile accidents and another several hundred thousand are seriously injured. In the second case, hundreds of millions of man-hours are wasted every year by people stuck in traffic jams on the world's roadways. There have been many attempts to solve both of these problems; however, no single solution has been able to do so.

When a person begins a trip using an automobile, he or she first enters the vehicle and begins to drive, first out of the parking space and then typically onto a local or city road and then onto a highway. In leaving the parking space, he or she may be at risk from an impact of a vehicle traveling on the road. The driver must check his or her mirrors to avoid such an event and several electronic sensing systems have been proposed which would warn the driver that a collision is possible. Once on the local road, the driver is at risk of being impacted from the front, side and rear, and electronic sensors are under development to warn the driver of such possibilities. Similarly, the driver may run into a pedestrian, bicyclist, deer or other movable object and various sensors are under development that will warn the driver of these potential events. These various sensors include radar, optical, infrared, ultrasonic, and a variety of other sensors, each of which attempts to solve a particular potential collision event. It is important to note that as yet, in none of these cases is there sufficient confidence in the decision that the control of the vehicle is taken away from the driver. Thus, action by the driver is still invariably required.

In some proposed future Intelligent Transportation System (ITS) designs, hardware of various types is embedded into the highway and sensors which sense this hardware are placed onto the vehicle so that it can be accurately guided along a lane of the highway. In various other systems, cameras are used to track lane markings or other visual images to keep the vehicle in its lane. However, for successful ITS, additional information is needed by the driver, or the vehicle control system, to take into account weather, road conditions, congestion etc., which typically involves additional electronic hardware located on or associated with the highway as well as the vehicle. From this discussion, it is obvious that a significant number of new electronic systems are planned for installation onto automobiles. However, to date, no product has been proposed or designed which combines all of the requirements into a single electronic system. This is one of the intents of some embodiments of this invention.

The safe operation of a vehicle can be viewed as a process in the engineering sense. To achieve safe operation, first the process must be designed and then a vehicle control system must be designed to implement the process. The goal of a process designer is to design the process so that it does not fail. The fact that so many people are being seriously injured and killed in traffic accidents and the fact that so much time is being wasted in traffic congestion is proof that the current process is not working and requires a major redesign. To design this new process, the information required by the process must be identified, the source of that information determined and the process designed so that the sources of information can communicate effectively with the user of the information, which will most often be a vehicle control system. Finally, the process must have feedback that self-corrects the process when it is tending toward failure.

Although it is technologically feasible, it is probably socially unacceptable at this time for a vehicle safety system to totally control the vehicle. An underlying premise of embodiments of this invention, therefore, is that people will continue to operate their vehicle and control of the vehicle will only be seized by the control system when such an action is required to avoid an accident or when such control is needed for the orderly movement of vehicles through potentially congested areas on a roadway. When this happens, the vehicle operator will be notified and given the choice of exiting the road at the next opportunity. In some implementations, especially when this invention is first implemented on a trail basis, control will not be taken away from the vehicle operator but a warning system will alert the driver of a potential collision, road departure or other infraction.

Let us consider several scenarios and what information is required for the vehicle control process to prevent accidents. In one case, a driver is proceeding down a country road and falls asleep and the vehicle begins to leave the road, perhaps heading toward a tree. In this case, the control system would need to know that the vehicle was about to leave the road and for that, it must know the position of the vehicle relative to the road. One method of accomplishing this would be to place a wire down the center of the road and to place sensors within the vehicle to sense the position of the wire relative to the vehicle, or vice versa. An alternate approach would be for the vehicle to know exactly where it is on the surface of the earth and to also know exactly where the edge of the road is.

These approaches are fundamentally different because in the former solution every road in the world would require the placement of appropriate hardware as well as the maintenance of this hardware. This is obviously impractical. In the second case, the use of the global positioning satellite system (GPS), augmented by additional systems to be described below, will provide the vehicle control system with an accurate knowledge of its location. While it would be difficult to install and maintain hardware such as a wire down the center of the road for every road in the world, it is not difficult to survey every road and record the location of the edges, and the lanes for that matter, of each road. This information must then be made available through one or more of a variety of techniques to the vehicle control system.

Another case might be where a driver is proceeding down a road and decides to change lines while another vehicle is in the driver's blind spot. Various companies are developing radar, ultrasonic or optical sensors to warn the driver if the blind spot is occupied. The driver may or may not heed this warning, perhaps due to an excessive false alarm rate, or he or she may have become incapacitated, or the system may fail to detect a vehicle in the blind spot and thus the system will fail.

Consider an alternative technology where again each vehicle knows precisely where it is located on the earth surface and additionally can communicate this information to all other vehicles within a certain potential danger zone relative to the vehicle. Now, when the driver begins to change lanes, his or her vehicle control system knows that there is another vehicle in the blind spot and therefore will either warn the driver or else prevent him or her from changing lanes thereby avoiding the accident.

Similarly, if a vehicle is approaching a stop sign, other traffic marker or red traffic light and the operator fails to bring the vehicle to a stop, if the existence of this traffic light and its state (red in this example) or stop sign has been made available to the vehicle control system, the system can warn the driver or seize control of the vehicle to stop the vehicle and prevent a potential accident. Additionally, if an operator of the vehicle decides to proceed across an intersection without seeing an oncoming vehicle, the control system will once again know the existence and location and perhaps velocity of the oncoming vehicle and warn or prevent the operator from proceeding across the intersection.

Consider another example where water on the surface of a road is beginning to freeze. Probably the best way that a vehicle control system can know that the road is about to become slippery, and therefore that the maximum vehicle speed must be significantly reduced, is to get information from some external source. This source can be sensors located on the highway that are capable of determining this condition and transmitting it to the vehicle. Alternately, the probability of icing occurring can be determined analytically from meteorological data and a historical knowledge of the roadway and communicated to the vehicle over a LEO satellite system, the Internet or an FM sub-carrier or other means. A combination of these systems can also be used.

Studies have shown that a combination of meteorological and historic data can accurately predict that a particular place on the highway will become covered with ice. This information can be provided to properly equipped vehicles so that the vehicle knows to anticipate slippery roads. For those roads that are treated with salt to eliminate frozen areas, the meteorological and historical data will not be sufficient. Numerous systems are available today that permit properly equipped vehicles to measure the coefficient of friction between the vehicle's tires and the road. It is contemplated that perhaps police or other public vehicles will be equipped with such a friction coefficient measuring apparatus and can serve as probes for those roadways that have been treated with salt. Information from these probe vehicles will be fed into the information system that will then be made available to control speed limits in the those areas.

Countless other examples exist; however, from those provided above it can be seen that for the vehicle control system to function without error, certain types of information must be accurately provided. These include information permitting the vehicle to determine its absolute location and means for vehicles near each other to communicate this location information to each other. Additionally, map information that accurately provides boundary and lane information of the road must be available. Also, critical weather or road-condition information is necessary. The road location information need only be generated once and changed whenever the road geometry is altered. This information can be provided to the vehicle through a variety of techniques including prerecorded media such as CD-ROM or DVD disks or through communications from transmitters located in proximity to the vehicle, satellites, radio and cellular phones.

Consider now the case of the congested highway. Many roads in the world are congested and are located in areas where the cost of new road construction is prohibitive or such construction is environmentally unacceptable. It has been reported that an accident on such a highway typically ties up traffic for a period of approximately four times the time period required to clear the accident. Thus, by eliminating accidents, a substantial improvement of the congested highway problem results. This of course is insufficient. On such highways, each vehicle travels with a different spacing, frequently at different speeds and in the wrong lanes. If the proper spacing of the vehicles could be maintained, and if the risk of an accident could be substantially eliminated, vehicles under automatic control could travel at substantially higher velocities and in a more densely packed configuration thereby substantially improving the flow rate of vehicles on the highway by as much as a factor of 3 to 4 times. This not only will reduce congestion but also improve air pollution. Once again, if each vehicle knows exactly where it is located, can communicate its location to surrounding vehicles and knows precisely where the road is located, then the control system in each vehicle has sufficient information to accomplish this goal.

Again, an intent of the system and process described here is to totally eliminate automobile accidents as well as reduce highway congestion. This process is to be designed to have no defective decisions. The process employs information from a variety of sources and utilizes that information to prevent accidents and to permit the maximum vehicle throughput on highways.

The information listed above is still insufficient. The geometry of a road or highway can be determined once and for all, until erosion or construction alters the road. Properly equipped vehicles can know their location and transmit that information to other properly equipped vehicles. There remains a variety of objects whose location is not fixed, which have no transmitters and which can cause accidents. These objects include broken down vehicles, animals such as deer which wander onto highways, pedestrians, bicycles, objects which fall off of trucks, and especially other vehicles which are not equipped with location determining systems and transmitters for transmitting that information to other vehicles. Part of this problem can be solved for congested highways by restricting access to these highways to vehicles that are properly equipped. Also, these highways are typically in urban areas and access by animals can be effectively eliminated. Heavy fines can be imposed on vehicles that drop objects onto the highway. Finally, since every vehicle and vehicle operator becomes part of the process, each such vehicle and operator becomes a potential source of information to help prevent catastrophic results. Thus, each vehicle should also be equipped with a system of essentially stopping the process in an emergency. Such a system could be triggered by vehicle sensors detecting a problem or by the operator strongly applying the brakes, rapidly turning the steering wheel or by activating a manual switch when the operator observes a critical situation but is not himself in immediate danger. An example of the latter case is where a driver witnesses a box falling off of a truck in an adjacent lane.

To solve the remaining problems, therefore, each vehicle should also be equipped with an anticipatory collision sensing system, or collision forecasting system, which is capable of identifying or predicting and reacting to a pending accident. As the number of vehicles equipped with the control system increases, the need for the collision forecasting system will diminish.

Once again, the operator will continue to control his vehicle provided he or she remains within certain constraints. These constraints are like a corridor. As long as the operator maintains his vehicle within this allowed corridor, he or she can operate that vehicle without interference from the control system. That corridor may include the entire width of the highway when no other vehicles are present or it may be restricted to all eastbound lanes, for example. In still other cases, that corridor may be restricted to a single line and additionally, the operator may be required to keep his vehicle within a certain spacing tolerance from the preceding vehicle. If a vehicle operator wishes to exit a congested highway, he could operate his turn signal that would inform the control system of this desire and permit the vehicle to safely exit from the highway. It can also inform other adjacent vehicles of the operator's intent, which could then automatically cause those vehicles to provide space for lane changing, for example. The highway control system is thus a network of individual vehicle control systems rather than a single highway resident computer system.

1.1.1 U.S. Department of Transportation (DOT) Policy

In the *DOT FY* 2000 *Budget in Brief* Secretary Rodney Slater states that "Historic levels of federal transportation investment . . . are proposed in the FY 2000 budget." Later, Secretary Slater states that "Transportation safety is the number one priority." DOT has estimated that $165 billion per year are lost in fatalities and injuries on U.S. roadways. Another $50 billion are lost in wasted time of people on congested highways. Presented herein is a plan to eliminate fatalities and injuries and to substantially reduce congestion. The total cost of implementing this plan is minuscule compared to the numbers stated above. This plan has been named the "Road to Zero Fatalities™", or RtZF™ for short.

In the *DOT Performance Plan FY* 2000, *Strategic Goal: Safety*, it is stated that "The FY 2000 budget process proposes over $3.4 billion for direct safety programs to meet this challenge." The challenge is to "Promote the public health and safety by working toward the elimination of traffic related deaths, injuries and property damage". The goal of the RtZF™ is the same and herein a plan is presented for accomplishing this goal. The remainder of the DOT discussion centers around wishful thinking to reduce the number of transportation related deaths, injuries, etc. However, the statistics presented show that in spite of this goal, the number of deaths is now increasing. As discussed below, this is the result of a failed process.

Reading through the remainder of the DOT Performance Plan FY 2000, one is impressed by the billions of dollars that are being spent to solve the highway safety problem coupled with the enormous improvement that has been made until the last few years. It can also be observed that the increase in benefits from these expenditures has now disappeared. For example, the fatality rate per 100 million vehicle miles traveled fell from 5.5 to 1.7 in the period from the mid-1960s to 1994. But this decrease has now substantially stopped!

This is an example of the law of diminishing returns and signals the need to take a totally new approach to solving this problem.

1.1.2 U.S. Intelligent Vehicle Initiative (IVI) Policy

Significant funds have been spent on demonstrating various ITS technologies. It is now believed to be the time for implementation. With over 40,000 fatalities and almost four million people being injured every year on US roadways, it is certainly time to take affirmative action to stop this slaughter. The time for studies and demonstrations is past. However, the deployment of technologies that are inconsistent with the eventual solution of the problem will only delay implementation of the proper systems and thereby result in more deaths and injuries.

A primary goal of the Intelligent Vehicle Initiative was to reduce highway related fatalities per 100 million vehicle miles traveled from 1.7 in 1996 to 1.6 in 2000. Of course, the number of fatalities may still increase due to increased road use. If this reduction in fatalities comes about due to slower travel speeds, because of greater congestion, then has anything really been accomplished? Similar comments apply to the goal of reducing the rate of injury per 100 million vehicle miles from 141 in 1996 to 128 in 2000. An alternate goal is to have the technology implemented on all new vehicles by the year 2010 that will eventually eliminate all fatalities and injuries. As an intermediate milestone, it is proposed to have the technology implemented on all new vehicles by 2007 to reduce or eliminate fatalities caused by road departure, yellow line crossing, stop sign infraction, rear end and excessive speed accidents. Inventions described herein will explain how these are goals can be attained.

In the *IVI Investment Strategy, Critical Technology Elements And Activities* of the DOT, it says "The IVI will continue to expand these efforts particularly in areas such as human factors, sensor performance, modeling and driver acceptance". An alternate, more effective, concentration for investments would be to facilitate the deployment of those technologies that will reduce and eventually eliminate highway fatalities. Driver acceptance and human factors will be discussed below. Too much time and resources have already been devoted to these areas. Modeling can be extremely valuable and sensor performance is in a general sense a key to eliminating fatalities.

On Jul. 15, 1998, the IVI light vehicle steering committee met and recommended that the IVI program should be conducted as a government industry partnership like the PNGV. This is believed to be quite wrong and it is believed that the IVI should now move vigorously toward the deployment of proven technology.

The final recommendations of the committee was "In the next five years, the IVI program should be judged on addressing selected impediments preventing deployment, not on the effect of IVI services on accident rates." This is believed to be a mistake. The emphasis for the next five years should be to deploy proven technologies and to start down the Road to Zero Fatalities™. Five years from now technology should be deployed on production vehicles sold to the public that have a significant effect toward reducing fatalities and injuries.

As described in the paper "Preview Based Control of A Tractor Trailer Using DGPS For Preventing Road Departure Accidents" the basis of the technology proposed has been demonstrated.

1.2 Review of Relevant Prior Art

The complete disclosure of the following patents and publications is incorporated by reference herein in their entirety. Also, the systems disclosed in the patents may be used in the invention in appropriate part.

a. Vehicle Collision Warning and Control

The ALVINN project of Carnegie Mellon University (Jochem, Todd M., Pomerleau, Dean A., and Thorpe, Charles E., "Vision-Based Neural Network Road and Intersection Detection and Traversal", IEEE Conference on Intelligent Robots and Systems, Aug. 5–9, 1995, Pittsburgh, Pa., USA)) describes an autonomous land vehicle using a neural network. The neural network is trained based on how a driver drives the vehicle given the output from a video camera. The output of the neural network is the direction that the vehicle should head based on the input information from the video camera and the training based on what a good driver would do. Such a system can be used in some embodiments of the present invention to guide a vehicle to a safe stop in the event that the driver becomes incapacitated or some other emergency situation occurs wherein the driver is unable to control the vehicle. The input to the neural network in this case would be the map information rather than a video camera. Additionally, the laser radar imaging system of this invention could also be an input to the system. This neural network system can additionally take over in the event that an accident becomes inevitable. Simple neural networks are probably not sufficient for this purpose and neural fuzzy and modular neural networks are probably required.

U.S. Pat. No. 5,479,173 to Yoshioka, et al. uses a steering angle sensor, a yaw rate sensor and a velocity of the vehicle sensor to predict the path that the vehicle will take. It uses a radar unit to identify various obstacles that may be in the path of the vehicle, and it uses a CCD camera to try to determine that the road is changing direction in front of the vehicle. No mention is made of the accuracy with which these determinations are made. It is unlikely that sub-meter accuracy is achieved. If an obstacle is sensed, the brakes can be automatically activated.

U.S. Pat. No. 5,540,298 to Yoshioka, et al. is primarily concerned with changing the suspension and steering characteristics of the vehicle in order to prevent unstable behavior of the vehicle in response to the need to exercise a collision avoidance maneuver. The collision anticipation system consists of an ultrasonic unit and two optical laser radar units.

U.S. Pat. No. 5,572,428 to Ishida is concerned with using a radar system plus a yaw rate sensor and a velocity sensor to determine whether a vehicle will collide with another vehicle based on the area occupied by each vehicle. Naturally, since radar cannot accurately determine this area, it has to be assumed by the system.

U.S. Pat. No. 5,613,039 to Wang, et al. is a collision warning radar system utilizing a real time adaptive probabilistic neural network. Wang discloses that about 60% of roadway collisions could be avoided if the operator of the vehicle was provided warning at least one-half second prior to a collision. The radar system used by Wang consists of two separate frequencies. The reflective radar signals are analyzed by a probabilistic neural network that provides an output signal indicative of the likelihood and threat of a collision with a particular object. The invention further includes a Fourier transform circuit that converts the digitized reflective signal from a time series to a frequency representation. It is important to note that in this case, as in the others above, true collision avoidance will not occur since, without a knowledge of the roadway, two vehicles can be approaching each other on a collision course, each following a curved lane on a highway and yet the risk of collision is minimal due to the fact that each vehicle remains in its lane. Thus, true collision avoidance cannot be obtained without an accurate knowledge of the road geometry.

U.S. Pat. No. 5,983,161 to Lemelson describes a GPS-based collision avoidance and warning system that contains some of the features of embodiments of the present invention. This patent is primarily concerned with using centimeter-accuracy DGPS systems to permit vehicles on a roadway to learn and communicate their precise locations to other vehicles. In that manner, a pending collision can, in some cases, be predicted.

Lemelson does not use an inertial navigation system for controlling the vehicle between GPS updates. Thus, the vehicle can travel a significant distance before its position can be corrected. This can lead to significant errors. Lemelson also does not make use of accurate map database and thus it is unable to distinguish cases where two cars are on separate lanes but on an apparent collision course. Although various radar and lidar systems are generally disclosed, the concept of range gating is not considered. Thus, the Lemelson system is unable to provide the accuracy and reliability required by the Road to Zero Fatalities™ system described herein.

b. Accurate Navigation

U.S. Pat. No. 5,504,482 to Schreder describes an automobile equipped with an inertial and satellite navigation system as well as a local area digitized street map. The main use of this patent is for route guidance in the presence of traffic jams, etc. Schreder describes how information as to the state of the traffic on a highway can be transmitted and utilized by a properly equipped vehicle to change the route the driver would take in going to his destination. Schreder does not disclose sub-meter vehicle location accuracy determination, nevertheless, this patent provides a good picture of the state of the art as can be seen from the following quoted paragraphs:

". . . there exists a wide range of technologies that have disadvantageously not been applied in a comprehensive integrated manner to significantly improve route guidance, reduce pollution, improve vehicular control and increase safety associated with the common automobile experience. For example, it is known that gyro based inertial navigation systems have been used to generate three-dimensional position information, including exceedingly accurate acceleration and velocity information over a relatively short travel distance, and that GPS satellite positioning systems can provide three-dimensional vehicular positioning and epoch timing, with the inertial system being activated when satellite antenna reception is blocked during "drop out" for continuous precise positioning. It is also known that digitized terrain maps can be electronically correlated to current vehicular transient positions, as have been applied to military styled transports and weapons. For another example, it is also known that digitally encoded information is well suited to RF radio transmission within specific transmission carrier bands, and that automobiles have been adapted to received AM radio, FM radio, and cellular telecommunication RF transmissions. For yet another example, it is further known that automobile electronic processing has been adapted to automatically control braking, steering, suspension and engine operation, for example, anti-lock braking, four-wheel directional steering, dynamic suspension stiffening during turns and at high speeds, engine governors limiting vehicular speed, and cruise control for maintaining a desired velocity. For still another example, traffic monitors, such as road embedded magnetic traffic light sensor loops and road surface traffic flow meters have been used to detect traffic flow conditions. While these sensors, meters, elements, systems and controls have served limited specific purposes, the prior art has disadvantageously failed to integrate them in a comprehensive fashion to provide a complete dynamic route guidance, dynamic vehicular control, and safety improvement system."

"Recently, certain experimental integrated vehicular dynamic guidance systems have been proposed. Motorola has disclosed an Intelligent Vehicle Highway System in block diagram form in copyright dated 1993 brochure. Delco Electronics has disclosed another Intelligent Vehicle Highway System also in block diagram form in Automotive News published on Apr. 12, 1993. These systems use compass technology for vehicular positioning. However, displacement wheel sensors are plagued by tire slippage, tire wear and are relatively inaccurate requiring recalibration of the current position. Compasses are inexpensive, but suffer from drifting particularly when driving on a straight road for extended periods. Compasses can sense turns, and the system may then be automatically recalibrated to the current position based upon sensing a turn and correlating that turn to the nearest turn on a digitized map, but such recalibration, is still prone to errors during excessive drifts. Moreover, digitized map systems with the compass and wheel sensor positioning methods operate in two dimensions on a three dimensional road terrain injecting further errors between the digitized map position and the current vehicular position due to a failure to sense the distance traveled in the vertical dimension."

"These Intelligent Vehicle Highway Systems appear to use GPS satellite reception to enhance vehicular tracking on digitized road maps as part of a guidance and control system. These systems use GPS to determine when drift errors become excessive and to indicate that recalibration is necessary. However, the GPS reception is not used for automatic accurate recalibration of current vehicular positioning, even though C-MIGITS and like devices have been used for GPS positioning, inertial sensing and epoch time monitoring, which can provide accurate continuous positioning."

"These Intelligent Vehicle Highway Systems use the compass and wheel sensors for vehicular positioning for route guidance, but do not use accurate GPS and inertial route navigation and guidance and do not use inertial measuring units for dynamic vehicular control. Even though dynamic electronic vehicular control, for example, anti-lock braking, anti-skid steering, and electronic control suspension have been contemplated by others, these systems do not appear to functionally integrate these dynamic controls with an accurate inertial route guidance system having an inertial measuring unit well suited for dynamic motion sensing. There exists a need to further integrate and improve these guidance systems with dynamic vehicular control and with improved navigation in a more comprehensive system."

"These Intelligent Vehicle Highway Systems also use RF receivers to receive dynamic road condition information for dynamic route guidance, and contemplate infrastructure traffic monitoring, for example, a network for road magnetic sensing loops, and contemplate the RF broadcasting of dynamic traffic conditions for dynamic route guidance. The disclosed two-way RF communication through the use of a transceiver suggests a dedicated two-way RF radio data system. While two-way RF communication is possible, the flow of necessary information between the vehicles and central system appears to be exceedingly lopsided. The flow of information from the vehicles to a central traffic radio data control system may be far less than the required information from traffic radio data control system to the vehicles. It seems that the amount of broadcasted dynamic traffic flow information to the vehicles would be far greater than the information transmitted from the vehicles to the central traffic control center. For example, road side incident or accident emergency messages to a central system may occur far less than the occurrences of congested traffic points on a digitized map having a large number of road coordinate points."

"Conserving bandwidth capacity is an objective of RF communication systems. The utilization of existing infra structure telecommunications would seem cost-effective. AT&T has recently suggested improving the existing cellular communication network with high-speed digital cellular communication capabilities. This would enable the use of cellular telecommunications for the purpose of transmitting digital information encoding the location of vehicular incidents and accidents. It then appears that a vehicular radio data system would be cost-effectively used for unidirectional broadcasting of traffic congestion information to the general traveling public, while using existing cellular telecommunication systems for transmitting emergency information. The communication system should be adapted for the expected volume of information. The Intelligent Vehicular Highway Systems disadvantageously suggest a required two-way RF radio data system. The vast amount of information that can be transmitted may tend to expand and completely occupy a dedicated frequency bandwidth. To the extent that any system is bi-directional in operation tends to disadvantageously require additional frequency bandwidth capacity and system complexity."

c. Vehicle Location

Several attempts to improve the position accuracy of GPS are discussed here, for example, the Wide Area Augmentation System (WAAS), the Local Area Augmentation System (LAAS) and various systems that make use of the carrier phase.

A paper by S. Malys et al., titled "The GPS Accuracy Improvement Initiative" provides a good discussion of the errors inherent in the GPS system without using differential corrections. It is there reported that the standard GPS provides a 9-meter RMS 3-D navigational accuracy to authorize precise positioning service users. This reference indicates that there are improvements planned in the GPS system that will further enhance its accuracy. The accuracies of these satellites independently of the accuracies of receiving units is expected to be between 1 and 1.5 meters RMS. Over the past eight years of GPS operations, a 50% (4.6 meter to 2.3 meter) performance improvement has been observed for the signal in space range errors. This, of course, is the RMS error. The enhancements contained in the accuracy improvement initiative will provide another incremental improvement from the current 2.3 meters to 1.3 meters and perhaps to as low as 40 centimeters.

Pullen, Samuel, Enge, Per and Parkinson, Bradford, "Simulation-Based Evaluation of WAAS Performance: Risk and Integrity Factors" discusses the accuracy that can be expected from the WAAS system. This paper indicates that the standard deviation for WAAS is approximately 1 meter. To get more accurate results requires more closely spaced differential stations. Using DGPS stations within 1,500 kilometers from the vehicle, high accuracy receivers can determine a location within 3 meters accuracy for DGPS according to the paper. Other providers of DGPS corrections claim considerably better accuracies.

From a paper by J. F. Zumberge, M. M. Watkins and F. H. Webb, titled "Characteristics and Applications of Precise GPS Clock Solutions Every 30 Seconds", Journal of the Institute of Navigation, Vol. 44, No. 4, Winter 1997–1998, it appears that by using the techniques described in this reference, the WAAS system could eventually be improved to provide accuracies in the sub-decimeter range for moving vehicles without the need for other DGPS systems. This data would be provided every 30 seconds.

W. I. Bertiger et al., "A Real-Time Wide Area Differential GPS System", Journal of the Institute of Navigation, Vol. 44, No. 4, Winter 1997–1998. This paper describes the software that is to be used with the WAAS System. The WAAS System is to be completed by 2001. The goal of the research described in this paper is to achieve sub-decimeter accuracies worldwide, effectively equaling local area DGPS performance worldwide. The full computation done on a Windows NT computer adds only about 3 milliseconds. The positioning accuracy is approximately 25 centimeters in the horizontal direction. That is, the RMS value so that gives an error at ±3 sigma of 1.5 meters. Thus, this real time wide area differential GPS system is not sufficiently accurate for the purposes of some embodiments of this invention. Other systems claim higher accuracies.

According to the paper by R. Braff, titled "Description of the FAA's Local Area Augmentation System (LAAS)", Journal of the Institute of Navigation, Vol. 44, No. 4, Winter 1997–1998, the LAAS System is the FAA's ground-based augmentation system for local area differential GPS. It is based on providing corrections of errors that are common to both ground-based and aircraft receivers. These corrections are transmitted to the user receivers via very high frequency (VHF), line of sight radio broadcast. LAAS has the capability of providing accuracy on the order of 1 meter or better on the final approach segment and through rollout. LAAS broadcasts navigational information in a localized service volume within approximately 30 nautical miles of the LAAS ground segment.

O'Connor, Michael, Bell, Thomas, Elkaim, Gabriel and Parkinson, Bradford, "Automatic Steering of Farm Vehicles Using GPS" describes an automatic steering system for farm vehicles where the vehicle lateral position error never deviated by more than 10 centimeters, using a carrier phase differential GPS system whereby the differential station was nearby.

The following quote is from Y. M. Al-Haifi et al., "Performance Evaluation of GPS Single-Epoch On-the Fly Ambiguity Resolution", Journal of the Institute of Navigation, Vol. 44, No. 4, Winter 1997–1998. This technique demonstrates sub-centimeter precision results all of the time provided that at least five satellites are available and multipath errors are small. A resolution of 0.001 cycles is not at all unusual for geodetic GPS receivers. This leads to a resolution on the order of 0.2 millimeters. In practice, multipath affects, usually from nearby surfaces, limit the accuracy achievable to around 5 millimeters. It is currently the case that the reference receiver can be located within a few kilometers of the mobile receiver. In this case, most of the other GPS error sources are common. The only major problem, which needs to be solved to carry out high precision kinematic GPS, is the integer ambiguity problem. This is because at any given instant, the whole number of cycles between the satellite and the receiver is unknown. The recovery of the unknown whole wavelengths or integer ambiguities is therefore of great importance to precise phase positioning. Recently, a large amount of research has focused on so called on the fly (OTF) ambiguity resolution methodologies in which the integer ambiguities are solved for while the unknown receiver is in motion."

The half-second processing time required for this paper represents 44 feet of motion for a vehicle traveling at 60 mph, which would be intolerable unless supplemented by an inertial navigation system. The basic guidance system in this case would have to be the laser or MEMS gyro on the vehicle. With a faster PC, one-tenth a second processing time would be achievable, corresponding to approximately 10 feet of motion of the vehicle, putting less reliance on the laser gyroscope. Nowhere in this paper is the use of this system on automobiles suggested. The technique presented in this paper is a single epoch basis (OTF) ambiguity resolution procedure that is insensitive to cycle slips. This system requires the use of five or more satellites which suggests that additional GPS satellites may need to be launched to make the smart highway system more accurate.

F. van Diggelen, "GPS and GPS+GLONASS RTK", ION-GPS, September 1997 "New Products Descriptions", gives a good background of real time kinematic systems using the carrier frequency. The products described in this paper illustrate the availability of centimeter level accuracies for the purposes of the RtZF™ system. The product described in F. van Diggelen requires a base station that is no further than 20 kilometers away.

A paper by J. Wu and S. G. Lin, titled "Kinematic Positioning with GPS Carrier Phases by Two Types of Wide Laning", Journal of the Institute of Navigation, Vol. 44, No. 4, Winter 1997 discloses that the solution of the integer ambiguity problem can be simplified by performing other constructs other than the difference between the two phases. One example is to use three times one phase angle, subtracted from four times another phase angle. This gives a wavelength of 162.8 centimeters vs. 86.2 for the single difference. Preliminary results with a 20-kilometer base line show a success rate as high as 95% for centimeter level accuracies.

A paper by R. C. Hayward et al., titled "Inertially Aided GPS Based Attitude Heading Reference System (AHRS) for General Aviation Aircraft" provides the list of inertial sensors that can be used with the teachings of embodiments of this invention.

K. Ghassemi et al., "Performance Projections of GPS IIF", describes the performance objectives for a new class of GPS 2F satellites scheduled to be launched in late 2001.

Significant additional improvement can be obtained for the WAAS system using the techniques described in the paper "Incorporation of orbital dynamics to improve wide-area differential GPS" by J. Ceva, W. Bertinger, R. Mullerschoen, T. Yunck and B. Parkinson, Institute on Navigation, Meeting on GPS Technology, Palm Springs, Calif., September 1995, which is incorporated herein by reference.

Singh, Daljit and Grewal, Harkirat, "Autonomous Vehicle using WADGPS", discusses ground vehicle automation using wide-area DGPS. Though this reference describes many of the features of embodiments of the present invention, it does not disclose sub-meter accuracy or sub-meter accurate mapping.

U.S. Pat. No. 5,272,483 to Kato describes an automobile navigation system. This system attempts to correct for the inaccuracies in the GPS system through the use of an inertial guidance, geomagnetic sensor, or vehicle crank shaft speed sensor. However, it is unclear as to whether the second position system is actually more accurate than the GPS system. This combined system, however, cannot be used for sub-meter positioning of an automobile.

U.S. Pat. No. 5,383,127 to Shibata uses map matching algorithms to correct for errors in the GPS navigational system to provide a more accurate indication of where the vehicle is or, in particular, on what road the vehicle is. This procedure does not give sub-meter accuracy. Its main purpose is for navigation and, in particular, in determining the road on which the vehicle is traveling.

U.S. Pat. No. 5,416,712 to Geier, et al. relates generally to navigation systems and more specifically to global positioning systems that use dead reckoning apparatus to fill in as backup during periods of GPS shadowing such as occur amongst obstacles, e.g., tall buildings in large cities. This patent shows a method of optimally combining the information available from GPS even when less than 3 or 4 satellites are available with information from a low-cost, inertial gyro, having errors that range from 1–5%. This patent provides an excellent analysis of how to use a modified Kalman filter to optimally use the available information.

U.S. Pat. No. 5,606,506 to Kyrtsos provides a good background of the GPS satellite system. It describes a method for improving the accuracy of the GPS system using an inertial guidance system. This is based on the fact that the GPS signals used by Kyrtsos do not contain a differential correction and the selective access feature is on. Key paragraphs from this application that describe subject matter applicable to embodiments of the instant invention follow.

"Several national governments, including the United States (U.S.) of America, are presently developing a terrestrial position determination system, referred to generically as a global positioning system (GPS). A GPS is a satellite-based radio-navigation system that is intended to provide highly accurate three-dimensional position information to receivers at or near the surface of the Earth.

"The U.S. government has designated its GPS the "NAVSTAR." The NAVSTAR GPS is expected to be declared fully operational by the U.S. government in 1993. The government of the former Union of Soviet Socialist Republics (USSR) is engaged in the development of a GPS known as "GLONASS". Further, two European systems known as "NAVSAT' and "GRANAS" are also under development. For ease of discussion, the following disclosure focuses specifically on the NAVSTAR GPS. The invention, however, has equal applicability to other global positioning systems.

"In the NAVSTAR GPS, it is envisioned that four orbiting GPS satellites will exist in each of six separate circular orbits to yield a total of twenty-four GPS satellites. Of these, twenty-one will be operational and three will serve as spares. The satellite orbits will be neither polar nor equatorial but will lie in mutually orthogonal inclined planes."

"Each GPS satellite will orbit the Earth approximately once every 12 hours. This coupled with the fact that the Earth rotates on its axis once every twenty-four hours causes each satellite to complete exactly two orbits while the Earth turns one revolution."

"The position of each satellite at any given time will be precisely known and will be continuously transmitted to the Earth. This position information, which indicates the position of the satellite in space with respect to time (GPS time), is known as ephemeris data."

"In addition to the ephemeris data, the navigation signal transmitted by each satellite includes a precise time at which the signal was transmitted. The distance or range from a receiver to each satellite may be determined using this time of transmission which is included in each navigation signal.

By noting the time at which the signal was received at the receiver, a propagation time delay can be calculated. This time delay when multiplied by the speed of propagation of the signal will yield a "pseudorange" from the transmitting satellite to the receiver."

"The range is called a "pseudorange" because the receiver clock may not be precisely synchronized to GPS time and because propagation through the atmosphere introduces delays into the navigation signal propagation times. These result, respectively, in a clock bias (error) and an atmospheric bias (error). Clock biases may be as large as several milliseconds."

"Using these two pieces of information (the ephemeris data and the pseudorange) from at least three satellites, the position of a receiver with respect to the center of the Earth can be determined using passive triangulation techniques."

"Triangulation involves three steps. First, the position of at least three satellites in "view" of the receiver must be determined. Second, the distance from the receiver to each satellite must be determined. Finally, the information from the first two steps is used to geometrically determine the position of the receiver with respect to the center of the Earth."

"Triangulation, using at least three of the orbiting GPS satellites, allows the absolute terrestrial position (longitude, latitude, and altitude with respect to the Earth's center) of any Earth receiver to be computed via simple geometric theory. The accuracy of the position estimate depends in part on the number of orbiting GPS satellites that are sampled. Using more GPS satellites in the computation can increase the accuracy of the terrestrial position estimate."

"Conventionally, four GPS satellites are sampled to determine each terrestrial position estimate. Three of the satellites are used for triangulation, and a fourth is added to correct for the clock bias described above. If the receiver's clock were precisely synchronized with that of the GPS satellites, then this fourth satellite would not be necessary. However, precise (e.g., atomic) clocks are expensive and are, therefore, not suitable for all applications."

"For a more detailed discussion on the NAVSTAR GPS, see Parkinson, Bradford W. and Gilbert, Stephen W., "NAVSTAR: Global Positioning System—Ten Years Later, "Proceedings of the IEEE, Vol. 71, No. 10, October 1983; and GPS: A Guide to the Next Utility, published by Trimble Navigation Ltd., Sunnyvale, Calif, 1989, pp. 147, both of which are incorporated herein by reference. For a detailed discussion of a vehicle positioning/navigation system which uses the NAVSTAR GPS, see commonly owned U.S. patent application Ser. No. 07/628,560, entitled "Vehicle Position Determination System and Method," filed Dec. 3, 1990, which is incorporated herein by reference."

"The NAVSTAR GPS envisions two modes of modulation for the carrier wave using pseudorandom signals. In the first mode, the carrier is modulated by a "C/A signal" and is referred to as the "Coarse/Acquisition mode". The Coarse/Acquisition or C/A mode is also known as the "Standard Positioning Service". The second mode of modulation in the NAVSTAR GPS is commonly referred to as the "precise" or "protected" (P) mode. The P-mode is also known as the "Precise Positioning Service".

The P-mode is intended for use only by Earth receivers specifically authorized by the United States government. Therefore, the P-mode sequences are held in secrecy and are not made publicly available. This forces most GPS users to rely solely on the data provided via the C/A mode of modulation (which results in a less accurate positioning system)

"In addition to the clock error and atmospheric error, other errors which affect GPS position computations include receiver noise, signal reflections, shading, and satellite path shifting (e.g., satellite wobble). These errors result in computation of incorrect pseudoranges and incorrect satellite positions. Incorrect pseudoranges and incorrect satellite positions, in turn, lead to a reduction in the precision of the position estimates computed by a vehicle positioning system."

U.S. Pat. No. 5,757,646 to Talbot, et al. illustrates the manner in which centimeter level accuracy on the fly in real time is obtained. It is accomplished by double differencing the code and carrier measurements from a pair of fixed and roving GPS receivers. This patent also presents an excellent discussion of the problem and various prior solutions as in the following paragraphs:

"When originally conceived, the global positioning system (GPS) that was made operational by the United States Government was not foreseen as being able to provide centimeter-level position accuracies. Such accuracies are now commonplace."

"Extremely accurate GPS receivers depend on phase measurements of the radio carriers that they receive from various orbiting GPS satellites. Less accurate GPS receivers simply develop the pseudoranges to each visible satellite based on the time codes being sent. Within the granularity of a single time code, the carrier phase can be measured and used to compute range distance as a multiple of the fundamental carrier wavelength. GPS signal transmissions are on two synchronous, but separate carrier frequencies "L1" and "L2", with wavelengths of nineteen and twenty-four centimeters, respectively. Thus, within nineteen or twenty-four centimeters, the phase of the GPS carrier signal will change 360°."

"However the numbers of whole cycle (360°) carrier phase shifts between a particular GPS satellite and the GPS receiver must be resolved. At the receiver, every cycle will appear the same. Therefore there is an "integer ambiguity". The computational resolution of the integer ambiguity has traditionally been an intensive arithmetic problem for the computers used to implement GPS receivers. The traditional approaches to such integer ambiguity resolution have prevented on-the-fly solution measurement updates for moving GPS receivers with centimeter accurate outputs. Very often such highly accurate GPS receivers have required long periods of motionlessness to produce a first and subsequent position fix."

"There are numerous prior art methods for resolving integer ambiguities. These include integer searches, multiple antennas, multiple GPS observables, motion-based approaches, and external aiding. Search techniques often require significant computation time and are vulnerable to erroneous solutions when only a few satellites are visible. More antennas can improve reliability considerably. If carried to an extreme, a phased array of antennas results whereby the integers are completely unambiguous and searching is unnecessary. But for economy the minimum number of antennas required to quickly and unambiguously resolve the integers, even in the presence of noise, is preferred."

"One method for integer resolution is to make use of the other observables that modulate a GPS timer. The pseudo-random code can be used as a coarse indicator of differential range, although it is very susceptible to multipath problems. Differentiating the L1 and L2 carriers provides a longer effective wavelength, and reduces the search space. However dual frequency receivers are expensive because they are more complicated. Motion-based integer resolution methods make use of additional information provided by platform or satellite motion. But such motion may not always be present when it is needed."

This system is used in an industrial environment where the four antennas are relatively close to each other. Practicing teachings of this invention permits a navigational computer to solve for the position of the rover to within a few centimeters on the fly ten times a second. An example is given where the rover is an airplane.

The above comments related to the use of multiple antennas to eliminate the integer ambiguity suggest that if a number of vehicles are nearby and their relative positions are known, the ambiguity can be resolved.

d. Mapping

It is intended that the map database of embodiments of the instant invention will conform to the open GIS specification. This will permit such devices to additionally obtain on-line consumer information services such as driving advisories, digital yellow pages that give directions, local weather pictures and forecasts and video displays of local terrain since such information will also be in the GIS database format.

A paper by O'Shea, Michael and Shuman, Valerie entitled "Looking Ahead: Map Databases in Predictive Positioning And Safety Systems" discusses map databases which can assist radar and image-processing systems of this invention since the equipped vehicle would know where the road ahead is and can therefore distinguish the lane of the preceding vehicle. No mention, however, is made in this reference of how this is accomplished through range gating or other means. This reference also mentions that within five years it may be possible to provide real time vehicle location information of one-meter accuracy. However, it mentions that this will be limited to controlled access roads such as interstate highways. In other words, the general use of this information on all kinds of roads for safety purposes is not contemplated. This reference also states that "road geometry, for example, may have to be accurate to within one meter or less as compared to the best available accuracy of 15 meters today". This reference also mentions the information about lane configuration that can be part of the database including the width of each lane, the number of lanes, etc., and that this can be used to determine driver drowsiness. This reference also states that "at normal vehicle speeds, the vehicle location must be updated every few milliseconds". It is also stated that the combination of radar and map data can also help to interpret radar information such as the situation where a radar system describes an overpass as a semi truck. Image processing in this reference is limited to assessing road conditions such as rain, snow, etc. The use of a laser radar system is not contemplated by this reference. The use of this information for road departures warnings is also mentioned, as is lane following. The reference also mentions that feedback from vehicles can be used to improve map configurations.

A great flow of commercially available data will begin with the new generation of high resolution (as fine as about 1 meter) commercial earth imaging satellites from companies like EarthWatch and SPOT Image. Sophisticated imaging software is being put in place to automatically process these imaging streams into useful data products. This data can be used to check for gross errors in the map database.

According to Al Gore, in "The Digital Earth: Understanding our Planet in the $21^{st}$ Century", California Science Center, Jan. 31, 1998, the Clinton Administration licensed commercial satellites to provide one meter resolution imaging beginning in 1998. Such imaging can be combined with digital highway maps to provide an accuracy and reality check.

U.S. Pat. No. 5,367,463 to Tsuji describes a vehicle azimuth determining system. It uses regression lines to find the vehicle on a map when there are errors in the GPS and map data. This patent does not give sub-meter accuracy. The advantage of this invention is that it shows a method of combining both map matching data and GPS along with a gyro and vehicle velocity and odometer data to improve the overall location accuracy of the vehicle.

e. Speed Control

U.S. Pat. No. 5,530,651 to Uemura, et al. describes a combination of an ultrasonic and laser radar optical detection system which has the ability to detect soiled lenses, rain, snow, etc. The vehicle control system then automatically limits the speed, for example, that the vehicle can travel in adverse weather conditions. The speed of the vehicle is also reduced when the visibility ahead is reduced due to a blind, curved corner. The permitted speed is thus controlled based on weather conditions and road geometry. There is no information in the vehicle system as to the legal speed limit as provided for in embodiments of the instant invention.

f. Precise Positioning

When the operator begins operating his vehicle with a version of the RtZF™ system of this invention, he or she will probably not be near a reference point as determined by one of the radar reflector, MIR or RFID locator systems, for example. In this situation, he or she will use the standard GPS system with the WAAS or other DGPS corrections such as available from OmniStar™, the US Government or other provider. This will provide accuracy of between a few meters to 6 centimeters. This accuracy might be further improved as he or she travels down the road through map-matching or through communication with other vehicles. The vehicle will know, however, that is not operating in the high accuracy mode. As soon as the vehicle (vehicle #1) passes a radar reflector, SAW, MIR, RFID or equivalent precise positioning system, it will be able to calculate exactly where it is within a few centimeters and the vehicle will know that it is in the accurate mode. Similarly, when another vehicle passes through a precise positioning station and learns its precise location it can communicate this fact with other vehicles in its vicinity (5 miles, for example) along with the latest GPS satellite transmissions. Each other vehicle will then be able to calculate its relative location extremely accurately and thus know its position almost as accurately as the vehicle that just passed through the precise positioning station. Furthermore, if vehicle #1 also has an accurate clock, as further described below, it can record the phase of each carrier wave from each satellite and predict that phase for perhaps an hour into the future. This then permits vehicle #1 to switch to carrier phase DGPS and know its precise position relative to the precise positioning station, and thus on the earth, until the clock accuracy degrades its knowledge of the carrier phase at the precise positioning station. Through continuous communication between vehicle #1 and other vehicles, all vehicles in the vicinity can similarly operate in the carrier phase DGPS mode without the need for the installation and maintenance of local DGPS stations. Thus, the addition of a few precise positioning stations at very low cost permits the each vehicle traveling on the road to know its precise location on the earth and for the system to approach perfection, a necessary requirement for achieving zero fatalities. For high-speed travel on a controlled highway, frequent precise positioning stations can be inexpensively provided and each vehicle can thereby be accurately contained within its proper corridor. Also, the size of the corridors that the vehicle is permitted to travel in can be a function of the accuracy state of the vehicle.

A paper by Han, Shaowei entitled "Ambiguity Recovery For Long-Range GPS Kinematic Positioning" appears to say that if a mobile receiver is initially synchronized with a fixed receiver such that there is no integer ambiguity, and if the mobile receiver then travels away from the fixed receiver, and during the process it loses contact with the satellites for a period of up to five minutes, that the carrier phase can be recovered and the ambiguity eliminated, providing again centimeter-range accuracies. Presumably, the fixed station is providing the differential corrections. This is important for embodiments of the instant invention since the integer ambiguity can be eliminated each time the vehicle passes a Precise Positioning Station (PPS) as explained below. After that, a five-minute loss of GPS signals should never occur. Thus, carrier phase accuracies will eventually be available to all vehicles. Note that the integer ambiguity problem disappears when the GPS satellites provide more frequencies. If, for example, each satellite would broadcast two frequencies with each frequency being a prime number of cycles per second, there would be no integer ambiguity problem. Due to the problem of identifying large prime numbers, other schemes can be used such that the relative phase of one carrier to the other does not repeat in the space from the vehicle to the satellite or if it does repeat, it repeats only a few times. This problem becomes simpler as more frequencies are added as for three frequencies, for example, the phase relation between any two can repeat as long as the phase relationships between all three don't repeat very often.

For the purposes herein, a Precise Positioning Station, or PPS, will mean any system that involves the existence of or placement of a detectable infrastructure on or near a roadway that when used in conjunction with an accurate map permits a vehicle to determine its precise location. Such detectable infrastructure can comprise a MIR triad, radar reflectors, SAW devices, RFID devices, devices or marks detectable visibly such as bar codes or other recognizable objects including edges of buildings, poles, signs or the like, magnetic markers or any other object whose position is precisely known and/or is detectable in a manner that permits the vehicle to determine its position relative to the device or absolutely and where the object is noted on a map database residing within the vehicle.

If two vehicles are traveling near each other and have established communication, and assuming that each vehicle can observe at least four of the same GPS satellites, each vehicle can send the satellite identification and the time of arrival of the signal at a particular epoch to the other. Then, each vehicle can determine the relative position of the other vehicle as well as the relative clock error. As one vehicle passes a Precise Positioning Station (PPS), it knows exactly where it is and thus the second vehicle also knows exactly where it is and can correct for satellite errors. All vehicles that are in communication with the vehicle at the PPS similarly can determine their exact position and the system approaches perfection. This concept is based on the fact that the errors in the satellite signals are identical for all vehicles that are within a mile or so of each other. Furthermore, each vehicle can set its onboard clock since the vehicle passing the PPS can do so, and communicate the exact time to the others, and then each vehicle can know the carrier phase of each satellite signal at the PPS and thus invoke carrier phase DGPS.

U.S. Pat. No. 5,361,070 to McEwan, although describing a motion detector, discloses technology which is used as part of a system to permit a vehicle to precisely know where it is on the face of the earth at particular locations. The ultra wideband 200 picosecond radar pulse emitted by the low power radar device of McEwan is inherently a spread spectrum pulse which generally spans hundreds of megahertz to several gigahertz. A frequency allocation by the FCC is not relevant. Furthermore, many of these devices may be co-located without interference. The concept of this device is actually disclosed in various forms in the following related patents to McEwan. The following comments will apply to these patents as a group, all of which are incorporated herein by reference.

U.S. Pat. No. 5,510,802 to McEwan describes a time of flight radio-location system similar to what is described below. In this case, however, a single transmitter sends out a pulse, which is received by three receivers to provide sub-millimeter resolution. The range of this device is less than about 10 feet.

The concept described in McEwan's U.S. Pat. No. 5,519,400 is that the MIR signal can be modulated with a coded sequence to permit positive identification of the sending device. In an additional McEwan patent, U.S. Pat. No. 5,589,838, a short-range radio-location system is described. Additionally, in U.S. Pat. No. 5,774,091, McEwan claims that the MIR system will operate to about 20 feet and give resolutions on the order of 0.01 inches.

g. Radar and Laser Radar Detection and Identification of Objects External to the Vehicle A paper by Amamoto, Naohiro and Matsumoto, Koji entitled "Obstruction Detector By Environmental Adaptive Background Image Updating" describes a method for distinguishing between moving object pixels, stationary object pixels, and pixels that change due to illumination changes in a video image. This paper appears to handle the case of a camera fixed relative to the earth, not one mounted on a vehicle. This allows the system to distinguish between a congested area and an area where cars are moving freely. The video sampling rate was 100 milliseconds.

A paper by Doi, Ayumu, Yamamomo, Yasunori, and Butsuen, Tetsuro entitled "Development Of Collision Warning System and Its Collision Avoidance Effect" describes a collision warning system that has twice the accuracy of conventional systems. It uses scanning laser radar. In the system described in this paper, the authors do not appear to use range gating to separate one vehicle from another.

A paper by Min, Joon, Cho, Hyung, and Choi, Jong, entitled "A Learning Algorithm Using Parallel Neuron Model" describes a method of accurately categorizing vehicles based on the loop in the highway. This system uses a form of neural network, but not a back propagation neural network. This would essentially be categorizing a vehicle by its magnetic signature. Much information is lost in this system, however, due to the lack of knowledge of the vehicle's velocity.

Work has been done at JPL (Jet Propulsion Laboratories) to develop a target recognition system. Neural networks play a key role in this target recognition process. The recognition of vehicles on a roadway is a considerably simpler process. Most of the cluttering information can be eliminated through range gating. The three-dimensional image obtained as described below will permit simple rotations of the image to artificially create a frontal view of the object being investigated. Also, the targets of interest here are considerably closer than was considered by JPL. Nevertheless, the techniques described in this reference and in the references cited by this reference, all of which are incorporated herein by reference, are applicable here in a simplified form. The JPL study achieved over a 90% success rate at 60 frames per minute.

U.S. Pat. No. 4,521,861 to Logan describes a method and apparatus for enhancing radiometric imaging and a method and apparatus for enhancing target detection through the utilization of an imaging radiometer. The radiometer, which is a passive thermal receiver, detects the reflected and emitted thermal radiation of targets. Prior to illumination, foliage will appear hot due to its high emissivity and metals will appear cold due to their low emissivities. When the target is momentarily illuminated foliage appears dark while metals appear hot. By subtracting the non-illuminated image from the illuminated image, metal targets are enhanced. The teachings of this patent thus have applicability to embodiments of the instant invention as discussed below.

U.S. Pat. No. 5,463,384 to Juds uses a plurality of infrared beams to alert a truck driver that a vehicle is in his blind spot when he begins to turn the vehicle. The system is typically activated by the vehicle's turn signal. No attempt is made to measure exactly where the object is, only whether it is in the blind spot or not.

U.S. Pat. No. 5,467,072 to Michael relates to a phased array radar system that permits the steering of a radar beam without having to rotate antennas. Aside from that, it suffers from all the disadvantages of radar systems as described here. In particular, it is not capable of giving accurate three-dimensional measurements of an object on the roadway.

U.S. Pat. No. 5,486,832 to Hulderman employs millimeter wave radar and optical techniques to eliminate the need for a mechanical scanning system. A 35-degree arc is illuminated in the azimuth direction and 6 degrees in elevation. The reflected waves are separated into sixteen independent, simultaneously overlapping 1.8 degree beams. Each beam, therefore, covers a width of about 3 feet at 100 feet distance from the vehicle, which is far too large to form an image of the object in the field of view. As a result, it is not possible to identify the objects in the field of view. All that is known is that an object exists. Also, no attempt has been made to determine whether the object is located on the roadway or not. Therefore, this invention suffers from the limitations of other radar systems.

U.S. Pat. No. 5,530,447 to Henderson, et al. shows a system used to classify targets as threatening or non-threatening, depending on whether the target is moving relative to the ground. This system is only for vehicles in an adjacent lane and is primarily meant to protect against blind-spot type accidents. No estimation is made by the system of the position of the target vehicle or the threatening vehicle, only its relative velocity.

U.S. Pat. No. 5,576,972 to Harrison provides a good background of how neural networks are used to identify various of objects. Although not directly related to intelligent transportation systems or to accident-avoidance systems such as described herein, these techniques will be applied to embodiments of the invention described herein as discussed below.

U.S. Pat. No. 5,585,798 to Yoshioka, et al. uses a combination of a CCD camera and a laser radar unit. The invention attempts to make a judgment as to the danger of each of the many obstacles that are detected. The load on the central processor is monitored by looking at different obstacles with different frequencies depending on their danger to the present system. A similar arrangement is contemplated for embodiments of the invention as disclosed herein.

U.S. Pat. No. 5,767,953 to McEwan describes a laser tape measure for measuring distance. It is distinct from laser radars in that the width of the pulse is measured in sub-nanosecond times, whereas laser radars are typically in the microsecond range. The use of this technology in the current invention would permit a much higher scanning rate than by convention radar systems and thus provide the opportunity for obtaining an image of the obstructions on the highway. It is also less likely that multiple vehicles having the same system would interfere with each other. For example, if an area 20 feet by 5 feet were scanned with a 0.2 inch pixel size, this would give about one million pixels. If using laser radar, one pixel per microsecond is sent out, it would take one second to scan the entire area during which time the vehicle has traveled 88 feet at 60 miles an hour. On the other hand, if scanning this array at 100 feet, it would take 200 nanoseconds for the light to travel to the obstacle and back. Therefore, if a pulse is sent out every fifth of a microsecond, it will take a fifth of a second to obtain a million pixels, during which time the vehicle has traveled about 17 feet. If 250,000 pixels are used, the vehicle will only have traveled about 4 feet.

U.S. Pat. Nos. 4,352,105 and 4,298,280 to Harney describe an infrared radar system and a display system for use by aircraft. In particular, these patents describe an infrared radar system that provides high resolution, bad whether penetration, day-night operation and which can provide simultaneous range, intensity and high resolution angular information. The technology uses $CO_2$ laser and a 10.6 micron heterodyne detection. It is a compact imaging infrared radar system that can be used with embodiments of the invention described herein. Harney applies this technology to aircraft and does not contemplate its application to collision avoidance or for other uses with automobiles.

h. Smart Highways

A paper entitled "Precursor Systems Analyses of Automated Highway Systems (Executive Summary)" discloses that "an AHS (automated highway system) can double or triple the efficiency of today's most congested lanes while significantly increasing safety and trip quality".

There are one million, sixty-nine thousand, twenty-two miles of paved non-local roads in the US. Eight hundred twenty-one thousand and four miles of these are classified as "rural" and the remaining two hundred forty-eight thousand, eighteen miles are "urban".

The existing interstate freeway system consists of approximately 50,000 miles which is 1% of the total of 3.8 million miles of roads. Freeways make up 3% of the total urban/suburban arterial mileage and carry approximately 30% of the total traffic.

In one study, dynamic route guidance systems were targeting at reducing travel time of the users by 4%. Under the system of this invention, the travel times would all be known and independent of congestion once a vehicle had entered the system. Under the current system, the dynamic delays can change measurably after a vehicle is committed to a specific route. According to the Federal Highway Administration Intelligent Transportation Systems (ITS Field Operational Test), dynamic route guidance systems have not been successful.

There are several systems presented in the Federal Highway Administration Intelligent Transportation Systems (ITS Field Operational Test) for giving traffic information to commuters, called "Advance Traveler Information System" (ATIS). In none of these articles does it discuss the variation in travel time during rush hour for example, from one day to the next. The variability in this travel time would have to be significant to justify such a system. Naturally, a system of this type would be unnecessary in situations where embodiments of the instant invention has been deployed. The single most important cause of variability from day to day is traffic incidents such as accidents, which are eliminated or at least substantially reduced by the instant invention. One of the conclusions in a study published in the "Federal Highway Administration Intelligent Transportation Systems (ITS Field Operational Test)" entitled "Direct Information Radio Using Experimental Communication Technologies" was that drivers did not feel that the system was a significant advance over commercial radio traffic information. They did think the system was an improvement over television traffic information and changeable message signs. The drivers surveyed on average having changed their route only one time in the eight week test period due to information they received from the system.

i. Weather and Road Condition Monitoring

A paper by Miyata, Yasuhiro and Otomo, Katsuya, Kato, Haijime, Imacho, Nobuhiro, Murata, Shigeo, entitled "Development of Road Icing Prediction System" describes a method of predicting road icing conditions several hours in advance based on an optical fiber sensor laid underneath the road and the weather forecast data of that area.

There is likely a better way of determining ice on the road than described in this paper. The reflection of an infrared wave off the road varies significantly depending on whether there is ice on the road or snow, or the road is wet or dry. An unsupervised neural network could be a better solution. The system of this paper measures the road surface temperature, air temperature and solar radiation. A combination of active and passive infrared would probably be sufficient. Perhaps, a specially designed reflective surface could be used on the road surface in an area where it is not going to be affected by traffic.

What this paper shows is that if the proper algorithm is used, the actual road temperature can be predicted without the need to measure the road surface temperature. This implies that icing conditions can be predicted and the sensors would not be necessary. Perhaps, a neural network algorithm that monitors a particular section of road and compares it to the forecasted data would be all that is required. In other words, given certain meteorological data, the neural network ought to be able to determine the probability of icing. What is needed, therefore, is to pick a section of roadway and monitor that roadway with a state-owned vehicle throughout the time period when icing is likely to occur and determine if icing has occurred and compare that with the meteorological data using a neural network that is adapted for each section of road.

j. Vehicle to Vehicle Communication

U.S. Pat. No. 5,506,584 to Boles relates to a system for communication between vehicles through a transmit and transponder relationship. The patent mentions that there may be as many as 90 vehicles within one half mile of an interrogation device in a multi-lane environment, where many of them may be at the same or nearly the same range. Boles utilizes a transponder device, the coded responses which are randomized in time, and an interrogation device which processes the return signals to provide vehicle identification, speed, location and transponder status information on vehicles to an operator or for storage in memory. No mention is made of how a vehicle knows its location or how accurate that knowledge is and therefore how it can transmit that location to other vehicles.

In embodiments of the invention described herein, vehicle to vehicle communication is used, among other purposes, to allow the fact that one vehicle knows its position more accurately than another to use communication to cause the other vehicle to also improve the accuracy with which it knows its position.

k. Infrastructure to Vehicle Communication

The DGPS correction information can be broadcast over the radio data system (RDS) via FM transmitters for land use. A company called Differential Correction, Inc. has come up with a technique to transmit this DGPS information on the RDS channel. This technique has been used in Europe since 1994 and, in particular, Sweden has launched a nationwide DPGS service via the RDS (see, Sjoberg, Lars, "A '1 Meter' Satellite Based Navigation Solutions for the Mobile Environment That Already Are Available Throughout Europe"). This system has the potential of providing accuracies on the premium service of between about 1 and 2 meters. A 1 meter accuracy, coupled with the carrier phase system to be described below, provides an accuracy substantially better than about 1 meter as preferred in the Road to Zero Fatalities™ (RtZF™) system of this invention.

In addition to the FM RDS system, the following other systems can be used to broadcast DGPS correction data: cellular mobile phones, satellite mobile phones, MCA (multi-channel access), wireless tele-terminals, DARCs/RBDS (radio data systems/radio broadcast data system), type FM sub-carrier, exclusive wireless, and pagers. In particular, DARC type is used for vehicle information and communication systems so that its hardware can be shared. Alternately, the cellular phone system, coupled with the Internet, could be used for transmitting corrections (see, Ito, Toru and Nishiguchi, Hiroshi entitled "Development of DGPS using FM Sub-Carrier For ITS"). Primarily, as discussed elsewhere, vehicle to vehicle communications can be used to transmit DGPS corrections from one vehicle to another whether the source is a central DGPS system or one based on PPS or other system.

One approach for the cellular system is to use the GSM mobile telephone system, which is the Europe-wide standard. This can be used for transmitting DGPS and possibly map update information (see, Hob, A., Ilg, J. and Hampel, A. entitled "Integration Potential Of Traffic Telematics).

In Choi, Jong and Kim, Hoi, "An Interim Report: Building A Wireless Internet-Based Traveler's Information System As A Replacement Of Car Navigation Systems", a system of showing congestion at intersections is broadcast to the vehicle through the Internet. The use of satellites is disclosed as well as VCS system.

This is another example of the use of the Internet to provide highway users with up-to-date traffic congestion information. Nowhere in this example, however, is the Internet used to transmit map information.

A paper by Sheu, Dennis, Liaw, Jeff and Oshizawa, Al, entitled "A Communication System For In-Vehicle Navigation System" provides another description of the use of the Internet for real traffic information. However, the author (unnecessarily) complicates matters by using push technology which isn't absolutely necessary and with the belief that the Internet connection to a particular vehicle to allow all vehicles to communicate, would have to be stopped which, of course, is not the case. For example, consider the @home network where everyone on the network is connected all the time.

A paper by Rick Schuman entitled "Progress Towards Implementing Interoperable DSRC Systems In North America" describes the standards for dedicated short-range communications (DSRC). DSRC could be used for inter-vehicle communications, however, its range according to the ITS proposal to the Federal Government would be limited to about 90 meters although there have been recent proposals to extend this to about 1000 meters. Also, there may be a problem with interference from toll collection systems, etc. According to this reference, however, "it is likely that any widespread deployment of intersection collision avoidance or automated highways would utilize DSRC". Ultra wide band communication systems, on the other hand, are a viable alternative to DSRC as explained below. The DSRC physical layer uses microwaves in the 902 to 928 megahertz band. However, ITS America submitted a petition to the FCC seeking to use the 5.85 to 5.925 gigahertz band for DSRC applications.

A version of CDPD, which is a commercially available mobile, wireless data network operated in the packet-switching mode, extends Internet protocol capabilities to cellular channels. This is reported on in a paper entitled "Intelligent Transportation Systems (ITS) Opportunity".

According to a paper by Kelly, Robert, Povich, Doublas and Poole, Katherine entitled "Petition of Intelligent Transportation Society of America for Amendment Of The Commission's Rules to Add Intelligent Transportation Services (ITS) As A New Mobile Service With Co-Primary Status In The 5.850 to 5.925 GHz", from 1989 to 1993 police received an annual average of over 6.25 million vehicle accident reports. During this same period, the total comprehensive cost to the nation of motor vehicle accidents exceeded the annual average of 400 billion dollars. In 1987 alone, Americans lost over 2 billion hours (approximately 22,800 years) sitting in traffic jams. Each driver in Washington D.C. wastes an average of 70 hours per year idling in traffic. From 1986 to 1996, car travel has increased almost 40% which amounts to about a 3.4% increase per year.

Further, from Kelly et al., the FCC has allocated in Docket 94–124, 46.7 to 46.9 GHz and 76 to 77 GHz bands for unlicensed vehicular collision avoidance radar. The petition for DSRC calls for a range of up to about 50 meters. This would not be sufficient for the RtZF™ system. For example, in the case of a car passing another car at 150 kilometers per hour. Fifty meters amounts to about one second, which would be insufficient time for the passing vehicle to complete the passing and return to the safe lane. Something more in the order of about 500 meters would be more appropriate. This, however, may interfere with other uses of DSRC such as automatic toll taking, etc., thus DSRC may not be the optimum communication system for communication between vehicles. DSRC is expected to operate at a data rate of approximately 600 kbps. DSRC is expected to use channels that are six megahertz wide. It might be possible to allocate one or more of the six megahertz channels to the RtZF™ system.

On DSRC Executive Roundtable—Meeting Summary, Appendix I—Proposed Changes to FCC Regulations covering the proposed changes to the FCC regulations, it is stated that ". . . DSRCS systems utilize non-voice radio techniques to transfer data over short distances between roadside and mobile units, between mobile units and between portable and mobile units to perform operations related to the improvement of traffic flow, traffic safety and other intelligent transportation service applications . . . ", etc.

l. Transponders

Consider placing a requirement that all vehicles have passive transponders such as RFID tags. This could be part of the registration system for the vehicle and, in fact, could even be part of the license plate. This is somewhat disclosed in a paper by Shladover, Steven entitled "Cooperative Advanced Vehicle Control and Safety Systems (AVCSS)". AVCSS sensors will make it easy to detect the presence, location and identity of all other vehicles in their vicinity. Passive radio frequency transponders are disclosed. The use of differential GPS with accuracies as good as about two (2) centimeters, coupled with an inertial guidance system, is disclosed, as is the ability of vehicles to communicate their locations to other vehicles. It discloses the use of accurate maps, but not of lateral vehicle control using these maps. It is obvious from reading this paper that the author did not contemplate the safety system aspects of using accurate maps and accurate GPS. In fact, the author stresses the importance of cooperation between various government levels and agencies and the private sector in order to make AVCSS feasible. "Automotive suppliers cannot sell infrastructure-dependent systems to their customers until the very large majority of the infrastructure is suitable equipped."

m. Intelligent Transportation Infrastructure Benefits

A paper entitled "Intelligent Transportation Infrastructure Benefits: Expected and Experienced" provides a summary of costs and benefits associated with very modest ITS implementations. Although a complete cost benefit analysis has not been conducted on the instant invention, it is evident from reading this paper that the benefits to cost ratio will be a very large number.

According to this paper, the congestion in the United States is increasing at about 9% per year. In 50 metropolitan areas, the cost in 1992 was estimated at 48 billion dollars and in Washington, D.C. it represented an annual cost of $822 per person, or $1,580 per registered vehicle. In 1993, there were 40,115 people killed and 3 million injured in traffic accidents. Sixty-one percent (61%) of all fatal accidents occurred in rural areas. This reference lists the 29 user services that make up the ITS program. It is interesting that the instant invention provides 24 of the 29 listed user services. A listing of the services and their proposed implementation with the RtZF™ system is:

| IVI Services In the tables below, L = Light Vehicle, H = Heavy Truck, T = Transit, S = Specialty Vehicle. | | | |
|---|---|---|---|
| (1) Rear-End Collision Avoidance | Gen. 0 | Gen. I | Gen. II |
| (1a) Monitors motion and location of other vehicles and other objects in front of vehicle. | LHTS | | |
| (1b) Advises the driver of imminent rear-end crashes. | LHTS | | |
| (1c) Provides automatic braking. | | | LHTS |

This service is available now with adaptive cruise control supplied by Autoliv, TRW and other companies.

| (2) Road-Departure Collision Avoidance | Gen. 0 | Gen. I | Gen. II |
|---|---|---|---|
| (2a) Monitors lane position of the vehicle and motion relative to edge of road. | LHTS | | |
| (2b) Monitors vehicle speed relative to road geometry and road conditions. | LHTS | | |
| (2c) Advises the driver of imminent unintentional road departure. | LHTS | | |

| | Gen. 0 | Gen. I | Gen. II |
|---|---|---|---|
| (2) Road-Departure Collision Avoidance | | | |
| (2d) Provides cooperative communication with highway infrastructure to automatically provide safe speeds for upcoming road geometry and conditions. | LHTS | | |

A virtual rumble strip noise will be used to warn the driver.

| | Gen. 0 | Gen. I | Gen. II |
|---|---|---|---|
| (3) Lane-Change and Merge Collision Avoidance | | | |
| (3a) Monitors lane position of the vehicle. | LHTS | | |
| (3b) Monitors the relative speed and lane position of vehicles (including motorcycles) beside and to the rear of the vehicle. | | LHTS | |
| (3c) Advises the driver during the decision phase (turn signal activated) of a lane-change maneuver of the potential for a collision. | | LHTS | |
| (3d) Advises the driver during the action phase (steering input) of a lane-change maneuver of an imminent collision. | | LHTS | |
| (3e) Advises the driver during the action phase (steering input) of an entry or exit maneuver of an imminent collision. | | LHTS | |
| (4) Intersection Collision Avoidance | | | |
| (4a) Monitors vehicle position relative to intersection geometry. | LHTS | | |
| (4b) Monitors relative speed and position of other vehicles. | | LHTS | |
| (4c) Advises the driver of appropriate action to avoid a violation of right-of-way at the intersection. | | LHTS | |
| (4d) Advises the driver of appropriate action to avoid an impending collision at the intersection. | | LHTS | |
| (4e) Determines the intent of other vehicles in the intersection to turn, slow down, stop, or violate the right-of-way. | | LHTS | |
| (5) Railroad Crossing Collision Avoidance | | | |
| (5a) Monitors vehicle position relative to railroad crossing. | LHTS | | |
| (5b) Monitors vehicle position and speed relative to position and speed of a train | | LHTS | |
| (5c) Advises the driver of appropriate action to avoid an impending collision at railroad crossing. | | LHTS | |
| (6) Vision Enhancement | | | |
| (6a) Provides an enhanced view of pedestrians and roadside features with an infrared system. | | LHTS | |
| (6b) Provides an enhanced view of the environment using a UV system. | | NA | |
| (7) Location-Specific Alert and Warning | | | |
| (7a) Provides warning information by integrating vehicle speed with knowledge of road geometry. | LHTS | | |
| (7b) Provides warning information by integrating environmental conditions with road surface conditions. | | LHTS | |
| (7c) Provides warning information on road geometry by integrating vehicle speed, road conditions, and road geometry. | | LHTS | |
| (7d) Provides warning information on upcoming traffic signs and signalized intersections. | LHTS | | |
| (7e) Provides warnings that replicate one or more types of road signs in complex or hazardous highway locations. | | LHTS | |

| | Gen. 0 | Gen. I | Gen. II |
|---|---|---|---|
| (8) Automatic Collision Notification | | | |
| (8a) Automatically transmits position/location of vehicle, when involved in a collision, using PSAP. | | LHTS | |
| (8b) Automatically provides crash severity information from vehicle to PSAP. | | LHTS | |
| (8c) Integrates with manually activated systems for requesting roadside assistance. This service is already implemented on GM's OnStar system. | | LHTS | |
| (9) Smart Restraints and Occupant Protection Systems | | | |
| (9a) Provides advance warning of an impending frontal collision to the vehicle protection system | | LHTS | |
| (9b) Provides advance warning of an impending side collision to the vehicle protection system. | | LHTS | |
| (9c) Pre-deploys appropriate occupant protection systems in vehicle prior to impact. | | LHTS | |

The scanning laser radar will identify both large and small objects.

| | Gen. 0 | Gen. I | Gen. II |
|---|---|---|---|
| (10) Navigation/Routing | | | |
| (10a) Provides location information to the driver. | LHTS | | |
| (10b) Provides route guidance information to the driver. | | LHTS | |
| (10c) Provides road geometry data to CAS. | | LHTS | |
| (10d) Provides location data to CAS. | | LHTS | |
| (10e) Displays only the traffic information that is applicable to vehicle location and route. | | LHTS | |
| (10f) Provides optimal routing based on driver preferences. | | LHTS | |
| (10g) Uses real-time traffic information in calculations of optimal routes. | | LHTS | |

The information for this service will be in the map database.

| | Gen. 0 | Gen. I | Gen. II |
|---|---|---|---|
| (11) Real-Time Traffic and Traveler Information | | | |
| (11a) Accesses in-vehicle databases to determine vehicle location and route guidance instructions. | | LHTS | |
| (11b) Receives travel-related information from the infrastructure (roadside or wide-area transmissions) to include: | | | |
| (11b-i) Motorist and traveler services information. | | LHTS | |
| (11b-ii) Safety and advisory information. | | | LHTS |
| (11b-iii) Real-time updates on congestion; work zones; environmental and road surface conditions. | | | LHTS |
| (11c) Provides an integrated approach to the presentation of information to the driver for safety warnings and other task-related advisories. | | | LHTS |
| (11d) Provides the capability of reacting to information on environmental and road conditions (augments static database). | | | LHTS |
| (12) Driver Comfort and Convenience | | | |
| NA | | | |

This is also already being done by various automobile manufacturers independently.

| (13) Vehicle Stability Warning and Assistance | Gen. 0 | Gen. I | Gen. II |
|---|---|---|---|
| (13a) Measures rollover stability properties of a typical heavy vehicle. | | HTS | |
| (13b) Provides the driver with a graphical depiction of the vehicle's loading condition relative to its rollover propensity. | | NA | |
| (13c) Provides an active brake control system to selectively apply brakes to stabilize the vehicle. | | HTS | |
| (13d) Integrates the active brake control with electronic braking system technology and infrastructure-provided information. | | HTS | |

The vehicle and road properties must be known prior to the danger or else it is too late. In Phase One, the vehicle inertial properties will be determined by monitoring its response to known road inputs.

| (14) Driver Condition Warning | Gen. 0 | Gen. I | Gen. II |
|---|---|---|---|
| (14a) Provides a driver monitoring and warning capability to alert the driver of drowsiness or other types of impairments (CVO or Transit first). | LHTS | | |

The system senses when driver goes off the road or commits other infractions and then tests driver response by turning on the hazard lights which the driver must turn off, for example.

| (15) Vehicle Diagnostics | Gen. 0 | Gen. I | Gen. II |
|---|---|---|---|
| (15a) Monitors and displays vehicle safety-related functions (i.e., braking system integrity, tire pressure, sensor and actuator performance, and communications system). | | LHTS | |

Cars do not now have a general diagnostic system. One is disclosed in U.S. Pat. No. 5,809,437.

| (16) Cargo Identification | Gen. 0 | Gen. I | Gen. II |
|---|---|---|---|
| NA | | | |

Cargo information can be part of the vehicle ID message.

| (17) Automated Transactions | Gen. 0 | Gen. I | Gen. II |
|---|---|---|---|
| (17a) Provides the driver with the capability of ETC and the payment of parking fees and transit fares. | LHTS | | |
| (17b) Provides heavy-vehicle drivers with the capability of electronically filing credentials and permit verifications. | LHTS or NA | | |

Automated transactions can be automatic with RtZF™ based on vehicle ID.

| (18) Safety Event Recorder | Gen. 0 | Gen. I | Gen. II |
|---|---|---|---|
| (18a) Records selected driver and vehicle parameters to support the reconstruction of an accident. | LHTS | | |
| (18b) Provides a notification system for transmission of collision data to the emergency service provider. | LHTS | | |

The Phase Zero recorder in the 1000 vehicles will record the following; (1) Time, place and velocity when infractions are sensed. (2) Weather, temperature, illumination etc. (3) Brake pressure, throttle, steering angle etc. (4) Occupant position. (5) In vehicle still pictures. (6) Number of satellites observed. (7) State of DGPS signals. (8) State of the system.

| (19) Obstacle/Pedestrian Detection | Gen. 0 | Gen. I | Gen. II |
|---|---|---|---|
| (19a) Warns the driver when pedestrians, vehicles, or obstacles are in close proximity to the driver's intended path using onboard sensors. | | LHTS | |
| (19b) Warns the driver when pedestrians, vehicles, or obstacles are in close proximity to the driver's intended path using infrastructure-based sensors. | | NA | |

In Phase One, scanning laser radar, lenses & range gating will be used to cover all vehicle sides.

| (20) Tight Maneuver/Precision Docking | Gen. 0 | Gen. I | Gen. II |
|---|---|---|---|
| (20a) Provides sensors to continuously calculate the lateral distance to the curb, front and rear, in order to park the vehicle in a precise location. | | HT | |
| (20b) Provides sensors to continuously calculate the longitudinal distance to the end of the vehicle loading area in order to park the vehicle in the precise location | | HT | |
| (20c) Provides the driver with the ability to override automated system by pressing brakes or steering in emergency situations. | | HT | |

This service can be provided in Phase Zero. This will probably require the PPS system described herein.

| | Gen. 0 | Gen. I | Gen. II |
|---|---|---|---|
| (21) Transit Passenger Monitoring | | | |
| NA | | | |
| (22) Transit Passenger Information | | | |
| NA | | | |

RtZF™ can provide location information.

| (23) Fully Automated Control at Certain Facilities | Gen. 0 | Gen. I | Gen. II |
|---|---|---|---|
| NA | | | |

RtZF™ could provide accurate position information to support this service.

| (24) Low-Friction Warning and Control Assist | Gen. 0 | Gen. I | Gen. II |
|---|---|---|---|
| (24a) Provides drivers with a warning to indicate reduced traction, detected by on-board sensors. | | LHTS | |
| (24b) Provides drivers with control assist capabilities to help the driver regain control of the vehicle. | | LHTS | |

Historical road data and weather prediction plus roadway sensors and probes will provide this service in Phase One.

| (25) Longitudinal Control | Gen. 0 | Gen. I | Gen. II |
|---|---|---|---|
| (25a) Provides normal cruise control. | LHTS | | |
| (25b) Provides a cooperative intelligent cruise control. | LHTS | | |
| (25c) Monitors location and relative speed of near-by vehicles. | | LHTS | |
| (25d) Provides automatic speed adjustment by coasting or downshifting to maintain a safe operating envelope. | LHTS | | |
| (25e) Provides a system capable of detecting a vehicle located ahead in the same lane of traffic that is either traveling at any speed or fully stopped. | | LHTS | |
| (25f) Provides a full-range of braking capabilities and operating speeds to be used for all driving situations, including stop-and-go traffic. | | LHTS | |

Automatic Cruise Control (ACC) is provided in Phase Zero. The rest are basic services to be provided in Phase One.

| (26) Lateral Control | Gen. 0 | Gen. I | Gen. II |
|---|---|---|---|
| (26a) Provides a sensor capable of detecting the center of the lane using infrastructure support such as accurately painted lane marker stripes, embedded magnetic nails, or radar-reflective stripes. | | LHTS | |
| (26b) Provides automatic steering control that will maintain vehicle position in the center of the lane. | | LHTS | |

These are the main services to be provided in Phase Zero.

This invention further describes various means of communication between a vehicle and other vehicles as well as the infrastructure. However, no recommendations are made for vehicle-to-vehicle communication technologies.

The above references, among other things, demonstrate that there are numerous methods and future enhancements planned that will provide centimeter level accuracy to an RtZF™ equipped vehicle. There are many alternative paths that can be taken but which ever one is chosen the result is clear that such accuracies are within the start of the art today.

1.3 Limitations of the Prior Art

Previous inventions have attempted to solve the collision avoidance problem for each vehicle independently of the other vehicles on the roadway. Systems that predict vehicle trajectories generally fail because two vehicles can be on a collision course and within the last 0.1 second a slight change of direction avoids the collision. This is a common occurrence that depends on the actions of the individual drivers and no collision avoidance system now in existence is believed to be able to differentiate this case from an actual collision. In the present invention, every equipped vehicle will be confined to a corridor and to a position within that corridor where the corridor depends on sub-meter accurate digital maps. Only if that vehicle deviates from the corridor will an alarm sound or the vehicle control system take over control of the vehicle sufficiently to prevent the vehicle from leaving its corridor if an accident would result from the departure from that corridor.

Additionally, no prior art system is believed to have successfully used the GPS navigational system, or an augmented DGPS to locate a vehicle on a roadway with sufficient accuracy that that information can be used to prevent the equipped vehicle from leaving the roadway or striking another similarly equipped vehicle.

Prior art systems in addition to being poor at locating potential hazards on the roadway, have not been able to ascertain whether they are in fact on the roadway or off on the side, whether they are threatening vehicles, static signs over overpasses etc. In fact, no credible attempt to date has been made to identify or categorize objects which may impact the subject vehicle.

The RtZF™ system in accordance with this invention also contemplates a different kind of interrogating system. It is optionally based on scanning infrared laser radar with range gating. This system, when used in conjunction with accurate maps, will permit a precise imaging of an object on the road in front of the vehicle, for example, permitting it to be identified (using neural networks) and its location, velocity and the probability of a collision to be determined.

In particular, the system of this invention is particularly effective in eliminating accidents at intersections caused by drivers running stop signs, red stoplights and turning into oncoming traffic. There are approximately one million such accidents and they are the largest killer in older drivers who frequently get confused at intersections.

1.4 OBJECTS AND SUMMARY OF THE INVENTION

The above and other objects and advantages of the present invention are achieved by the preferred embodiments that are summarized and described in detail below.

It is an object of the invention to control a vehicle based on data from an inertial reference unit, as well as to perform other functions using the data from an inertial reference unit.

It is another object of the present invention to provide a new and improved method for communications involving a vehicle, including vehicle-to-vehicle communications and communications between a vehicle and a stationary object.

In order to achieve objects of the invention, a control system for controlling a vehicle or a component of a vehicle comprises an inertial reference unit including three accelerometers and three gyroscopes which provide data on vehicle motion and a processor coupled to the inertial reference unit and arranged to process the data on vehicle motion and control the vehicle or the component of the vehicle based thereon. Movement of the vehicle may be controlled via control over servos, such as a servo associated with the braking system, a servo associated with the drive train or throttle and a servo associated with the steering system. A display to the driver can also be controlled by the processor to provide data on vehicle motion or data or information derived from the data on vehicle motion.

Optionally, a Kalman filter is coupled to the processor for optimizing the data on vehicle motion from the inertial reference unit.

A navigation system may be coupled to the processor and arranged to provide information about a roadway on which the vehicle is traveling from a map database to the processor. The processor is then arranged to process the data on vehicle motion and the roadway information and control a warning system to provide a warning to the driver upon detection of a potential crash situation, such as the vehicle being about to run off a road, cross a yellow line and run a stop sign as potential crash situations. Additionally, a sensor for obtaining input on the color of an approaching stoplight is preferably provided in which case, the processor additionally considers the vehicle being about to run a red stoplight as a potential crash situation. The warning system may be an alarm, a light, a buzzer audible noise and/or a simulated rumble strip.

A GPS receiver may be arranged to receive positioning signals relating to the position of the vehicle. In this case, the processor is coupled to the GPS receiver and processes the data on vehicle motion and signals relating to the position of the vehicle and controls the vehicle or the component of the vehicle based thereon. A Kalman filter is optionally coupled to the processor for optimizing the data on vehicle motion from the inertial reference unit and the signals relating to the position of the vehicle from the GPS receiver.

When three accelerometers are present, one is arranged to sense vehicle acceleration in a latitude direction, a second is arranged to sense vehicle acceleration in a longitudinal direction and a third is arranged to sense vehicle acceleration in a vertical direction. When three gyroscopes are present, one is arranged to sense angular rate about the pitch axis, a second is arranged to sense angular rate about the yaw axis and a third is arranged to sense angular rate about the roll axis.

Another embodiment of a control system for controlling a vehicle or a component of a vehicle comprises an inertial reference unit including three accelerometers and three gyroscopes which provide data on vehicle motion, a GPS receiver arranged to receive positioning signals relating to the position of the vehicle, a processor coupled to the inertial reference unit and to the GPS receiver and arranged to process the data on vehicle motion and signals relating to the position of the vehicle and control the vehicle or the component of the vehicle based thereon, and a Kalman filter coupled to the processor for optimizing the data on vehicle motion from the inertial reference unit and the signals relating to the position of the vehicle from the GPS receiver. The same enhancements described above are possible for this embodiment as well.

In order to achieve objects of the invention, a communication arrangement for a vehicle in accordance with the invention comprises an inertial reference unit including a plurality of accelerometers and gyroscopes which provide data on vehicle motion, a processor coupled to the inertial reference unit and arranged to process the data on vehicle motion to derive information about the vehicle, and a communication system coupled to the processor for transmitting the information about the vehicle. Optionally, a Kalman filter is coupled to the processor for optimizing the data on vehicle motion from the inertial reference unit.

A navigation system may be coupled to the processor to provide information about a roadway on which the vehicle is traveling from a map database to the processor. In this case, the communication system transmits the information about the roadway, which may be useful for other vehicles, e.g., to avoid traffic, obstacles, slippery roads, etc.

A GPS receiver may be arranged on the vehicle to receive positioning signals relating to the position of the vehicle. In this case, the processor is coupled to the GPS receiver and processes the data on vehicle motion and signals relating to the position of the vehicle to derive the information about the vehicle.

A method for controlling a vehicle or a component of a vehicle in accordance with the invention comprises the steps of arranging an inertial reference unit including three accelerometers and three gyroscopes on the vehicle, obtaining data on vehicle motion from the inertial reference unit and controlling the vehicle or the component of the vehicle based on the data on vehicle motion obtained from the inertial reference unit. The enhancements described above are possible for this method as well, e.g., use of a Kalman filter to optimize the data on vehicle motion from the inertial reference unit.

A method for vehicular communications in accordance with the invention comprises the steps of arranging an inertial reference unit including a plurality of accelerometers and gyroscopes on the vehicle, obtaining data on vehicle motion from the accelerometers and gyroscopes, derive information about the vehicle from the data on vehicle motion, and transmitting the information about the vehicle via a communications system to a remote facility. A Kalman filter may be provided to optimize the data on vehicle motion from the inertial reference unit.

A navigation system may be arranged on the vehicle and include a map database. As such, information about a roadway on which the vehicle is traveling is obtained from the map database and the information about the roadway transmitted, e.g., to alert other drivers about accidents, road conditions and the like. A GPS receiver can also be arranged on the vehicle to receive positioning signals relating to the position of the vehicle and information about the vehicle derived from the data on vehicle motion and signals relating to the position of the vehicle.

Other objects and advantages of disclosed inventions include:

1. To provide a system based partially on the global positioning system (GPS) or equivalent that permits an onboard electronic system to determine the position of a vehicle with an accuracy of 1 meter or less.
2. To provide a system which permits an onboard electronic system to determine the position of the edges and/or lane boundaries of a roadway with an accuracy of 1 meter or less in the vicinity of the vehicle.
3. To provide a system which permits an onboard vehicle electronic system to determine the position of the edges and/or lane boundaries of a roadway relative to the vehicle with an accuracy of less than about 10 centimeters, one sigma.
4. To provide a system that substantially reduces the incidence of single vehicle accidents caused by the vehicle inappropriately leaving the roadway at high speed.
5. To provide a system which does not require modification to a roadway which permits high speed controlled travel of vehicles on the roadway thereby increasing the vehicle flow rate on congested roads.
6. To provide a collision avoidance system comprising a sensing system responsive to the presence of at least one other vehicle in the vicinity of the equipped vehicle and means to determine the location of the other vehicle relative to the lane boundaries of the roadway and thereby determine if the other vehicle has strayed from its proper position on the highway thereby increasing the risk of a collision, and taking appropriate action to reduce that risk.
7. To provide a means whereby vehicles near each other can communicate their position and/or their velocity to each other and thereby reduce the risk of a collision.

8. To provide a means for accurate maps of a roadway to be transmitted to a vehicle on the roadway.
9. To provide a means for weather, road condition and/or similar information can be communicated to a vehicle traveling on a roadway plus means within the vehicle for using that information to reduce the risk of an accident.
10. To provide a means and apparatus for a vehicle to precisely know its location at certain positions on a road by passing through or over an infrastructure based local subsystem thereby permitting the vehicle electronic systems to self correct for the satellite errors making the vehicle for a brief time a DGPS station and facilitate carrier phase DGPS for increased location accuracy.
11. To utilize government operated navigation aid systems such as the WAAS and LARS as well as other available or to become available systems to achieve sub-meter vehicle location accuracies.
12. To utilize the OpenGIS™ map database structure so as to promote open systems for accurate maps for the RtZF™ system.
13. To eliminate intersection collisions caused by a driver running a red light or stop sign.
14. To eliminate intersection collisions caused by a driver executing a turn into oncoming traffic.

Other improvements will now be obvious to those skilled in the art. The above features are meant to be illustrative and not definitive.

1.5 BRIEF DESCRIPTION OF THE DRAWINGS

The various hardware and software elements used to carry out the invention described herein are illustrated in the form of system diagrams, block diagrams, flow charts, and depictions of neural network algorithms and structures. The preferred embodiment is illustrated in the following figures.

Figure 8:
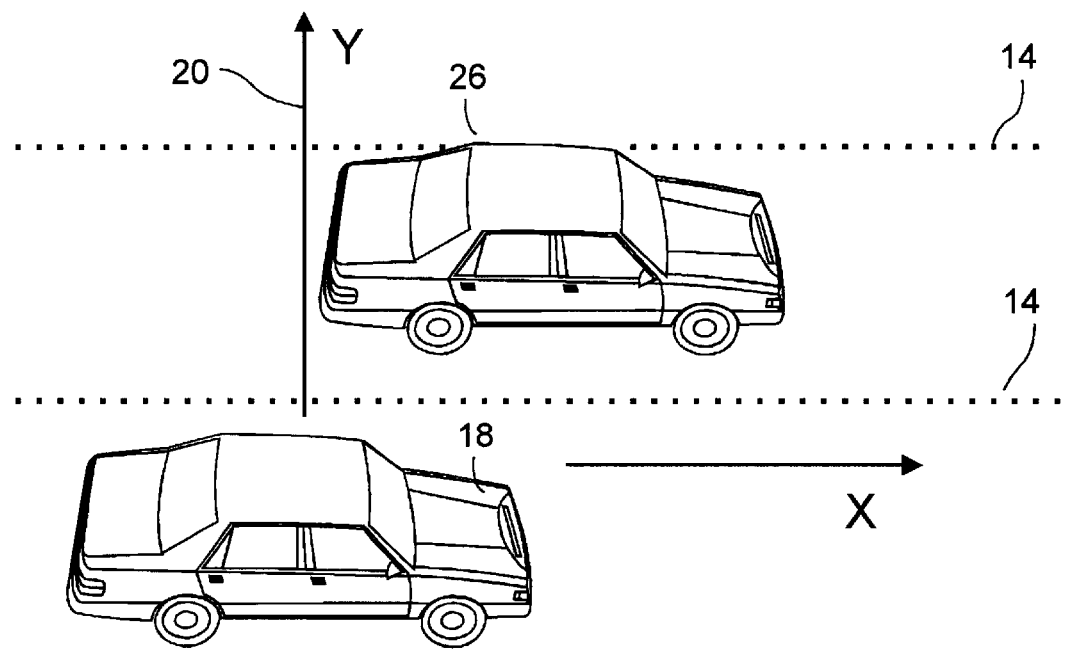

FIG. 8 illustrated two adjacent vehicles traveling on a roadway and communicating with each other.

Figure 5:
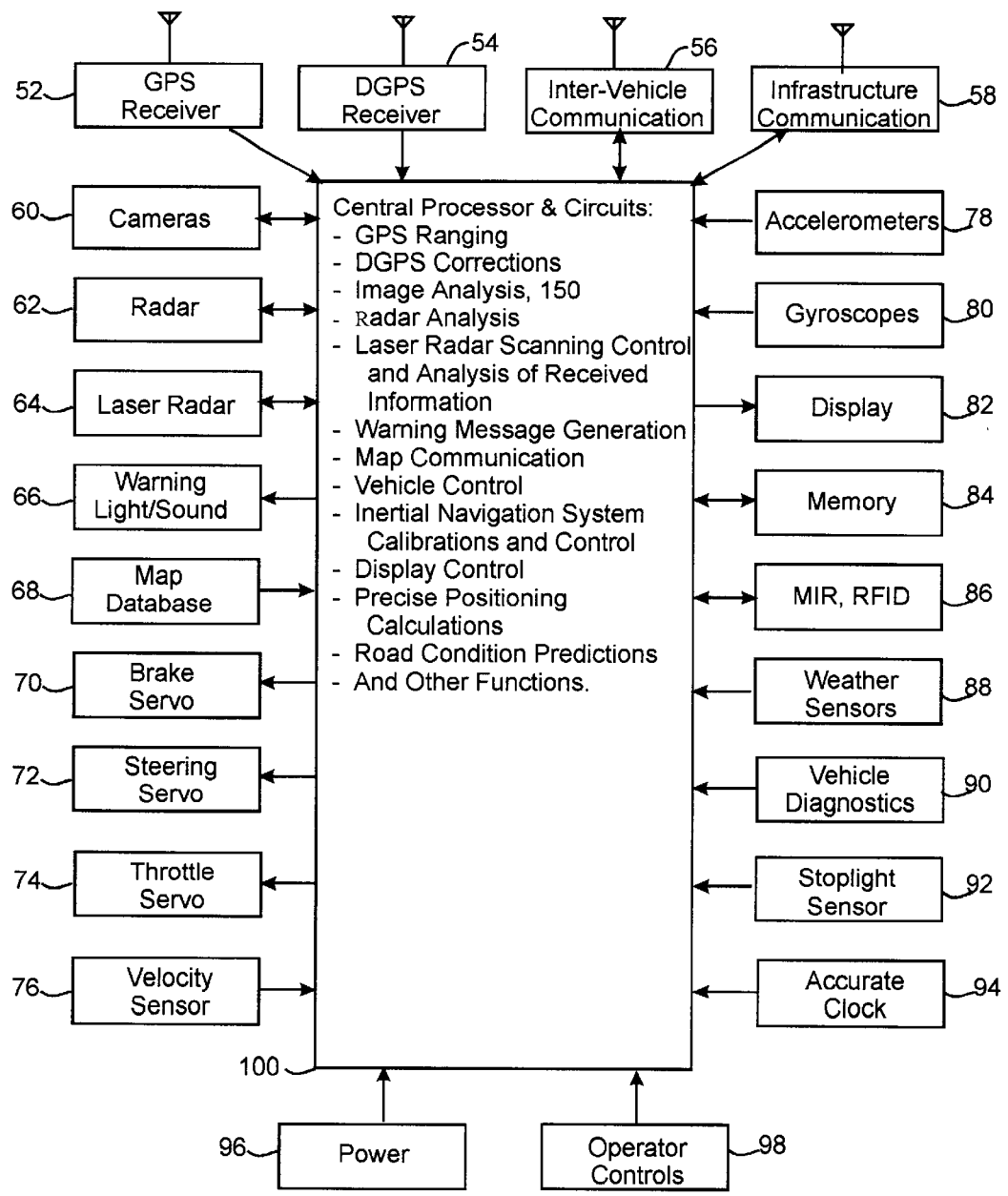
FIG. 5 is a block diagram of the overall vehicle accident avoidance, warning, and control system and method of the present invention illustrating system sensors, radio transceivers, computers, displays, input/output devices and other key elements.
Figure 9:
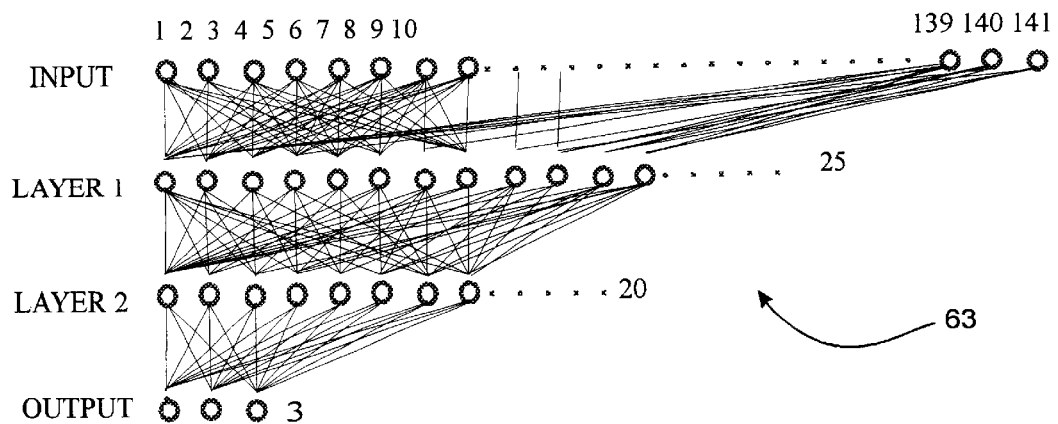

FIG. 9 is a schematic diagram illustrating a neural network of the type useful in the image analysis computer of FIG. 5.

Figure 10:
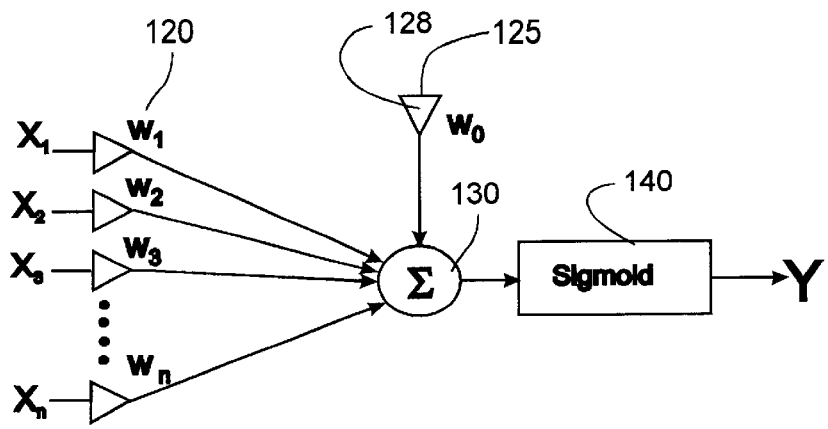

FIG. 10 is a schematic diagram illustrating the structure of a node processing element in the neural network of FIG. 9.

Figure 11:
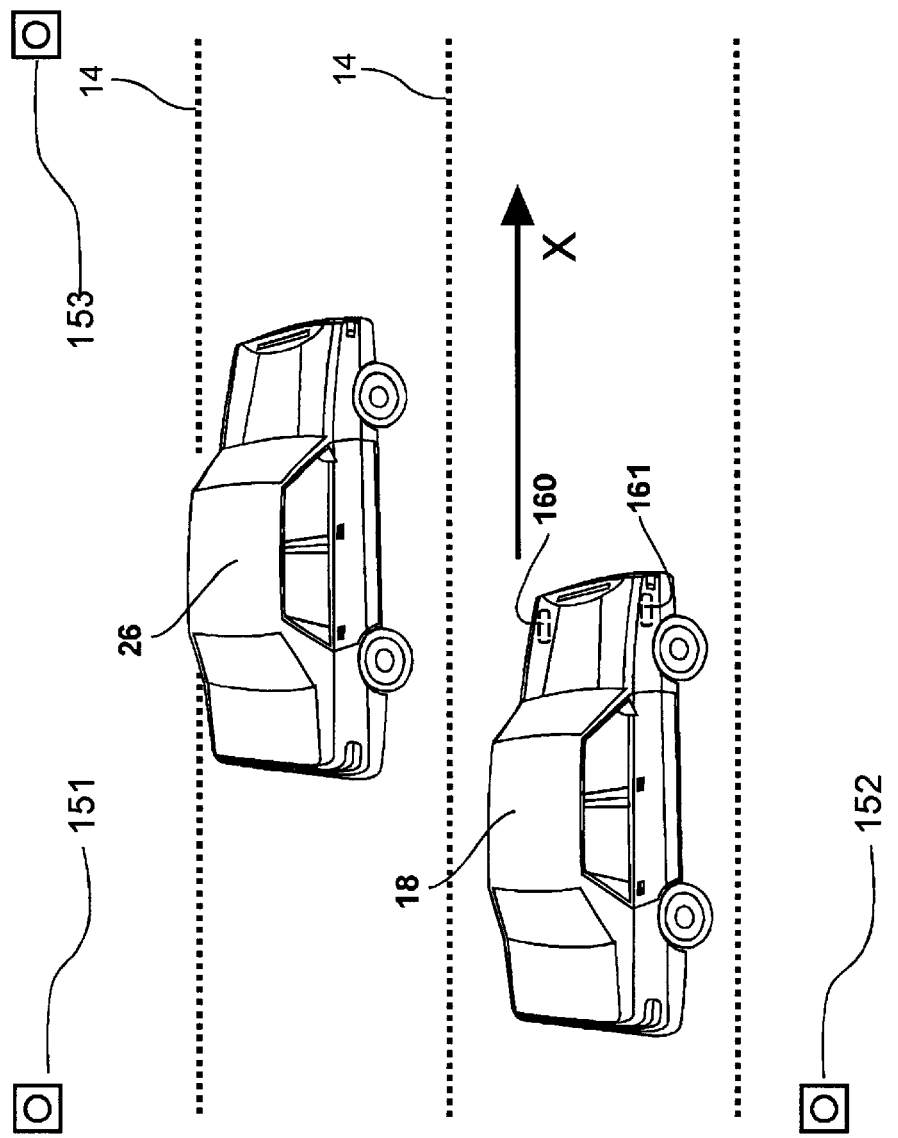

FIG. 11 illustrates the use of a Precise Positioning System employing three micropower impulse radar transmitters, two or three radar reflectors or three RFID tags in a configuration to allow a vehicle to accurately determine its position.

Figure 12A:
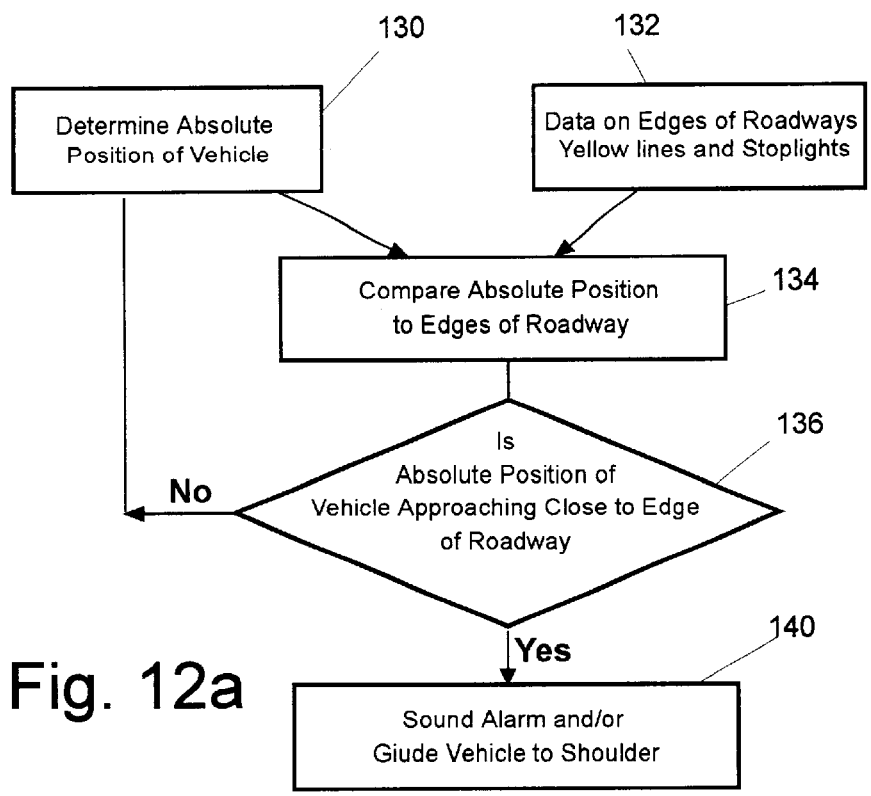

FIG. 12a is a flow chart of the method in accordance with the invention for preventing run off the road accidents.

Figure 12B:
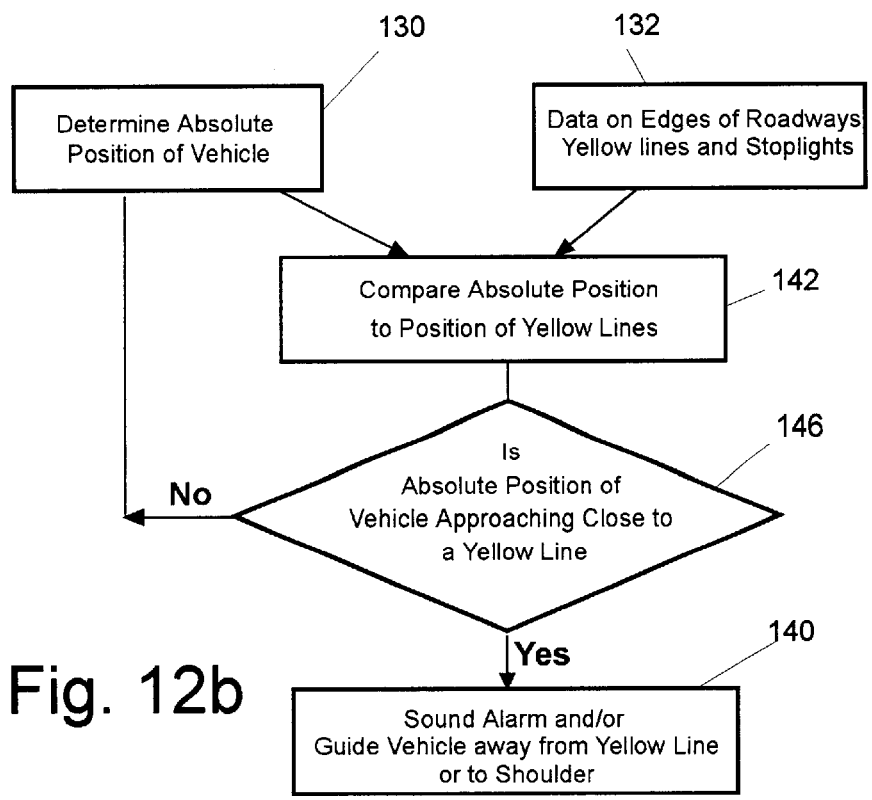

FIG. 12b is a flow chart of the method in accordance with the invention for preventing yellow line crossing accidents.

Figure 12C:
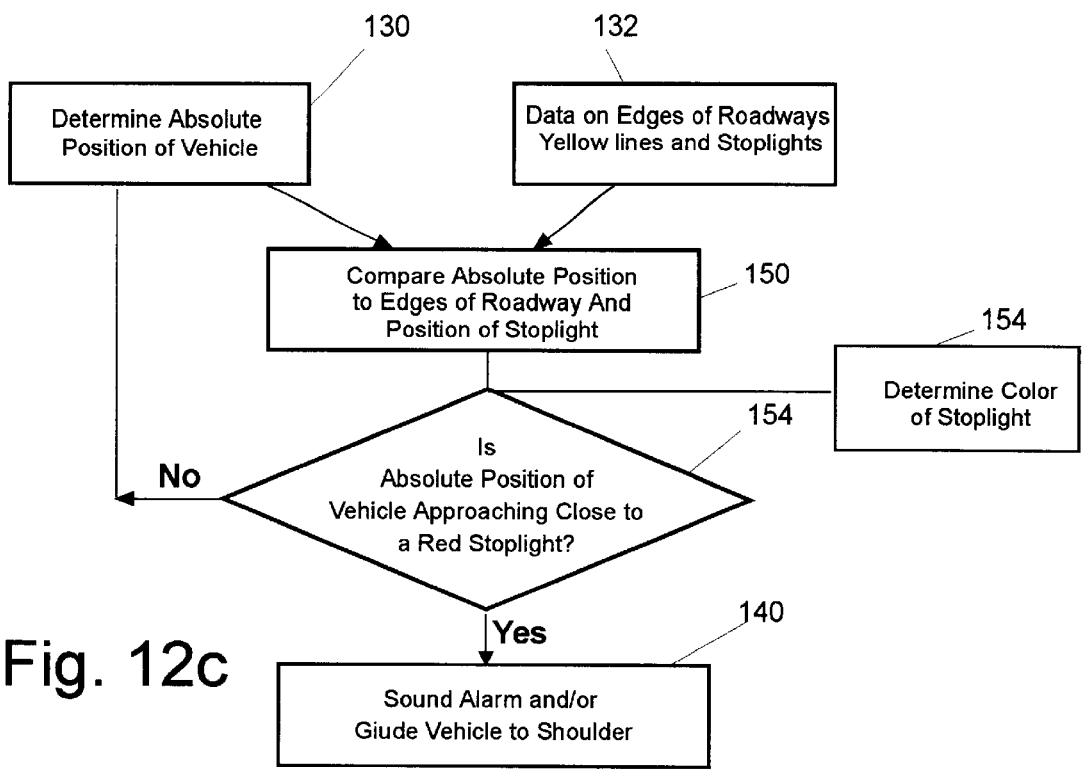

FIG. 12c is a flow chart of the method in accordance with the invention for preventing stoplight running accidents.

Figure 13:
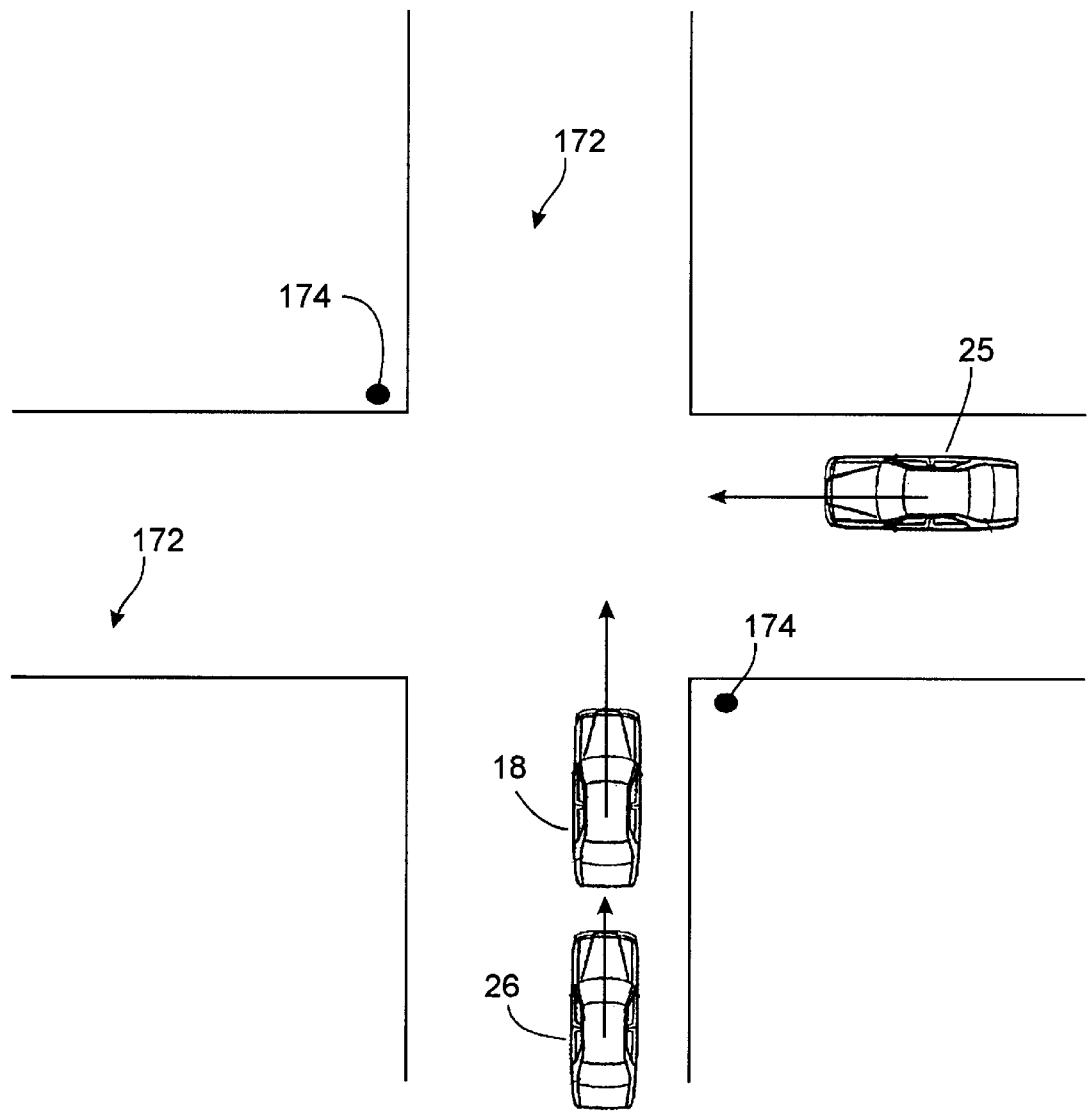

FIG. 13 illustrates an intersection with stop signs on the lesser road where there is a potential for a front to side impact and a rear end impact.

Figure 14:
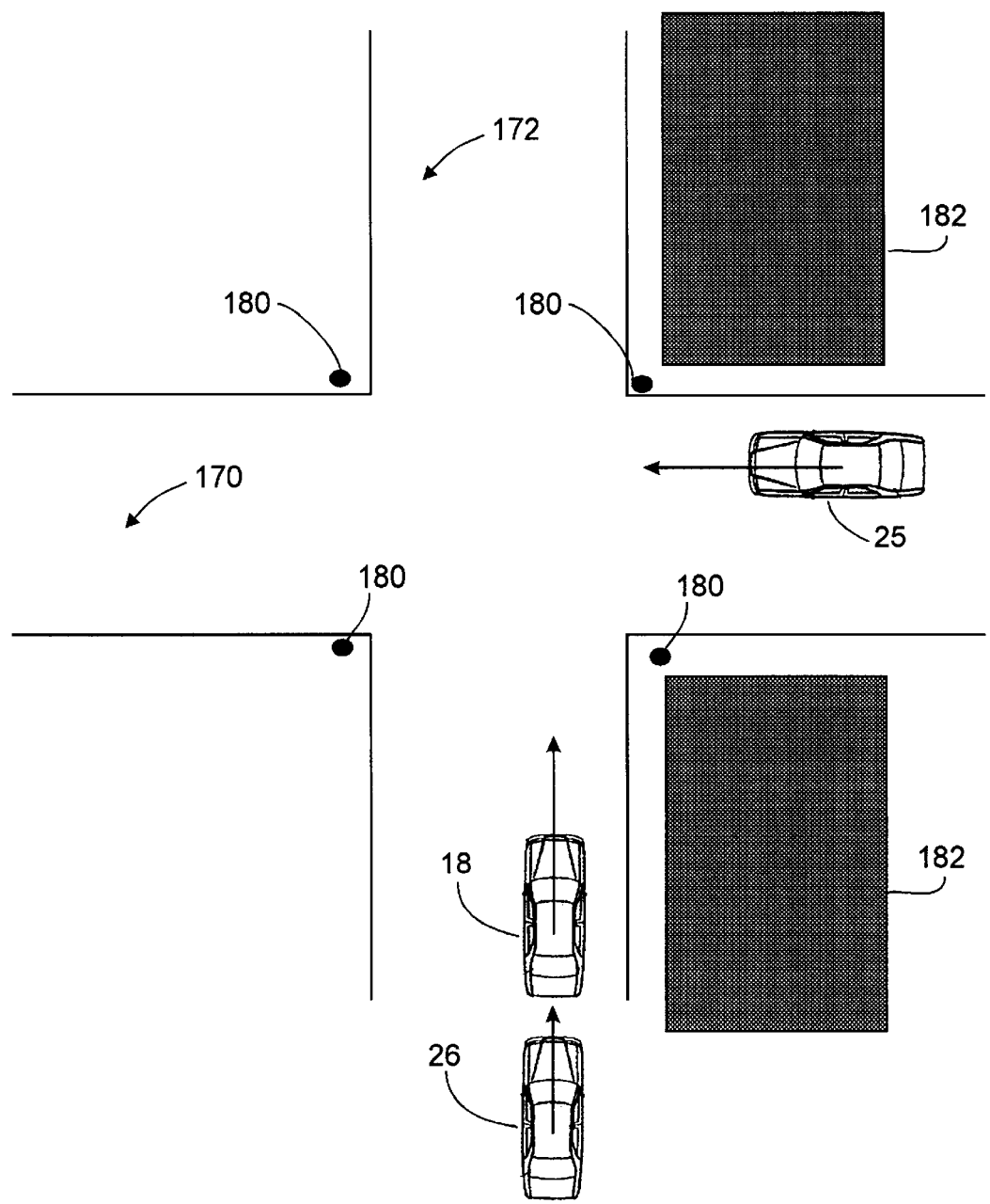

FIG. 14 illustrates a blind intersection with stoplights where there is a potential for a front side to front side impact.

Figure 15:
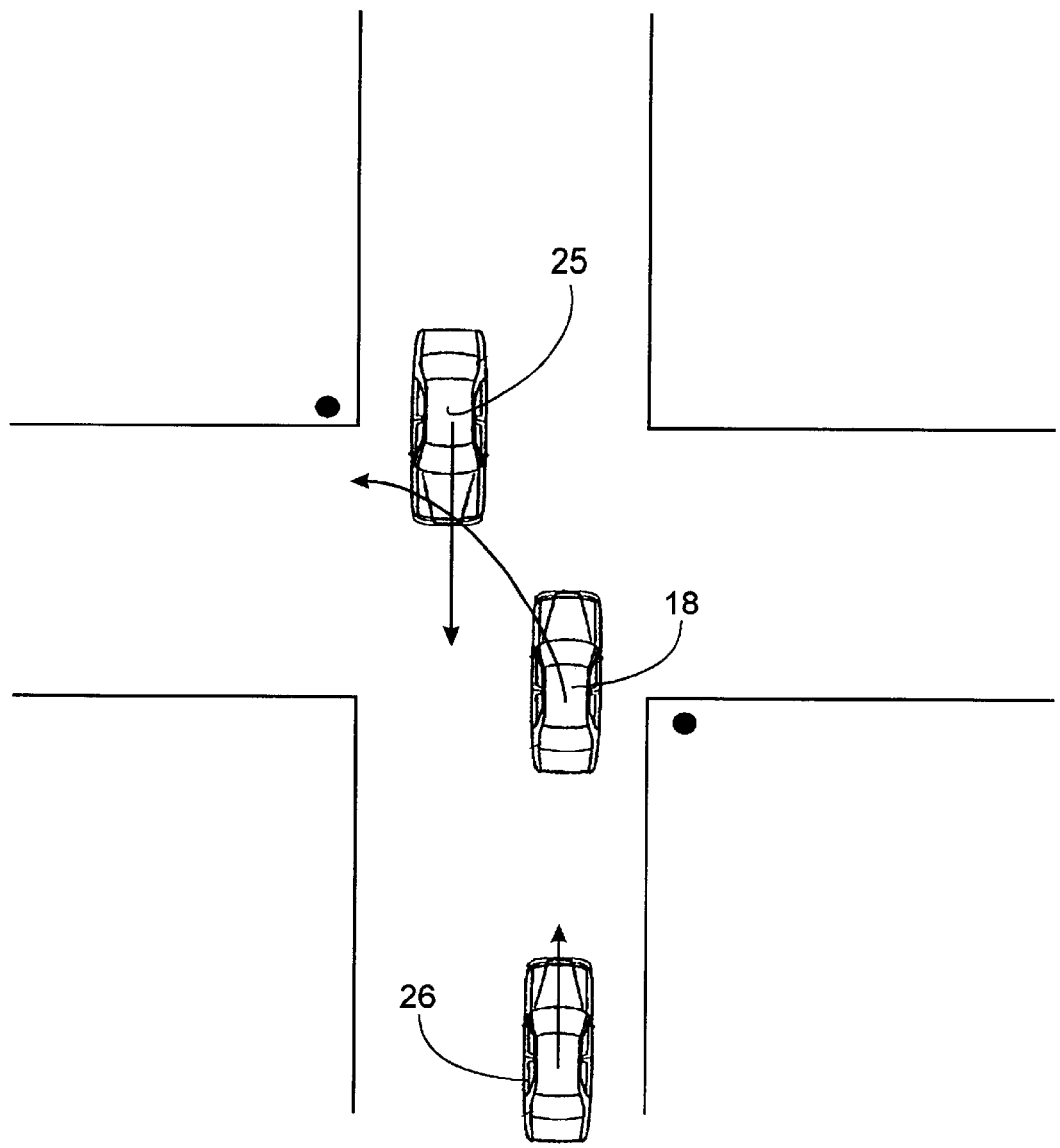

FIG. 15 illustrates an intersection where there is a potential for a front-to-front impact as a vehicle turns into oncoming traffic.

Figure 16B:
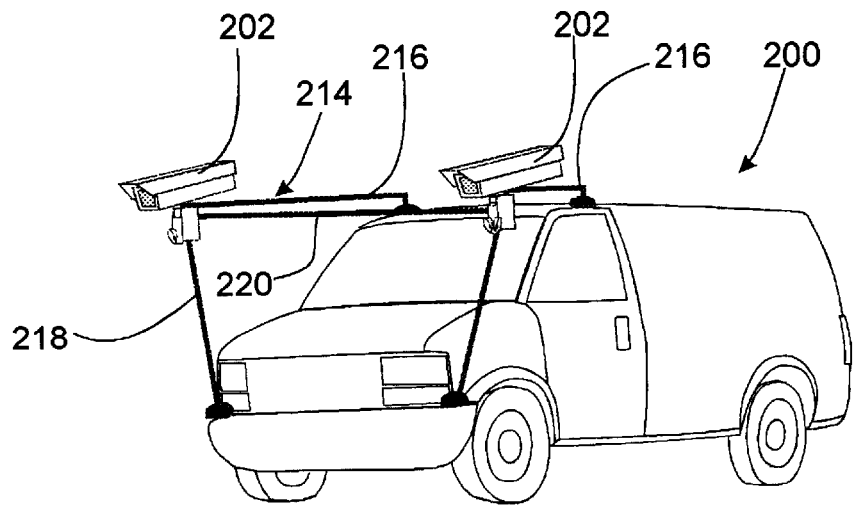
Figure 16A:
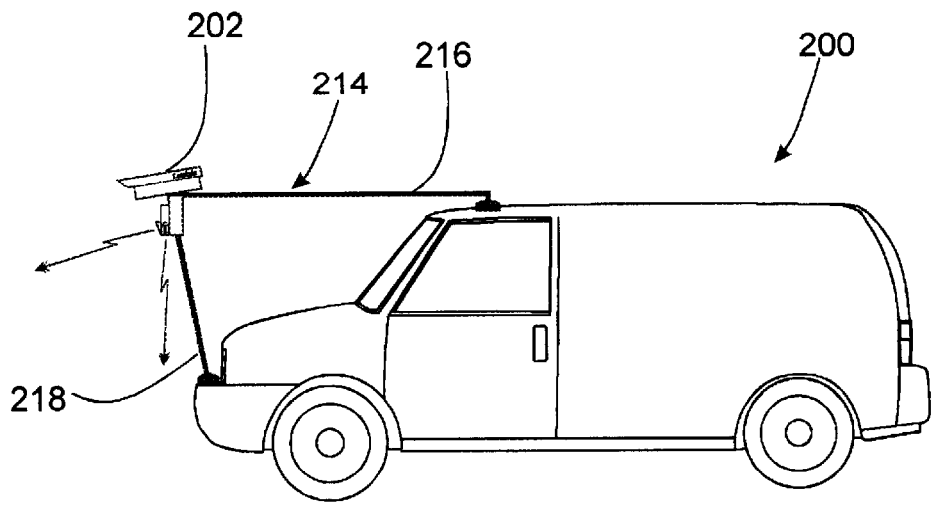

FIG. 16A is a side view of a vehicle equipped with a road-mapping arrangement in accordance with the invention.

FIG. 16B is a front perspective view of a vehicle equipped with the road-mapping arrangement in accordance with the invention.

Figure 17:
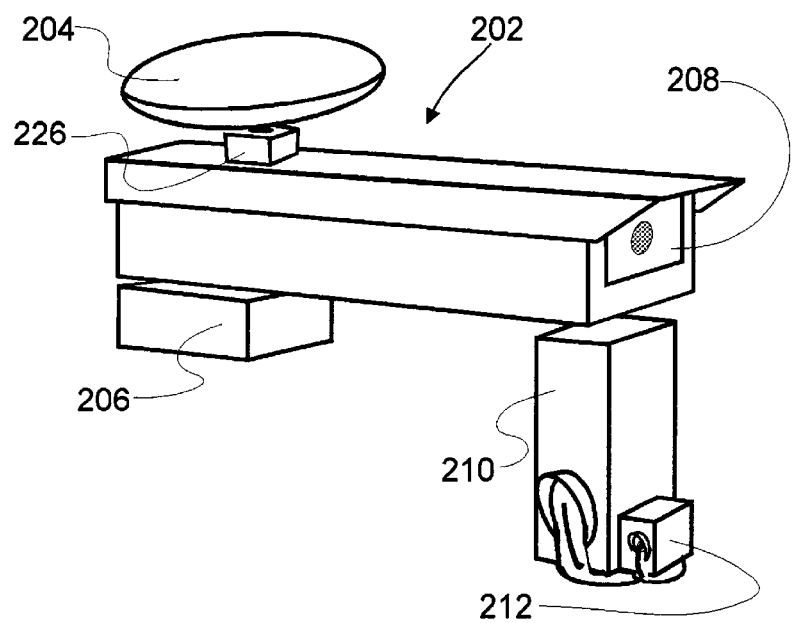

FIG. 17 is a schematic perspective view of a data acquisition module in accordance with the invention.

Figure 17A:
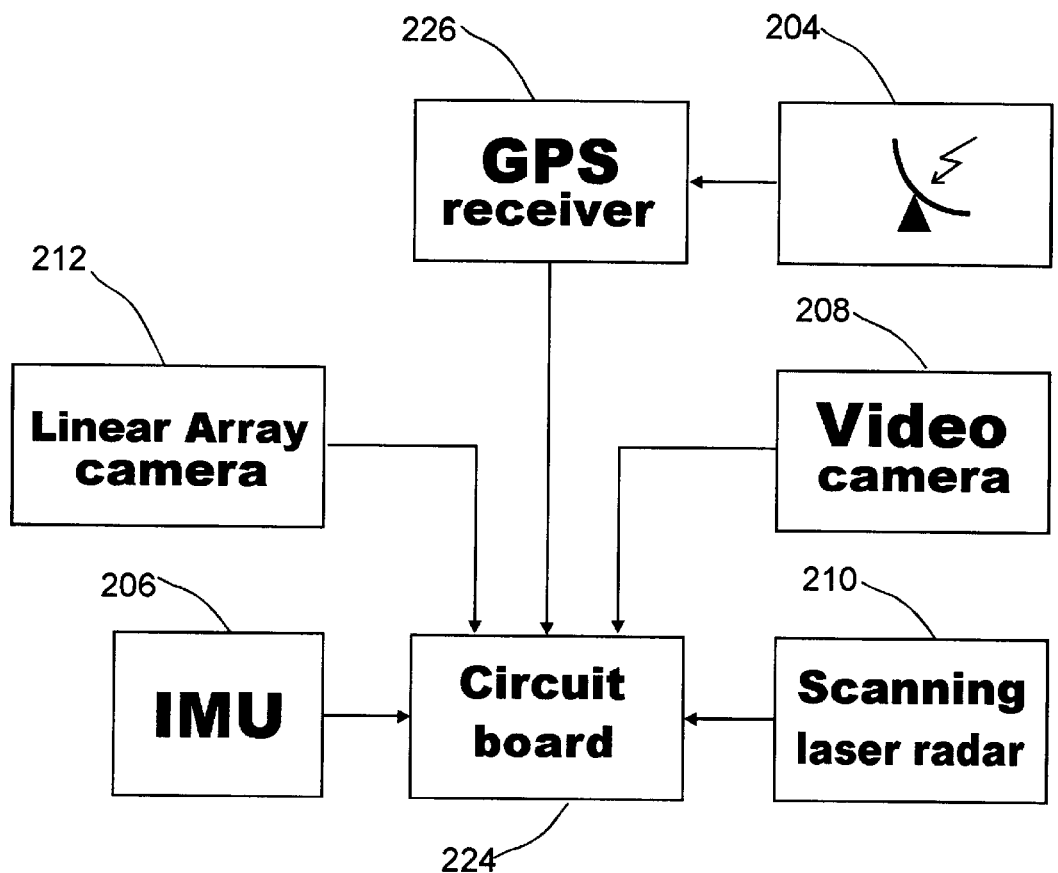

FIG. 17A is a schematic view of the data acquisition module in accordance with the invention.

Figure 18:
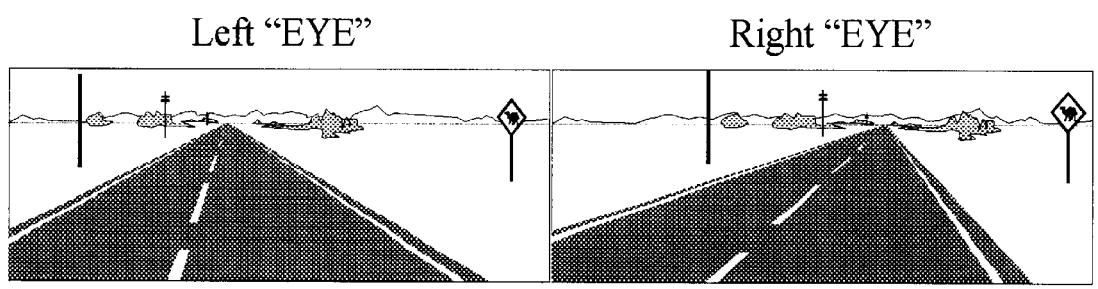

FIG. 18 shows the view of a road from the video cameras in both of the data acquisition modules.

Figure 19:
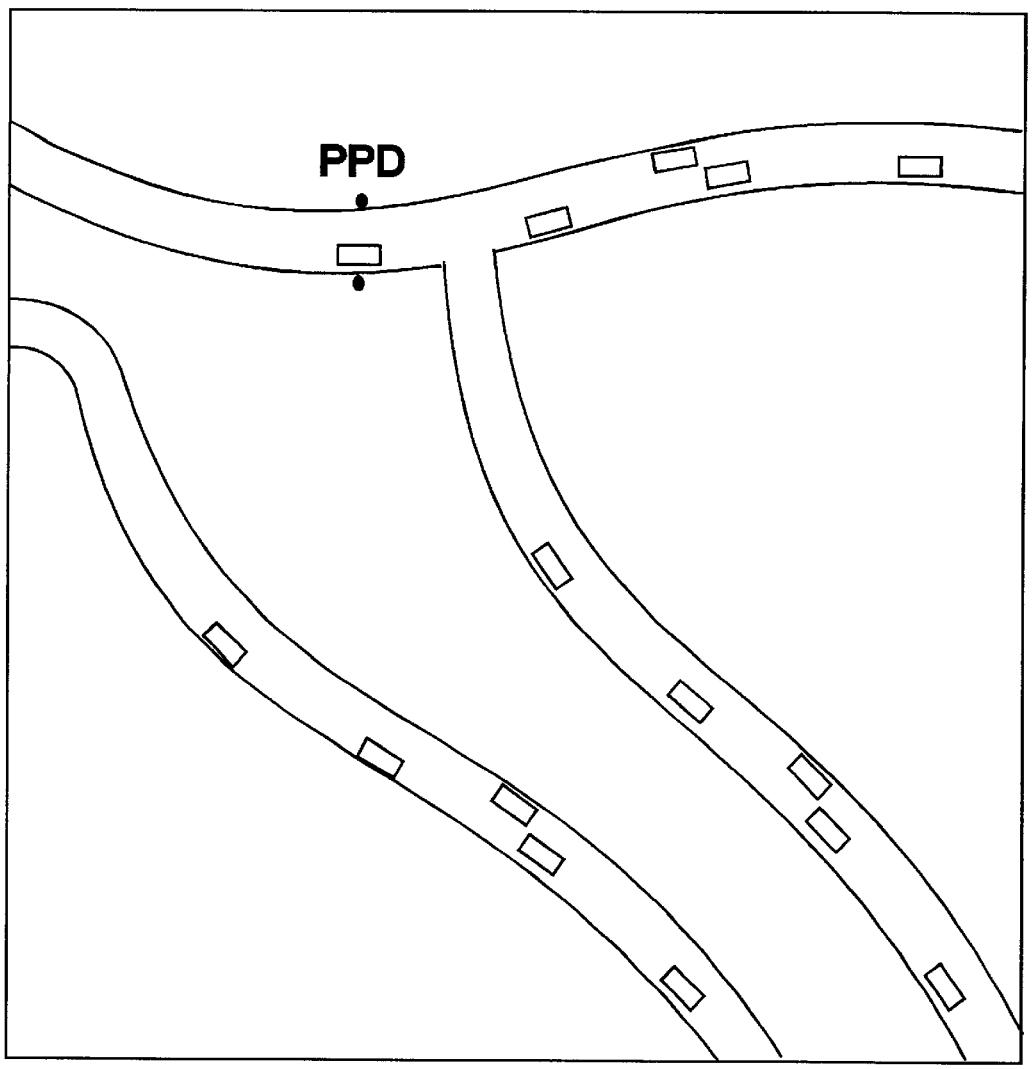

FIG. 19 shows a variety of roads and vehicles operating on those roads that are in communication with a vehicle that is passing through a Precise Positioning Station.

Figure 20:
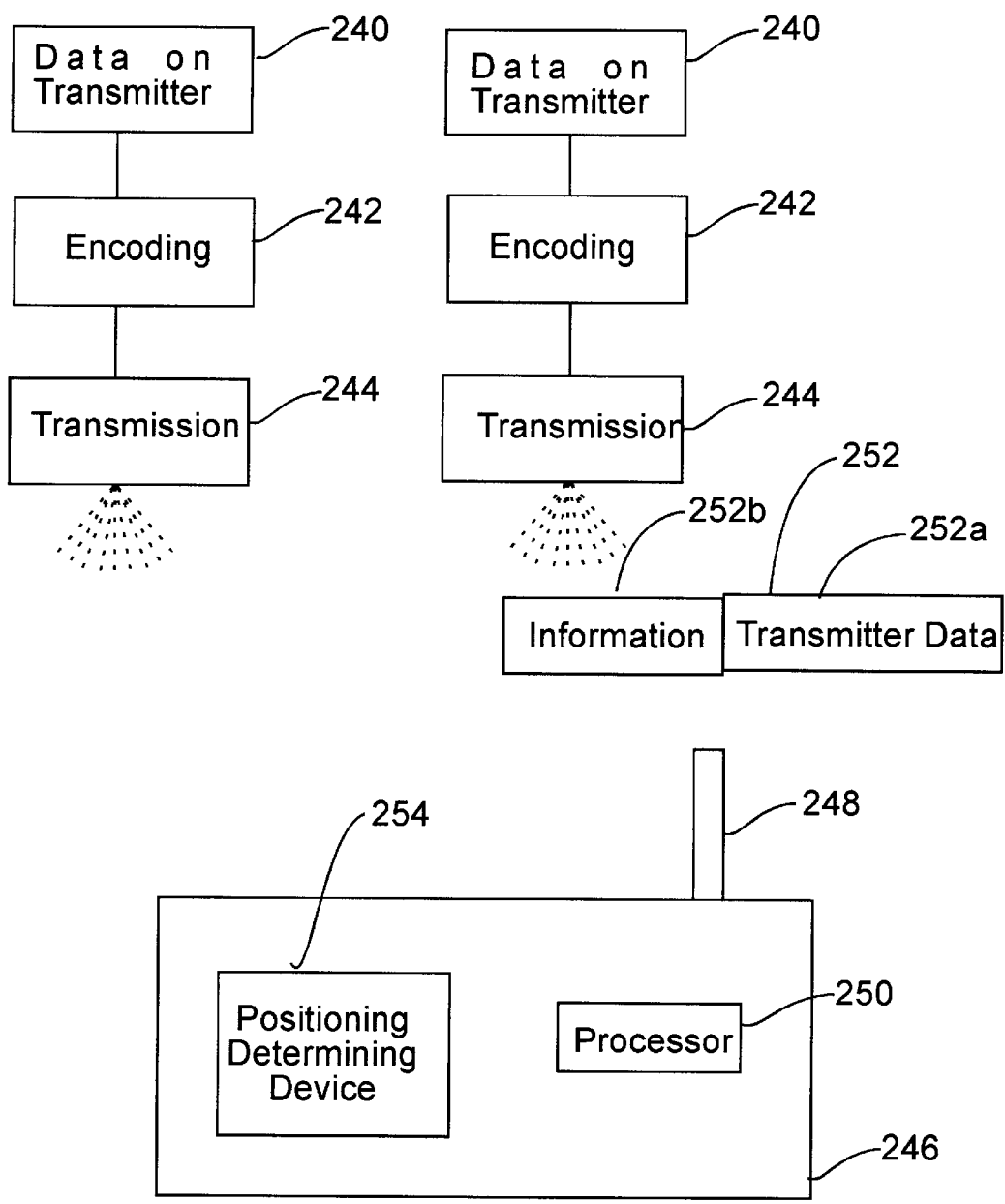

FIG. 20 is a schematic of the manner in which communications between a vehicle and a transmitter are conducted according to some embodiments of the invention.

1.6 DETAILED DISCUSSION OF THE INVENTION a. Scope of the Disclosure

The preferred embodiments of the inventions are shown in the drawings and described in the detailed description below. Unless specifically noted, it is applicants' intention that the words and phrases in the specification and claims be given the ordinary and accustomed meaning to those of ordinary skill in the applicable art(s). If applicants intend any other meaning, they will specifically state they are applying a special meaning to a word or phrase.

Likewise, applicants' use of the word "function" in the detailed description is not intended to indicate that they seek to invoke the special provisions of 35 U.S.C. Section 112, paragraph 6 to define their invention. To the contrary, if applicants wish to invoke the provision of 35 U.S.C. Section 112, paragraph 6, to define their invention, they will specifically set forth in the claims the phrases "means for" or "step for" and a function, without also reciting in that phrase any structure, material or act in support of the function. Moreover, even if applicants invoke the provisions of 35 U.S.C. Section 112, paragraph 6, to define their invention, it is applicants' intention that their inventions not be limited to the specific structure, material or acts that are described in their preferred embodiments. Rather, if applicants claim their invention by specifically invoking the provisions of 35 U.S.C. Section 112, paragraph 6, it is nonetheless their intention to cover and include any and all structures, materials or acts that perform the claimed function, along with any and all known or later developed equivalent structures, materials or acts for performing the claimed function.

For example, the present inventions make use of GPS satellite location technology, including the use of MIR or RFID triads or radar and reflectors, to derive kinematic vehicle location and motion trajectory parameters for use in a vehicle collision avoidance system and method. The inventions described herein are not to be limited to the specific GPS devices or PPS devices disclosed in the preferred embodiments, but rather, are intended to be used with any and all such applicable satellite and infrastructure location devices, systems and methods, as long as such devices, systems and methods generate input signals that can be analyzed by a computer to accurately quantify vehicle location and kinematic motion parameters in real time. Thus, the GPS and PPS devices and methods shown and referenced generally throughout this disclosure, unless specifically noted, are intended to represent any and all devices appropriate to determine such location and kinematic motion parameters.

Likewise, for example, the present inventions generate surveillance image information for analysis by scanning using any applicable image or video scanning system or method. The inventions described herein are not to be limited to the specific scanning or imaging devices disclosed in the preferred embodiments, but rather, are intended to be used with any and all applicable electronic scanning devices, as long as the device can generate an output signal that can be analyzed by a computer to detect and categorize objects. Thus, the scanners or image acquisition devices are shown and referenced generally throughout this disclosure, and unless specifically noted, are intended to represent any and all devices appropriate to scan or image a given area. Accordingly, the words "scan" or "image" as used in this specification should be interpreted broadly and generically.

Further, there are disclosed several computers or controllers, that perform various control operations. The specific form of computer is not important to the invention. In its preferred form, applicants divide the computing and analysis operations into several cooperating computers or microprocessors. However, with appropriate programming well known to those of ordinary skill in the art, the inventions can be implemented using a single, high power computer. Thus, it is not applicants' intention to limit their invention to any particular form of computer.

Further examples exist throughout the disclosure, and it is not applicants' intention to exclude from the scope of his invention the use of structures, materials, or acts that are not expressly identified in the specification, but nonetheless are capable of performing a claimed function.

b. Overview of the Invention

The above and other objects are achieved in the present invention which provides motor vehicle collision avoidance, warning and control systems and methods using GPS satellite location systems augmented with Precise Positioning Systems to provide centimeter location accuracy, and to derive vehicle attitude and position coordinates and vehicle kinematic tracking information. GPS location and computing systems being integrated with vehicle video scanning, radar, laser radar, and onboard speedometer and/or accelerometers and gyroscopes to provide accurate vehicle location information together with information concerning hazards and/or objects that represent impending collision situations for each vehicle. Advanced image processing techniques are used to quantify video information signals and to derive vehicle warning and control signals based upon detected hazards.

Outputs from multiple sensors as described above are used in onboard vehicle neural network and neural-fuzzy system computing algorithms to derive optimum vehicle warning and control signals designed to avoid vehicle collisions with other vehicles or with other objects or hazards that may be present on given roadways. In a preferred embodiment, neural fuzzy control algorithms are used to develop coordinated braking, acceleration and steering control signals to control individual vehicles, or the individual wheels of such vehicles, in an optimal manner to avoid or minimize the effects of potential collisions. Video, radar, laser radar and GPS position and trajectory information are made available to each individual vehicle describing the movement of that vehicle and other vehicles in the immediate vicinity of that vehicle.

In addition, hazards or other obstacles that may represent a potential danger to a given vehicle are also included in the neural fuzzy calculations. Objects, obstacles and/or other vehicles located anywhere to the front, rear or sides of a given vehicle are considered in the fuzzy logic control algorithms in the derivation of optimal control and warning signals.

2. DESCRIPTION OF GPS SYSTEM 2.1 Background of GPS

Figure 1:
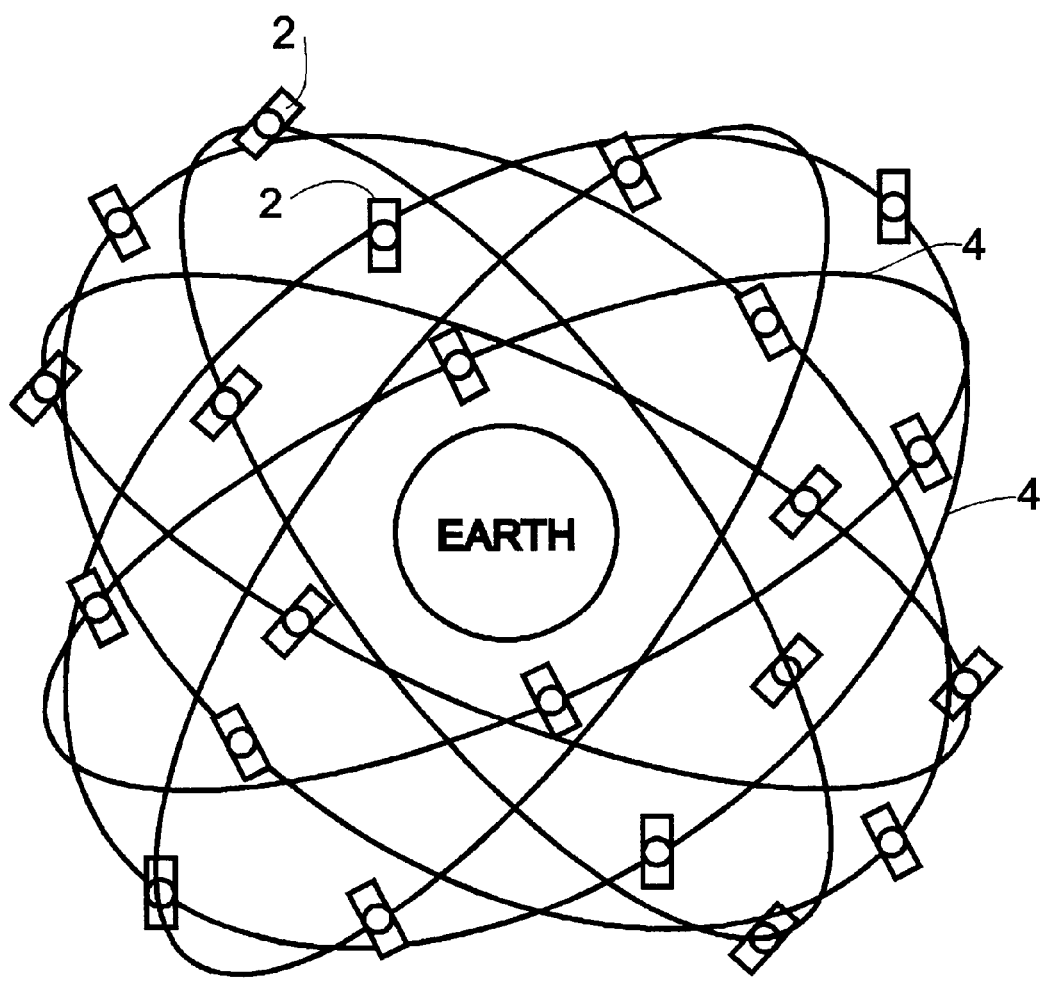
FIG. 1 illustrates the GPS satellite system with the 24 satellites revolving around the earth.

Referring to FIG. 1, the presently implemented Global Positioning System with its constellation of 24 satellites 2 is truly revolutionizing navigation throughout the world. The satellites orbit the Earth in six orbits 4. However, in order to reach its full potential for navigation, GPS needs to be augmented both to improve accuracy and to reduce the time needed to inform a vehicle driver of a malfunction of a GPS satellite, the so-called integrity problem.

The Global Positioning System (GPS) is a satellite-based navigation and time transfer system developed by the U.S. Department of Defense. GPS serves marine, airborne and terrestrial users, both military and civilian. Specifically, GPS includes the Standard Positioning Service (SPS) that provides civilian users with 100 meter accuracy as to the location or position of the user. It also serves military users with the Precise Positioning Service that provides 20-meter accuracy for the user. Both of these services are available worldwide with no requirement for any local equipment.

Differential operation of GPS is used to improve the accuracy and integrity of GPS. Differential GPS places one or more high quality GPS receivers at known surveyed locations to monitor the received GPS signals. This reference station(s) estimates the slowly varying components of the satellite range measurements, and forms a correction for each GPS satellite in view. The correction is broadcast to all DGPS users within the coverage area of the broadcast facilities.

2.2 DGPS

For a good discussion of DGPS, for following paragraphs are reproduced from OMNISTAR:

"The new OMNISTAR Model 6300A offers unprecedented versatility for portable, real-time, DGPS positioning. It can improve the accuracy of a GPS receiver by as much as 100 times. If your product or service needs precise positioning information, then chances are good that OMNISTAR can supply that need; and at a reasonable cost.

"What is a "DGPS" System?

"OMNISTAR is a Differential GPS (DGPS) System. It is capable of improving regular GPS to sub-meter accuracy.

GPS computes a user's position by measuring ranges (actually, pseudoranges; which are ranges that are calculated by an iterative process) to three or more GPS satellites simultaneously.

"A DGPS System generates corrections for GPS errors. This is accomplished by the use of one or more GPS "Base Stations" that measure the errors in the GPS system and generates corrections. A "real-time" DGPS System not only generates the corrections, but provides some methodology for getting those corrections to users as quickly as possible. This always involves some type of radio transmission system. They may use microwave systems for short ranges, low frequencies for medium ranges and geostationary satellites for coverage of entire continents.

"The method of generating corrections is similar in most DGPS systems. A GPS base station tracks all GPS Satellites that are in view at its location. The internal processor knows the precise surveyed location of the base station antenna, and it can calculate the location in space of all GPS satellites at any time by using the epheremis that is a part of the normal broadcast message from all GPS satellites. From these two pieces of information, an expected range to each satellite can be computed at any time. The difference between that computed range and the measured range is the range error. If that information can quickly be transmitted to other nearby users, they can use those values as corrections to their own measured GPS ranges to the same satellites. The key word is "quickly", because of the rapid change in the SA errors. In most radio systems, bandwidth is a finite limitation which dictates how much data can be sent in a given time period. That limitation can be eased somewhat by having the GPS base station software calculate the rate of change of the errors and add that information as part of the correction message. That term is called the range rate value and it is calculated and sent along with the range correction term. The range correction is an absolute value, in meters, for a given satellite at a given time of day. The range rate term is the rate that correction is changing, in meters per second. That allows GPS user sets to continue to use the "correction, plus the rate-of-change" for some period of time while it's waiting for a new message. The length of time you can continue to use that data without an update depends on how well the range rate was estimated. In practice, it appears that OMNISTAR would allow about 12 seconds before the DGPS error would cause a one meter position error. In other words, the "age of data" can be up to 12 seconds before the error from that term would cause a one meter position error. OMNISTAR transmits a new correction message every two and one/half seconds, so even if an occasional message is missed, the user's "age of data" is still well below 12 seconds.

"What is Unique about the OMNISTAR DGPS System?

"The OMNISTAR DGPS System was designed with the following objectives: (1) continental coverage; (2) sub-meter accuracy over the entire coverage area; and (3) a portable system (backpack). The first objective dictated that the transmission system had to be from a geostationary satellite. We purchased a transponder on satellite Spacenet 3, which is located at 87 degrees West longitude. It has an antenna pattern that covers most of North America; specifically, all of the 48 states, the northern half of Mexico and the southern half of Canada. It also has sufficient power within that footprint that a tiny omnidirectional antenna can be used at the user's receiver.

"The methodology developed by John E. Chance & Assoc. of using multiple GPS base stations in a user's solution and reducing errors due to the GPS signal traveling through the atmosphere, met the second objective. It was the first widespread use of a "Wide Area DGPS Solution". It is able to use data from a relatively small number of base stations and provide consistent accuracy over extreme distances. A unique method of solving for atmospheric delays and weighting of distant base stations, achieves sub-meter capability over the entire coverage area—regardless of the user's proximity to any base station. This achieves a truly nationwide system with consistent characteristics. A user can take the equipment anywhere within the coverage area and get consistent results, without any intervention or intimate knowledge of GPS or DGPS.

"The units being sold today are sufficiently portable that they can used in a backpack. They can include an internal GPS engine (optional) that will provide a complete solution in a single system package. All that is needed is a data collector or notebook computer for display and storage of corrected GPS data.

"How does OMNISTAR Work?

"The OMNISTAR Network consists of ten permanent base stations that are scattered throughout the Continental US, plus one in Mexico. These stations track all GPS Satellites above 5 degrees elevation and compute corrections every 600 milliseconds. The corrections are in the form of an industry standard message format called RTCM-104, Version II. The corrections are sent to the OMNISTAR Network Control Center in Houston via lease lines, with a dial back-up. At the NCC these messages are checked, compressed, and formed into a packet for transmission up to our satellite transponder. This occurs approximately every 2 to 3 seconds. A packet will contain the latest data from each of the 11 base stations.

"All OMNISTAR user sets receive these packets of data from the satellite transponder. The messages are first decoded from the spread-spectrum transmission format and then uncompressed. At that point, the message is an exact duplicate of the data as it was generated at each base station. Next, the atmospheric errors must be corrected. Every base station automatically corrects for atmospheric errors at it's location; but the user is not at any of those locations, so the corrections are not optimized for the user—and, OMNISTAR has no information as to each individual's location. If these errors are to be optimized for each user, then it must be done in each user's OMNISTAR. For this reason, each OMNISTAR user set must be given an approximation of its location. The approximation only needs to be within 50 to 100 miles of its true position. Given that information, the OMNISTAR user set can remove most of the atmospheric correction from each Base Station message and substitute a correction for his own location. In spite of the loose approximation of the user's location, this information is crucial to the OMNISTAR process. It makes the operation totally automatic and it is necessary for sub-meter positioning. If it is totally ignored, errors of up to ten meters can result.

"Fortunately, this requirement of giving the user's OMNISTAR an approximate location is easily solved. If OMNISTAR is purchased with the optional internal GPS receiver installed, the problem is taken care of automatically by using the position output of the GPS receiver as the approximation. It is wired internally to do exactly that. An alternate method—when the internal GPS receiver is not present—is to use the user's external GPS receiver for this function. In that case, the user's receiver must have an output message in one of the approved formats (NMEA) and protocols that OMNISTAR can recognize.

"That output can be connected back to the OMNISTAR set by using the same cable that normally supplies the RTCM-104 from OMNISTAR to the user's GPS receiver. This method works perfectly well when all the requirements on format and protocol are met. There is a third method, where a user uses a notebook computer to type in an estimated location into the OMNISTAR user set. Any location entered by this method is preserved—with an internal battery—until it is changed. This method works fine where the user does not intend to go more than 50–100 miles from some central location.

"After the OMNISTAR processor has taken care of the atmospheric corrections, it then uses it's location versus the eleven base station locations, in an inverse distance-weighted least-squares solution. The output of that least-squares calculation is a synthesized RTCM-104 Correction Message that is optimized for the user's location. It is always optimized for the user's location that is input from the user's GPS receiver or as an approximation that is typed in from a notebook computer. This technique is called the "Virtual Base Station Solution". It is this technique that enables the OMNISTAR user to operate independently and consistently over the entire coverage area without regard to where he is in relation to our base stations. As far as we have determined, users are obtaining the predicted accuracy over the entire area."

The above description is provided to illustrate the accuracy which can be obtained from the DGPS system. It is expected that the WAAS system when fully implemented will provide the same benefits as provided by the OMNISTAR system. However, when the standard deviation of approximately 0.5 meter is considered, it is evident that this WAAS system is insufficient by itself and will have to be augmented by other systems to improve the accuracy at least at this time.

GLONASS is a Russian system similar to GPS. This system provides accuracy that is not as good as GPS.

The Projected Position Accuracy of GPS and GLONASS, Based on the Current Performance is:
Horizontal Error (m) Vertical Error (m)

|  | (50%) | (95%) | (95%) |
|---|---|---|---|
| GPS | 7 | 18 | 34 |
| GLONASS | 10 | 26 | 45 |

The system described here will achieve a higher accuracy than reported in the above table due to the combination of the inertial guidance system that permits accurate changes in position to be determined and through multiple GPS readings. In other words, the calculated position will converge to the real position over time. The addition of DGPS will provide an accuracy improvement of at least a factor of 10, which, with the addition of a sufficient number of DGPS stations in some cases is sufficient without the use of the carrier frequency correction. A further refinement where the vehicle becomes its own DGPS station through the placement of infrastructure stations at appropriate locations on roadways will further significantly enhance the system accuracy to the required level.

Multipath is the situation where more than one signal from a satellite comes to a receiver with one of the signals resulting from a reflection off of a building or the ground, for example. Since multipath is a function of geometry, the system can be designed to eliminate its effects based on highway surveying and appropriate antenna design. Multipath from other vehicles can also be eliminated since the location of the other vehicles will be known.

As discussed below, the Wide Area Augmentation System (WAAS) is being installed by the US Government to provide DGPS for airplane landings. The intent is to cover the entire continental U.S. (CONUS). This may be useful for much of the country for the purposes of this invention. Another alternative would be to use the cellular phone towers, since there are so many of them, if they could be programmed to act as pseudolites.

An important feature of DGPS is that the errors from the GPS satellites change slowly with time and therefore, only the corrections need be sent to the user from time to time. Using reference receivers separated by 25–120 km, accuracies from 2 cm to 1 m are achievable using local area DGPS which is marginal for RtZF™. Alternately, through the placement of appropriate infrastructure as described below even better accuracies are obtainable.

A type of wide area DGPS (WADGPS) system has been developed spans the entire US continent which provides position RMS accuracy to better than 50 cm. This system is described in the Bertiger, et al, "A Prototype Real-Time Wide Area Differential GPS System," Proceedings of the National Technical Meeting, Navigation and Positioning in the Information Age, Institute of Navigation, Jan. 14–16, 1997 pp. 645–655. A RMS error of 50 cm would be marginally accurate for RtZF™. Many of the teachings of this invention, especially if the road edge and lane location error were much less, could be accomplished using more accurate surveying equipment. The OmniSTAR system is another WADGPS system that claims 6 cm (1σ) accuracy.

A similar DGPS system which is now being implemented on a nationwide basis is described in "DGPS Architecture Based on Separating Error Components, Virtual Reference Stations and FM Subcarrier Broadcast", by Differential Corrections Inc., 10121 Miller Ave., Cupertino, Calif. 95041 The system described in this paper promises an accuracy on the order of 10 cm.

Suggested DGPS update rates are usually less than twenty seconds. DGPS removes common-mode errors, those errors common to both the reference and remote receivers (not multipath or receiver noise). Errors are more often common when receivers are close together (less than 100 km). Differential position accuracies of 1–10 meters are possible with DGPS based on C/A code SPS signals.

Using the CNET commercial system, 1 foot accuracies are possible if base stations are no more than 30 miles from the vehicle unit. This would require approximately 1000 base stations to cover CONUS. Alternately, the same accuracy is obtainable if the vehicle can become its own DGPS system every 30 miles as described herein.

Unfortunately, the respective error sources mentioned above rapidly decorrelate as the distances between the reference station and the vehicle increases. Conventional DGPS is the terminology used when the separation distances are sufficiently small that the errors cancel. The terms single-reference and multi-reference DGPS are occasionally used in order to emphasize whether there is a single reference station or whether there are multiple ones. If it is desired to increase the area of coverage and, at the same time, to minimize the number of fixed reference receivers, it becomes necessary to model the spatial and temporal variations of the residual errors. Wide Area Differential GPS (WADGPS) is designed to accomplish this. Funds have now been appropriated for the US Government to deploy a national DGPS system.

2.3 Pseudolites

Pseudolites are artificial satellite like structures, located on the earth surface, that can be deployed to enhance the accuracy of the DGPS system. Such structures could become part of the RtZF™ system.

2.4 WAAS

The Wide Area Augmentation System (WAAS) is being deployed to replace the Instrument Landing System used at airports across the country. The WAAS system provides an accuracy of from about 1 to 2 meters for the purpose of aircraft landing. If the vertical position of the vehicle is known, as would be in the case of automobiles at a known position on a road, this accuracy can be improved significantly. Thus, for many of the purposes of this invention, the WAAS can be used to provide accurate positioning information for vehicles on roadways. The accuracy of the WAAS is also enhanced by the fact that there is an atomic clock in every WAAS receiver station that would be available to provide great accuracy using carrier phase data. With this system sub-meter accuracies are possible for some locations.

The WAAS is based on a network of approximately 35 ground reference stations. Signals from GPS satellites are received by aircraft receivers as well as by ground reference stations. Each of these reference stations is precisely surveyed, enabling each to determine any error in the GPS signals being received at its own location. This information is then passed to a wide area master station. The master station calculates correction algorithms and assesses the integrity of the system. This data is then put into a message format and sent to a ground earth station for uplink to a geostationary communications satellite. The corrective information is forwarded to the receiver on board the aircraft, which makes the needed adjustments. The communications satellites also act as additional navigation satellites for the aircraft, thus, providing additional navigation signals for position determination.

This system will not meet all of FAA's requirements. For category III landings, the requirement is 1.6-m vertical and horizontal accuracy. To achieve this, FAA is planning to implement a network of local area differential GPS stations that will provide the information to aircraft. This system is referred to as the Local Area Augmentation System (LAAS).

The WAAS system, which consists of a network of earth stations and geo-synchronous satellites, is currently being funded by the U.S. Government for aircraft landing purposes. Since the number of people that die yearly in automobile accidents greatly exceeds those killed in airplane accidents, there is clearly a greater need for a WAAS type system for solving the automobile safety problem using the teachings of this invention. Also, the reduction in required highway funding resulting from the full implementation of this invention would more than pay for the extension and tailoring of the WAAS to cover the nations highways.

2.5 LAAS

The Local Area Augmented System (LAAS) is also being deployed in addition to the WAAS system to provide even greater coverage for the areas surrounding major airports. According to Newsletter of the Institute of Navigation, 1997, "the FAA's schedule for (LAAS) for Category II and III precision instrument approaches calls for development of standards by 1998 that will be sufficient to complete a prototype system by 2001. The next step will be to work out standards for an operational system to be fielded in about 2005, that could serve nationwide up to about 200 runways for Cat II–III approaches."

In a country like the United States, which has many airfields, a WAAS can serve a large market and is perhaps most effective for the control of airplane landings. The best way for other countries, with fewer airports, to participate in the emerging field of GPS-based aviation aids may be to build LAAS. In countries with a limited number of airports, LAAS is not very expensive while the costs of building a WAAS to get Category I type accuracy is very expensive. However, with the added benefit of less highway construction and greater automobile safety, the added costs for a WAAS system may well be justified for much of the world.

For the purposes of the RtZF™ system, both the WAAS and LAAS would be useful but probably insufficient unless the information is used in a different mathematical system such as used by the OmniStar™ WADGPS system. Unlike an airplane, there are many places where it might not be possible to receive LAAS and WAAS information or even more importantly the GPS signals themselves with sufficient accuracy and reliability. Initial RtZF™ systems may therefore rely on the WAAS and LAAS but as the system develops more toward the goal of zero fatalities, road based systems which permit a vehicle to pinpoint its location will be preferred. However, there is considerable development ongoing in this field so that all systems are still candidates for use with RtZF™ system and the most cost effective will be determined in time.

2.6 Carrier Phase Measurements

An extremely accurate form of GPS is Carrier Based Differential GPS. This form of GPS utilizes the 1.575 GHz carrier component of the GPS signal on which the Pseudo Random Number (PRN) code and the data component are superimposed. Current versions of Carrier Based Differential GPS involve generating position determinations based on the measured phase differences at two different antennas, a base station or pseudolite and the vehicle, for the carrier component of a GPS signal. This technique initially requires determining how many integer wave-lengths of the carrier component exist between the two antennas at a particular point in time. This is called integer ambiguity resolution. A number of approaches currently exist for integer ambiguity resolution. Some examples can be found in U.S. Pat. Nos. 5,583,513 and 5,619,212. Such systems can achieve sub-meter accuracies and, in some cases, accuracies of about 1 cm or less. U.S. Pat. No. 5,477,458 discloses a DGPS system that is accurate to about 5 cm with the base stations located on a radius of about 3000 km. With such a system, very few base stations would be required to cover the continental United States. This system still suffers from the availability of accurate signals at the vehicle regardless of its location on the roadway and the location of surrounding vehicles and objects. Nevertheless, the principle of using the carrier frequency to precisely determine the location of a vehicle can be used with the highway based systems described below to provide extreme location accuracies. Using the PPS system described below where a vehicle becomes its own DGPS system, the carrier phase ambiguity problem also disappears since the number of cycles can be calculated if the precise location is known. There is no ambiguity when the vehicle is at the PPS station and that is maintained as long as the lock on a satellite is not lost for more than a few minutes. This assumes that there is an accurate clock within the vehicle.

2.7 Other Aids

There are other sources of information that can be added to increase the accuracy of position determination. The use of GPS with four satellites provides the three dimension location of the vehicle plus time. Of the dimensions, the vertical is the least accurately known, yet, if the vehicle knows where it is on the roadway, the vertical dimension is not only the least important but it is also already accurately known from the roadmap information plus the inertial guidance system.

Another aid is to provide markers along side the roadway which can be either visual, passive or active transponders, reflectors, or a variety of other technologies, which have the property that as a vehicle passes the marker it can determine the identity of the marker and from a database it can determine the exact location of the marker. If three or more of such markers are placed along side of the roadway, a passing vehicle can determine its exact location by triangulation. Note that even with two such markers using radar with distance measuring capability, the precise position of a vehicle can be determined as discussed below in reference to the Precise Positioning System. In fact, if the vehicle is only able to observe a single radar reflector and take many readings as the reflector is passed, it can determine quite accurately its position based on the minimum distance reading that is obtained during the vehicle's motion past the reflector. Although it may be impractical to initially place such markers along all roadways, it would be reasonable to place them in particularly congested areas or places where it is known that a view of one or more of the GPS satellites is blocked. A variation of this concept will be discussed below.

Although initially it is preferred to use the GPS navigational satellites as the base technology, the invention is not limited thereby and contemplates using all methods by which the location of the vehicle can be accurately determined relative to the earth surface. The location of the roadway boundaries and the location of other vehicles relative to the earth surface are also to be determined and all relevant information used in a control system to substantially reduce and eventually eliminate vehicle accidents. Only time and continued system development will determine the mix of technologies that provide the most cost effective solution. All forms of information and methods of communication to and between vehicles are contemplated including direct communication with stationary and moving satellites, communication with fixed earth-based stations using infrared, optical, radar, radio and other segments of the electromagnetic spectrum and inter-vehicle communication. Some additional examples follow:

A pseudo-GPS can be delivered from cell phone stations, in place of or in addition to satellites. In fact, the precise location of a cell phone tower need not initially be known. If it monitors the GPS satellites over a sufficiently long time period, the location can be determined as the calculated location statistically converges to the exact location. Thus, every cell phone tower could become an accurate DGPS base station for very little cost. DGPS corrections can be communicated to a vehicle via FM radio via a sub-carrier frequency for example. An infrared or radar transmitter along the highway can transmit road boundary location information. A CD-ROM or other portable mass storage can be used at the beginning of a controlled highway to provide road boundary information to the vehicle. Finally, it is contemplated that eventually a satellite will broadcast periodically, perhaps every five minutes, a table of dates covering the entire CONUS that provides the latest update date of each map segment. If a particular vehicle does not have the latest information for a particular region where it is operating, it will be able to use its cell phone or other communication system to retrieve such road maps perhaps through the Internet or from an adjacent vehicle. Emergency information would also be handled in a similar manner so that if a tree fell across the highway, for example, all nearby vehicles would be notified.

2.8 Other Location Fixing Systems

It is expected, especially initially, that there will be many holes in the DGPS or GPS and their various implementations that will leave the vehicle without an accurate means of determining its location. The inertial navigation system described below will help in filling these holes but its accuracy is limited to a time period significantly less than an hour and a distance of less than 50 miles before it needs correcting. That may not be sufficient to cover the period between DGPS availability. It is therefore contemplated that the RtZF™ system will also make use of low cost systems located along the roadways that permit a vehicle to accurately determine its location. One example of such a system would be to use a group of three Micropower Impulse Radar (MIR) units such as developed by Lawrence Livermore Laboratory.

A MIR operates on very low power and periodically transmits a very short spread spectrum radar pulse. The estimated cost of a MIR is less than $10 even in small quantities. If three such MIR transmitters, 151, 152 and 153, as shown in FIG. 11, are placed along the highway and triggered simultaneously or with a known delay, and if a vehicle has an appropriate receiver system, the time of arrival of the pulses can be determined and thus the location of the vehicle relative to the transmitters determined. The exact location of the point where all three pulses arrive simultaneously would be the point that is equi-distant from the three transmitters and would be located on the map information. Only three devices are required since only two dimensions need to be determined since it is assumed that the vehicle in on the road and thus the vertical position is known, otherwise four MIRs would be required. Thus it would not even be necessary to have the signals contain identification information since the vehicle would not be so far off in its position determination system to confuse different locations. By this method, the vehicle would know exactly where it was whenever it approached and passed such a triple-MIR installation. The MIR triad PPS or equivalent could also have a GPS receiver and thereby determine its exact location over time as described above for cell phone towers. After the location has been determined, the GPS receiver can be removed. In this case, the MIR triad PPS or equivalent could be placed at will and they could transmit their exact location to the passing vehicles. An alternate method would be to leave the GPS receiver with the PPS time of arrival of the GPS data from each satellite so that the passing vehicles that do not go sufficiently close to the PPS can still get an exact location fix. A similar system using RFID tags is discussed below.

Naturally, several such readings and position determinations can be made with one approach to the MIR installation, the vehicle need not wait until they all arrive simultaneously. Also the system can be designed so that the signals never arrive at the same time and still provide the same accuracy as long as there is a sufficiently accurate clock on board the vehicle. One way at looking at FIG. 11 is that transmitters 151 and 152 fix the lateral position of the vehicle while transmitters 151 and 153 fix the location of the vehicle longitudinally. The three transmitters 151,152,153 need not be along the edges on one lane but could span multiple lanes and they need not be at ground level but could be placed sufficiently in the air so that passing trucks would not block the path of the radiation from an automobile. Particularly in congested areas, it might be desirable to code the pulses and to provide more than three transmitters to further protect against signal blockage or multipath.

The power requirements for the MIR transmitters are sufficiently low that a simple photoelectric cell array can provide sufficient power for most if not all CONUS locations. With this exact location information, the vehicle can become its own DGPS station and can determine the corrections necessary for the GPS. It can also determine the integer ambiguity problem and thereby know the exact number of wave lengths between the vehicle and the satellites or between the vehicle and the MIR station.

MIR is one of several technologies that can be used to provide precise location determination. Others include the use of an RFID tag that is designed in cooperation with its interrogator to provide a distance to the tag measurement. Such as RFID can be either an active with an internal battery, passive obtaining its power from an RF interrogation signal to charge a capacitor or a SAW based tag operating without power. An alternate and preferred system uses radar or other reflectors where the time of flight can be measured, as disclosed in more detail elsewhere herein.

Once a vehicle passes a Precise Positioning Station (PPS) such as the MIR triad described above, the vehicle can communicate this information to surrounding vehicles. If the separation distance between two communicating vehicles can also be determined by the time-of-flight method, then the vehicle that has just passed the triad can, in effect, become a satellite equivalent or moving pseudolite. Finally, if many vehicles are communicating their,positions to many other vehicles along with an accuracy of position assessment, each vehicle can use this information along with the calculated separation distances to improve the accuracy that its position is known. In this manner, as the number of such vehicles increases the accuracy of the whole system increases until an extremely accurate positioning system for all vehicles results. Such a system, since it combines many sources of position information, is tolerant of the failure of any one or even several such sources. Thus, the RtZF™ system becomes analogous to the Internet in that it can't be shut down and the goal of perfection is approached. Some of the problems associated with this concept will be discussed in more detail below.

2.9 Inertial Navigation System

In many cases, especially before the system implementation becomes mature and the complete infrastructure is in place, there will be times when a particular vehicle system is not operational. This could be due to obstructions hiding a clear view of a sufficient number of GPS satellites, such as when a vehicle enters a tunnel. It could also be due to a lack of road boundary information, due to construction or the fact that the road has not been surveyed and the information recorded and made available to the vehicle, or a variety of other causes. It is contemplated, therefore, that each equipped vehicle will contain a warning light or other system that warns the driver or the vehicle control system when the system is not operational. If this occurs on one of the especially designated highway lanes, the vehicle speed will be reduced until the system again becomes operational.

When the system is non-operational for a short distance, the vehicle will still accurately know its position if there is, in addition, one or more laser gyroscopes, micromachined angular rate sensors or equivalent, and one or more accelerometers that together are referred to as an Inertial Navigation System (INS) or inertial measurement unit (IMU). Generally, such an INS will have three gyroscopes and three accelerometers.

As more sensors which are capable of providing information on the vehicle position, velocity and acceleration are added onto the vehicle, the system can become sufficiently complicated as to require a Kalman filter, neural network, or neural-fuzzy, system to permit the optimum usage of the available information. This becomes even more important when information from outside the vehicle other than the GPS related systems becomes more available. For example, a vehicle may be able to communicate with other vehicles that have similar systems and learn their estimated location. If the vehicle can independently measure the position of the other vehicle, for example through the use of the scanning laser radar system described below, and thereby determine the relative position of the two or more vehicles, a further improvement of the position can be determined for all such vehicles. Adding all such additional information into the system would probably require a computational method such as Kalman filters, neural networks or a combination thereof and a fuzzy logic system.

3.0 CONCLUSION—HOW USED

One way to imagine the system operation is to consider each car and roadway edge to behave as if it had a surrounding "force field" that would prevent it from crashing into another vehicle or an obstacle along the roadway. A vehicle operator would be prevented from causing his or her vehicle to leave its assigned corridor. This is accomplished with a control system that controls the steering, acceleration and perhaps the vehicle brakes based on its knowledge of the location of the vehicle, highway boundaries and other nearby vehicles. In a preferred implementation, the location of the vehicle is determined by first using the GPS L1 signal to determine its location within approximately 100 meters. Then using DGPS and corrections which are broadcast whether by FM or downloaded from geo-synchronous or Low Earth Orbiting (LEO) satellites or obtained from another vehicle or road-based transmitters to determine its location within less than about 10 centimeters. Finally the use of a PPS periodically permits the vehicle to determine its exact location and thereby determine the GPS corrections, eliminate the carrier cycle ambiguity and set the INS system. If this is still not sufficient, then the phase of the carrier frequency provides the required location information to less than a few centimeters. Dead reckoning, using vehicle speed, steering angle and tire rotation information and/or inertial guidance, can be used to fill in the gaps. Where satellites are out of view, pseudolites, or other systems, are placed along the highway. A pulsed scanning infrared laser radar system, or an equivalent system, is used for obstacle detection. Communication to other vehicles is by short distance radio or by spread spectrum time domain pulse radar.

One problem which will require addressing as the system becomes mature is temporary blockage of a satellite by large trucks or other movable objects whose location cannot be foreseen by the system designers. Another concern is to prevent vehicle owners from placing items on the vehicle exterior that block the GPS and communication antennas.

3. COMMUNICATION WITH OTHER VEHICLES—COLLISION AVOIDANCE

MIR might also be used for vehicle to vehicle communication except that it is line of sight. An advantage is that we can know when a particular vehicle will respond by range gating. Also, the short time of transmission permits many vehicles to communicate at the same time. The preferred system is to use spread spectrum carrier-less coded channels.

3.1 Description—Requirements

The communication between vehicles for collision avoidance purposes cannot solely be based on line-of-sight technologies as this is, not sufficient since vehicles which are out of sight can still cause accidents. On the other hand, vehicles that are a mile away from one another but still in sight, need not be part of the communication system for collision avoidance purposes. Messages sent by each vehicle, in accordance with an embodiment of the invention, could contain information indicating exactly where it is located and perhaps information as to what type of vehicle it is. The type of vehicle can include emergency vehicles, construction vehicles, trucks classified by size and weight, automobiles, and oversized vehicles. The subject vehicle can therefore eliminate all of those vehicles that are not potential threats, even if such vehicles are very close, but on the other side of the highway barrier.

The use of an Ethernet protocol will satisfy the needs of the network, consisting of all threatening vehicles in the vicinity of the subject vehicle. Alternately, a network where the subject vehicle transmits a message to a particular vehicle and waits for a response could be used. From the response time, the relative position of other vehicles can be ascertained which provides one more method of position determination. Thus, the more vehicles that are on the road with the equipped system, the greater accuracy of the overall system and the safer the system becomes, as described above.

To prevent accidents caused by a vehicle leaving the road surface and impacting a roadside obstacle requires only an accurate knowledge of the position of the vehicle and the road boundaries. To prevent collisions with other vehicles requires that the position of all nearby automobiles must be updated continuously. But just knowing the position of a threatening vehicle is insufficient. The velocity, size and orientation of the vehicle are also important in determining what defensive action or reaction may be required. Once all vehicles are equipped with the system of this invention, the communication of all relevant information will take place via a communication link, e.g., a radio link. In addition to signaling its absolute position, each vehicle will send a message identifying the approximate mass, velocity, orientation, and other relevant information. This has the added benefit that emergency vehicles can make themselves known to all vehicles in their vicinity and all such vehicles can then take appropriate action. The same system can also be used to relay accident or other hazard information from vehicle to vehicle.

U.S. Pat. No. 5,128,669 to Dabbs provides for 2-way communication and addressing messages to specific vehicles. This is unnecessary and the communications can be general since the amount of information that is unique to one vehicle is small. A method of handing bi-directional communication is disclosed in U.S. Pat. No. 5,506,584 to Boles. The preferred vehicle to vehicle communication system using pseudonoise techniques is more thoroughly discussed below.

3.2 A Preferred System

One preferred method of communication between vehicles uses that portion of the electromagnetic spectrum that permits only line of sight communication. In this manner, only those vehicles that are in view can communicate. In most cases, a collision can only occur between vehicles that can see each other. This system has the advantage that the "communications network" only contains nearby vehicles. This would require that when a truck, for example, blocks another stalled vehicle that the information from the stalled vehicle be transmitted via the truck to a following vehicle. An improvement in this system would use a rotating aperture that would only allow communication from a limited angle at a time further reducing the chance for multiple messages to interfere with each other. Each vehicle transmits at all angles but receives at only one angle at a time. This has the additional advantage of confirming at least the direction of the transmitting vehicle. An infrared rotating receiver can be looked at as similar to the human eye. That is, it is sensitive to radiation from a range of directions and then focuses in on the particular direction, one at a time, from which the radiation is coming. It does not have to scan continuously. In fact, the same transmitter which transmits 360 degrees could also receive from 360 degrees with the scanning accomplished using software.

An alternate preferred method is to use short distance radio communication so that a vehicle can receive position information from all nearby vehicles such as the DS/SS system. The location information received from each vehicle can then be used to eliminate it from further monitoring if it is found to be on a different roadway or not in a potential path of the subject vehicle.

Many communications schemes have been proposed for inter-vehicle and vehicle-to-road communication. At this time, a suggested approach utilizes DS/SS communications in the 2.4 GHz INS band. Experiments have shown that communications are 100 percent accurate at distances up to 200 meters. At a closing velocity of 200 KPH, at 0.5 g deceleration, it requires 30 meters for a vehicle to stop. Thus, communication accurate to 200 meters is sufficient to cover all vehicles that are threatening to a particular vehicle.

A related method would be to use a MIR system in a communications mode. Since the width of the pulses typically used by MIR is less than a nanosecond, many vehicles can transmit simultaneously without fear of interference. Other spread spectrum methods based on ultra wideband or noise radar are also applicable. In particular, as discussed below, a communication system based on correlation of pseudorandom or other codes is preferred.

With either system, other than the MIR system, the potential exists that more than one vehicle will attempt to send a communication at the same time and there will then be a 'data collision'. If all of the communicating vehicles are considered as being part of a local area network, the standard Ethernet protocol can be used to solve this problem. In that protocol, when a data collision occurs, each of the transmitting vehicles which was transmitting at the time of the data collision would be notified that a data collision had occurred and that they should retransmit their message at a random time later. When several vehicles are in the vicinity and there is the possibility of collisions of the data, each vehicle can retain the coordinates last received from the surrounding vehicles as well as their velocities and predict their new locations even though some data was lost.

If a line of sight system is used, an infrared or MIR system would be good choices. In the infrared case, and if an infrared system were also used to interrogate the environment for non-equipped vehicles, pedestrians, animals etc., as discussed below, both systems could use some of the same hardware.

If point-to-point communication can be established between vehicles, such as described in U.S. Pat. No. 5,528,391 to Elrod, then the need for a collision detection system like Ethernet would not be required. If the receiver on a vehicle, for example, only has to listen to one sender from one other vehicle at a time, then the bandwidth can be considerably higher since there will not be any interruption.

When two vehicles are communicating their positions to each other, it is possible through the use of range gating or the sending of a "clear to send signal" and timing the response to determine the separation of the vehicles. This assumes that the properties of the path between the vehicles is known which would be the case if the vehicles are within view of each other. If, on the other hand, there is a row of trees, for example, between the two vehicles, a false distance measurement would be obtained if the radio waves pass through a tree. If the communication frequency is low enough that it can pass through a tree in the above example, it will be delayed. If it is a much higher frequency such that is blocked by the tree then it still might reach the second vehicle through a multi-path. Thus, in both cases an undetectable range error results. If a range of frequencies is sent, as in a spread spectrum pulse, and the first arriving pulse contains all of the sent frequencies then it is likely that the two vehicles are in view of each other and the range calculation is accurate. If any of the frequencies are delayed then the range calculation can be considered inaccurate and should be ignored. Once again, for range purposes, the results of many transmissions and receptions can be used to improve the separation distance accuracy calculation. Alternate methods for determining range can make use of radar reflections, RFID tags etc.

3.3 Enhancements

In the accident avoidance system of the present invention, the information indicative of a collision could come from a vehicle that is quite far away from the closest vehicles to the subject vehicle. This is a substantial improvement over the prior art collision avoidance systems, which can only react to a few vehicles in the immediate vicinity. The system described herein also permits better simultaneous tracking of several vehicles. For example, if there is a pileup of vehicles down the highway then this information can be transmitted to control other vehicles that are still a significant distance from the accident. This case cannot be handled by prior art systems. Thus, the system described here has the potential to be used with the system of the U.S. Pat. No. 5,572,428 to Ishida, for example.

The network analogy can be extended if each vehicle receives and retransmits all received data as a single block of data. In this way, each vehicle is assured in getting all of the relevant information even if it gets it from many sources. Even with many vehicles, the amount of data being transmitted is small relative to the bandwidth of the infrared optical or radio technologies. Naturally, in some cases, a receiver and retransmitter can be part of the highway infrastructure. Such a case might be on a hairpin curve in the mountains where the oncoming traffic is not visible.

In some cases, it may be necessary for one vehicle to communicate with another to determine which evasive action each should take. This could occur in a multiple vehicle situation when one car has gone out of control due to a tire failure, for example. In such cases, one vehicle may have to tell the other vehicle what evasive actions it is planning. The other vehicle can then calculate whether it can avoid a collision based of the planned evasive action of the first vehicle and if not it can inform the first vehicle that it must change its evasive plans. The other vehicle would also inform the first vehicle as to what evasive action it is planning. Several vehicles communicating in this manner can determine the best paths for all vehicles to take to minimize the danger to all vehicles.

If a vehicle is stuck in a corridor and wishes to change lanes in heavy traffic, the operator's intention can be signaled by the operator activating the turn signal. This could send a message to other vehicles to slow down and let the signaling vehicle change lanes. This would be particularly helpful in an alternate merge situation and have a significant congestion reduction effect.

3.4 Noise Radar Communication

In conventional wireless communication such as between cell phones and a cell phone station or computers in a local area network, a limited number of clients are provided dedicated channels of communication with a central server. The number of channels is generally limited and the data transfer rate is maximized. The situation of communication between vehicles (cars, trucks, buses, boats, ships, airplanes) is different in that devices are all peers and the communication generally depends on their proximity. In general, there is no central server and each vehicle must be able to communicate with each other vehicle without going through a standard server.

Another distinguishing feature is that there may be a large number of vehicles that can potentially communicate with a particular vehicle. Thus, there needs to be a large number of potential channels of communication. One method of accomplishing this is based on the concept of noise radar as developed by Lukin et al. (and described in the following:

1. K. A. Lukin. Noise Radar Technology for Short Range Applications, Proc of the. 5th Int. Conference and Exhibition on Radar Systems,. (RADAR '99), May 17–21, Brest, France, 1999, 6 pages;
2. K A. Lukin. Advanced Noise Radar Technology. Proc. of the PIERS Workshop on Advances in Radar Methods. Apr. 20–22, 1998, Hotel Dino, Baveno, Italy, JRC-Ispra 1998, pp. 137–140;
3. W. Keydel and K. Lukin. Summary of Discussion in working Group V: Unconventional New Techniques and Technologies for Future Radar, Proc. of the PIERS Workshop in Radar Methods. Apr. 20–22, 1998, Hotel Dino, Baveno, Italy, 1998, pp. 28–30;
4. Lukin K. A., Hilda A. Cerdeira and Colavita A. A. Chaotic instability of currents in reverse biased multilayered structure. Appl. Physics Letter, v. 77(17), Oct. 27, 1997, pp. 2484–2496;
5. K. A. Lukin. Noise Radar Technology for Civil Application. Proc. of the 1 st EMSL User Workshop. Apr. 23–24, 1996, JRC-Ispra, Italy, 1997, pp. 105–112;
6. A. A. Mogyla. Adaptiv signal filtration based on the two-parametric representation of random processes. Collective Volume of IRE NASU, Vol. 2, No. 2 pp. 137–141, 1997, (in Russian);
7. A. A. Mogyla, K. A. Lukin. Two-Parameter Representation of Non-Stationary Random Signals with a Finite Weighted Average Value of Energy. The Collective Volume of IRE NASU, No. 1, pp. 118–124, 1996, (in Russian);
8. K. A. Lukin. Noise Radar with Correlation Receiver as the Basis of Car Collision Avoidance System. 25th European Microwave Conference, Bologna; Conference Proceedings, UK, Nexus, 1995, pp. 506–507, 1995;
9. K. A. Lukin, V. A. Rakityansky. Dynamic chaos in microwave oscillators and its applications for Noise Radar development, Proc. 3rd Experimental Chaos Conference, Edinburg, Scotland, UK, Aug. 21–23, 1995;
10. V. A. Rakityansky, K. A. Lukin. Excitation of the chaotic oscillations in millimeter BWO, International Journal of Infrared and Millimeter Waves, vol. 16, No. 6, June, pp. 1037–1050, 1995;
11. K. A. Lukin. Ka-band Noise Radar. Proc. of the Millimeter and Submillimeter Waves, Jun. 7–10 1994, Kharkov, Ukraine; Vol. 2, pp. 322–324, 1994;

12. K. A. Lukin, Y. A. Alexandrov, V. V. Kulik, A. A. Mogila, V. A. Rakityansky. Broadband millimeter noise radar, Proc. Int. Conf. on Modem Radars, Kiev, Ukraine, pp. 30–31, 1994 (in Russian);
13. K. A. Lukin. High-frequency chaotic oscillations from Chua's circuit. Journal of Circuits, Systems, and Computers, Vol. 3, No. 2, June 1993, pp. 627–643; In the book: Chua's Circuit Paradigma for Chaos, World Scientific, Singapore, 1993;
14. K. A. Lukin, V. A. Rakityansky. Application of BWO for excitation of the intensive chaotic oscillations of millimeter wave band. 23-rd European Microwave Conference. September 6–9, Madrid, Spain. Conf.Proceed. pp. 798–799, 1993;
15. K. A. Lukin, V. A. Rakityansky. Excitation of intensive chaotic oscillations of millimetre wave band. Proc. of ISSSE, Paris, September 1–4, pp. 454–457, 1992;
16. V. V. Kulik, K. A. Lukin, V. A. Rakityansky. Non-Coherent Reflectometry Method for Measurement of Plasma Cut-Off Layer Position, Proc. of the Int. Conference on Millimeter Wave and Far-Infrared. Technology, Beijing, China, Aug. 17–21, 1992;
17. V. V. Kulik, K. A. Lukin, V. A. Rakityansky. Autodyne effect in BWO with chaotic dynamic. Collective Volume of IRE NASU, pp. 95–100, 1992, (in Russian);
18. V. V. Kulik, K. A. Lukin, V. A. Rakityansky. Application of noncoherent reflectometry method for fusion plasma dyagnostic. Collective Volume of IRE NASU, pp. 13–18, 1992, (in Russian);
19. B. P. Efimov, K. A. Lukin, V. A. Rakityansky. Chaotic interaction of modes in the electron-wave auto-oscillator with two feedback channels, Letters in Journal of Technical Physics, v. 15, No. 18, pp. 9–12, 1989, (in Russian);
20. B. P. Efimov, K. A. Lukin, V. A. Rakityansky. Transformation of chaotic oscillation power spectrum by reflections. Journal of Technical Physics, vol. 58, No. 12, pp. 2388–2400, 1988 (in Russian)).

The concept of noise radar is discussed in detail in the Lukin references listed above which are incorporated herein by reference. A description of noise radar is included elsewhere herein and the discussion here will be limited to the use of pseudo random noise in a spread spectrum or Ultra-wideband spectrum environment for communication purposes.

Generally, a particular segment or band of the electromagnetic spectrum which is compatible with FCC regulations will be chosen for vehicle to vehicle communication purposes. Such a band could include, for example 5.9 to 5.91 GHz. The noise communication device will therefore transmit information in that band. Each vehicle will transmit a pseudorandom noise signal in a carrier-less fashion composed of frequencies within the chosen band. The particular code transmitted by a particular vehicle should be unique. Generally, the vehicle will transmit its code repetitively with a variable or fixed spacing between transmissions. The information which the vehicle wishes to transmit is encoded using the vehicle's code by any of a number of different techniques including phase modulation of distance or time between code transmissions, phase or amplitude modulation of the code sequences themselves, changes of the polarity of the entire code sequence or the individual code segments, or bandwidth modulation of the code sequence. Naturally, other coding technologies would also applicable and this invention is not limited to the particular coding method chosen.

For example, a vehicle can have a 64 bit code which is a combination of a vehicle identification number and the GPS coordinates of the vehicle location. The vehicle would continuously transmit this 64 bit code using frequencies within the chosen band. The 64 bit code could be composed of both positive and negative bits in addition to 0 bits. When identifying the vehicle the receiver could rectify the bits resulting in a 64 bit code of 0's and 1's. The information which the transmitting vehicle wishes to send could be represented by the choice of polarity of each of the code bits.

Once a particular vehicle begins communicating with another particular vehicle, the communication channel must remain intact until the entire message has been transmitted. Since there may be as many as 100 to 1000 vehicles simultaneously transmitting within radio range of the receiving vehicle, a transmitting vehicle must have a code which can be known to the receiving vehicle. One preferred technique is to make this identification code a function of the GPS coordinate location of transmitting vehicle. The code would need to be coarse enough so that information to be transmitted by transmitting vehicle is accomplished before the transmitting vehicle changes its identification. If this information consists of a position and velocity of the transmitting vehicle, then the receiving vehicle can determine the new transmitting code of the transmitting vehicle.

For example, the transmitting vehicle determines its location within one meter. It is unlikely that any other vehicle will located within the same meter as the transmitting vehicle. Thus the transmitting vehicle will have a unique code which it can send as a pseudorandom sequence in the noise communication system. A nearby vehicle can search all information received by its antenna for a sequence which represents each space within 30 meters of the receiving vehicle. If it detects such a sequence, it will know that there are one or more vehicles within 30 meters of the receiving vehicle. The search can now be refined to locate vehicles based on their direction since again the receiving vehicle can calculate the sequences that would be transmitted from a vehicle from any particular location within the 30 meter range. Once a particular vehicle has been identified, the receiving vehicle can begin to receive information from the transmitting vehicle through one or more of the coding schemes listed above. Since the information will preferably contain at least the velocity of transmitting vehicle, the receiving vehicle can predict any code sequence changes that the place and thus maintain communication with a particular vehicle even as the vehicle's code changes due to its changing position. The information being transmitted can also contain additional information about the vehicle or its occupants.

In this manner, a receiving vehicle can selectively receive information from any vehicle within its listenable range. Such range may be limited to 100 meters for a highly congested area or extend of 5000 meters in a rural environment. In this manner, each vehicle becomes a node on the temporary local area network and is only identified by its GPS location. Any vehicle can communicate with any other vehicle and when many vehicles are present a priority scheme can be developed based on the urgency of the message, the proximity of vehicle, the possibility of a collision, or other desired prioritizing scheme.

The code transmitted by a particular vehicle will begin with a sequence that indicates, for example, the largest GPS segment that locates the vehicle which may be a segment 100 km square, for example. The next bits in the sequence would indicate which of next lower subsections which, for example, could be 10 km square. The next set of bits could further refine this to a 1 km square area and so on down to the particular square meter where the vehicle is located. Naturally other units such as angles degrees minutes, seconds etc. could be more appropriate for locating a vehicle on the surface of spherical earth. By using this scheme, a receiving vehicle can search for all vehicles located within its 1 km or square segment and then when a vehicle is found the search can be continuously refined until the exact location of the transmitting vehicle has been determined. This is done through correlation. The 100 or so vehicles transmitting with a range would all transmit low level signals which would appear as noise to the receiving vehicle. The receiving vehicle would need to know the code that particular vehicle was transmitting before it could identify that that code was present in the noise. The code derived by the vehicle to be transmitted must be sufficiently unique that only one vehicle can have a particular code at a particular time. Since the messages from different vehicles are separated through correlation functions, all vehicles must have unique transmission codes which are not known before hand by the receiving vehicle yet must be derivable by the receiving vehicle.

Naturally, the communication need not be limited to communication between moving vehicles. This same technology permits communication between a vehicle and an infrastructure located station.

There is no limit to the types of information that can be exchanged between vehicles or between vehicles and infrastructure based stations. For example, if an event occurs such as an accident or avalanche, road erosion, fallen tree, or other event which temporarily changes the pass-ability of a section of a lane on a highway, an authorized agent can place the transmitting sign near the identified section of roadway which would transmit information using the noise communication technique to all oncoming vehicles within a 1 km range, for example. Prior to the placement of such a sign, a police vehicle could transmit a similar message to adjacent vehicles. Even an ordinary driver who first appears on the scene and identifies a potential hazard can send this message to vehicles within range of the hazard and can tag this message as a high priority message. An infrastructure located receiving station can receive such a message and notify the emergency crews that attention is immediately required at a particular location on the highway. In this manner, all vehicles that could be affected by such an event as well as urgency response organizations can be immediately notified as soon as a hazard such as an accident occurs thereby greatly reducing the response time and minimizing the chance of vehicles engaging the hazardous location.

If a vehicle passes through a precise positioning location as described elsewhere herein, that vehicle (the vehicle's processor or computer) momentarily knows or can calculate the errors in the GPS signals and thus becomes a differential correction station. The error corrections can then be transmitted to nearby vehicles plus enhancing their knowledge of their position. If the PPS vehicle also has an onboard accurate clock, then the carrier phase of the satellite signals at the PPS location can be predicted and thus, as the vehicle leaves the PPS station, it can operate on carrier phase RTK differential GPS and thus know its position within centimeters or less. Similarly, if the phase of the carrier waves at PPS station is transmitted to adjacent vehicles, each of those vehicles also can operate on RTK carrier phase differential GPS. Thus, as many cars pass the PPS the accuracy with which each vehicle knows its position is continuously upgraded and at the time when the likelihood of collision between vehicles is a maximum, that is when many vehicles are traveling on a roadway, the accuracy with which each vehicle knows its location is also maximized. Thus, the RtZF™ system automatically improves as the danger of collision increases.

Other information which a vehicle can transmit relates to the GPS signals that it is receiving. In this manner another form of differential GPS can occur called relative differential GPS. Thus, without necessarily improving the accuracy with which a given vehicle precisely knows its position, by comparing GPS signals from one vehicle to another the relative location of two vehicles can again be very accurately determined within centimeters. This of course is particularly important for collision avoidance.

Other information that can be readily transmitted either from vehicle to vehicle or from infrastructure stations to vehicles includes any recent map updates. Since a vehicle will generally always be listening, whenever a map update occurs this information can be received by a vehicle providing it is within range of a transmitter. This could occur overnight while the vehicle is in the garage, for example. Each vehicle would have a characteristic time indicating the freshness of the information in its local map database. As the vehicle travels and communicates with other vehicles, this date can be readily exchanged and if a particular vehicle has a later map version than the other vehicle and signal the first vehicle requesting that the differences between the two map databases be transmitted from the first to the second vehicle. Naturally, this transmission can also occur between an infrastructure station and a vehicle. Satellites, cell phone towers, etc. can also be used for map updating purposes.

If the operator of a particular vehicle wishes to send a text or voice message to another identified vehicle, this information can also be sent through the vehicle to vehicle communication system described herein. Similarly, interaction with the Internet via an infrastructure station can also be accomplished. In some cases, it may be desirable to access the Internet using communication channels with other vehicles. Perhaps, one vehicle has the satellite or other link to the Internet while a second vehicle does not. The second vehicle could still communicate with the with the Internet through the first Internet-enabled vehicle.

Through the communication system based on noise or pseudonoise communication as described above is ubiquitous, the number of paths through which information can be transmitted to and from a vehicle is substantially increased which also greatly increases the reliability of the system since multiple failures can occur without affecting the overall system operation. Thus, once again the goal of zero fatalities is approached through this use of vehicle-to-vehicle communication.

Through opening this new paradigm for communication between vehicles, and through the use of message relay from one vehicle to another, occupants of one vehicle can communicate with any other vehicle on a road. Similarly, through listening infrastructure stations the occupants can communicate with non-vehicle occupants. In many ways, this system supplements the cell phone system but is organized under totally different principles. In this case, the communication takes place without central stations or servers. Although servers and central stations can be attached to the system, the fundamental structure is one of independent nodes and temporary connections based on geographic proximity.

The system is self limiting in that the more vehicles communicating the higher the noise level and the more difficult it will be to separate more distant transmitters. Thus, when a vehicle is traveling in a rural environment, for example, where there are few sparsely located transmitters, the noise level will be low and communication with more distant vehicles facilitated. On the other hand, during rush hour, there will be many vehicles simultaneously communicating thus raising the noise level and limiting the ability of a receiver to receive distant transmissions. Thus, the system is automatically adjusting.

3.5 Noise Radar

There are several collision avoidance based radar systems being implemented on vehicles on the highways today. The prominent systems include ForeWarn by Delco division of the Delphi Corporation and the Eaton Vorad systems. These systems are acceptable as long as few vehicles on the roads have such system. As the number of radar equipped vehicles increases, the reliability of each system decreases as radar transmissions are received that originate from other vehicles. This problem can be solved through the use of noise radar as described in the various technical papers by Lukin et al listed above and incorporated herein by reference.

Noise radar typically operates in a limited band of frequencies similarly to spread spectrum technologies. Whereas spread spectrum utilizes a form of carrier frequency modulation, noise radar does not. It is carrier-less. Typically, a noise-generating device is incorporated into the radar transmitter such that the signal transmitted appears as noise to any receiver. A portion of the noise signal is captured as it is transmitted and fed to a delay line for later use in establishing a correlation with a reflected pulse. In the manner described in the Lukin papers, the distance and velocity of a reflecting object relative to the transmitter can be readily determined and yet be detectable by any other receiver. Thus, a noise radar collision avoidance system such as disclosed in U.S. Pat. Nos. 6,121,915, 5,291,202, 5,719,579, and 5,075,863 (all of which are incorporated by reference herein) becomes feasible. Lukin et al. first disclosed this technology in the above referenced papers.

Although noise radar itself is not new, the utilization of noise radar for the precise positioning system described herein has heretofore not been disclosed. Similarly, the use of noise radar for detecting the presence of an occupant within a vehicle or of any object within a particular range of a vehicle has also not heretofore been disclosed. By setting the correlation interval, any penetration or motion of an object within that interval can be positively detected. Thus, if interval is sent at 2 meters, for example, the entire interior of a vehicle can be monitored with one simple device. If any object is moving within the vehicle, then this can readily detected. Similarly, the space being monitored can be limited to a portion of the interior of the vehicle such as the right passenger seat or the entire rear seat. In this manner, the presence of any moving object within that space can be determined and thus problems such as a hiding assailant or a child or animal left in a parked car can be addressed. Similarly, a device placed in the trunk can monitor the motion of any object that has been trapped within the trunk thereby eliminating that well-known problem.

The radar system to be used for the precise positioning system can also be used for monitoring the space around a vehicle. In this case, a simple structure involving the placement of four antennas on the vehicle roof, for example, can be used to locate and determine the velocity of any object approaching or in the vicinity of the vehicle. Through using neural networks and the reflection received from the four antennas the location and velocity of an object can be determined and by observing the signature using neural networks the object can be identified. Each antenna would send and receive noise radar waves from an angle of, for example, 180 degrees. Thus one forward and one rear antenna could monitor the left side of the vehicle and one forward and one rear antenna the right side. Similarly, the two rear antennas could monitor the rear of the vehicle and the two forward antennas the forward part of the vehicle. In this manner, one simple system provides rear impact anticipatory sensing, automatic cruise control, forward impact anticipatory sensing, blind spot detection, and side impact anticipatory sensing. Since the duty cycle of the precise positioning system in a small, most of the time would be available for monitoring the space surrounding the vehicle. Through the choice of the correlation interval, the distance monitored can also be controlled.

4. COMMUNICATION WITH HIGHWAY— MAPS 4.1 Statement of the Problem

The initial maps showing roadway lane and boundary location for the CONUS should preferably be installed within the vehicle at the time of manufacture. The vehicle thereafter would check on a section by section basis whether it had the latest update information for the particular and surrounding locations where it is being operated. One method of verifying this information would be achieved if a satellite periodically broadcasts the latest date and time or version that each segment had been most recently updated. This matrix would amount to a small transmission requiring perhaps from a few seconds to one minute of airtime. Any additional emergency information could also be broadcast in between the periodic transmissions to cover accidents, trees falling onto roads etc. If the periodic transmission were to occur every five minutes and if the motion of a vehicle were somewhat restricted until it had received a periodic transmission, the safety of the system can be assured. If the vehicle finds that it does not have the latest map information, vehicle to vehicle communication, vehicle to infrastructure communication or the cell phone in the vehicle can be used to log onto the Internet, for example, and the missing data downloaded. An alternate is for the LEOs, or other satellites, to broadcast the map corrections directly.

It is also possible that the map data could be off loaded from a transmitter on the highway itself, as discussed above. In that manner, the vehicles would only obtain that map information which is needed and the map information would always be up to the minute. As a minimum, temporary data communication stations can be placed before highway sections that are undergoing construction or where a recent blockage has occurred, as discussed above, and where the maps have not yet been updated. Such an emergency data transfer would be signaled to all approaching vehicles to reduce speed and travel with care. Naturally such information could also contain maximum and minimum speed information which would limit the velocity of vehicles in the area.

There is other information that would be particularly useful to a vehicle operator or control system, including in particular the weather conditions especially at the road surface. Such information could be obtained by road sensors and then transmitted to all vehicles in the area by a permanently installed system as disclosed above and in co-pending U.S. patent application Ser. No. 10/079,065 filed Feb. 19, 2002, incorporated by reference herein. Alternately, there have been recent studies that show that icing conditions on road surfaces, for example, can be accurately predicted by local meteorological stations and broadcast to vehicles in the area. If such a system is not present, then, the best place to measure road friction is at the road surface and not on the vehicle. The vehicle requires advance information of an icing condition in order to have time to adjust its speed or take other evasive action. The same road based or local meteorological transmitter system could be used to warn the operators of traffic conditions, construction delays etc. and to set the local speed limit. Naturally once one vehicle in an area has discovered an icing condition, for example, this information can be immediately transmitted to all equipped vehicles through the vehicle to vehicle communication system discussed above.

4.2 Maps

All information regarding the road, both temporary and permanent, should be part of the map database, including speed limits, presence of guard rails, width of each lane, width of the highway, width of the shoulder, character of the land beyond the roadway, existence of poles or trees and other roadside objects, exactly where the precise position location apparatus is located, etc. The speed limit associated with particular locations on the maps should be coded in such a way that the speeds limit can depend upon the time of day and the weather conditions. In other words, the speed limit is a variable that will change from time to time depending on conditions. It is contemplated that there will be a display for various map information present which will always be in view for the passenger and for the driver at least when the vehicle is operating under automatic control. Additional user information can thus also be displayed such as traffic conditions, weather conditions, advertisements, locations of restaurants and gas stations, etc.

A map showing the location of road and lane boundaries can be easily generated using a specially equipped survey vehicle that has the most accurate position measurement system available. In some cases, it might be necessary to set up one or more temporary local DGPS base stations in order to permit the survey vehicle to know its position within a few centimeters. The vehicle would drive down the roadway while operators, using specially designed equipment, sight the road edges and lanes. This would probably best be done with laser pointers and cameras. Transducers associated with the pointing apparatus record the angle of the apparatus and then by triangulation determine the distance of the road edge or lane marking from the survey vehicle. Since the vehicle's position would be accurately known, the boundaries and lane markings can be accurately determined. It is anticipated that the mapping activity would take place continuously such that all roads in a particular state would be periodically remapped in order to pickup up any changes which were missed by other monitoring systems and to improve the reliability of the maps by minimizing the chance for human error. Any roadway changes that were discovered would trigger an investigation as to why they were not recorded earlier thus adding feedback to the mapping part of the process.

The above-described method depends on human skill and attention and thus is likely to result in many errors. A preferred approach is to carefully photograph the edge of the road and use the laser pointers to determine the location of the road lines relative to the pointers and to determine the slope of the roadway through triangulation. In this case several laser pointers would be used emanating from above, below and to the sides of the camera. The reduction of the data is then done later using equipment that can automatically pick out the lane markings and the reflected spots from the laser pointers. One aid to the mapping process is to place chemicals in the line paint that could be identified by the computer software when the camera output is digitized. This may require the illumination of the area being photographed by an infrared or ultraviolet light, for example.

In some cases where the roadway is straight, the survey vehicle could travel at moderate speed while obtaining the boundary and lane location information. In other cases, where the road in turning rapidly, more readings would be required per mile and the survey vehicle would need to travel more slowly. In any case, the required road information can be acquired semi-automatically with the survey vehicle traveling at a moderate speed. Thus, the mapping of a particular road would not require significant time or resources. It is contemplated that a few such survey vehicles could map all of the interstate highways in the United States in less than one year.

The mapping effort could be supplemented and cross-checked though the use of accurate detailed digital photogrammetic systems which, for example, can determine the road altitude with an accuracy to <50 cm. Efforts are underway to map the earth with 1-meter accuracy. The generated maps could be used to check the accuracy of the road-determined maps.

Another improvement that can be added to the system based on the maps is to use a heads up display for in-vehicle signage. As the vehicle travels down the road, the contents of roadside signs can be displayed on a heads up display, providing such a display is available in the vehicle, or on a specially installed LCD display. This is based on the inclusion in the map database the contents of all highway signs. A further improvement would be to include signs having varying messages which would require that the message be transmitted by the sign to the vehicle and received and processed for in vehicle display.

As the roadway is being mapped, the availability of GPS satellite view and the presence of multipath reflections from fixed structures can also be determined. This information can then be used to determine the advisability of locating a local precise location system, or other infrastructure, at a particular spot on the roadway. Cars can also be used as probes for this process and for continuous improvement to check the validity of the maps and report any errors.

Multipath is the situation where more than one signal from a satellite comes to a receiver with one of the signals resulting from a reflection off of a building or the ground, for example. Since multipath is a function of geometry, the system can be designed to eliminate its effects based on highway surveying and appropriate antenna design. Multipath from other vehicles can also be eliminated since the location of the other vehicles will be known.

4.3 Privacy

People do not necessarily want the government to know where they are going and therefore will not want information to be transmitted that can identify the vehicle. The importance of this issue may be overestimated. Most people will not object to this minor infraction if they can get to their destination more efficiently and safely.

On the other hand, it has been estimated that there are 100,000 vehicles on the road, many of them stolen, where the operators do not want the vehicle to be identified. If an identification process that positively identifies the vehicle were made part of this system, it could thus cut down on vehicle theft. Alternately, thieves might attempt to disconnect the system thereby defeating the full implementation of the system and thus increasing the danger on the roadways and defeating the RtZF™ objective. The state of the system would therefore need to be self-diagnosed and system readiness must be a condition for entry onto the restricted lanes.

5. SENSING OF NON-RtZF™ EQUIPPED OBJECTS

5.1 Problem Statement

Vehicles with the RtZF™ system in accordance with the invention must also be able to detect those vehicles that do not have the system as well as pedestrians, animals, bicyclists, and other hazards that may cross the path of the equipped vehicle.

5.2 Prior Art

Although, there appears not to be any significant prior art involving a vehicle communicating safety information to another vehicle on the roadway, several patents discuss methods of determining that a collision might take place using infrared and radar. U.S. Pat. No. 5,249,128 to Markandey et al., for example, discusses methods of using infrared to determine the distance to a vehicle in front and U.S. Pat. No. 5,506,584 to Boles describes a radar-based system. Both systems suffer from a high false alarm rate and could be substantially improved if a pattern recognition system such as neural networks were used. Also, neither system makes use of noise modulation technologies as taught herein.

5.3 Description

Systems based on radar have suffered from the problem of being able to sufficiently resolve the images which are returned to be able to identify the other vehicles, bridges, etc. except when they are close to the host vehicle. One method used for adaptive cruise control systems is to ignore everything that is not moving. This, of course, leads to accidents if this were used with the instant invention. The problem stems from the resolution achievable with radar unless the antenna is made very large or the object is close. Since this is impractical for use with automobiles, only minimal collision avoidance can be obtained using radar.

Optical systems can provide the proper resolution but may require illumination with a bright light or laser. If the laser is in the optical range, there is a danger of causing eye damage to pedestrians or vehicle operators. As a minimum, it will be distracting and annoying to other vehicle operators. A laser operating in the infrared part of the electromagnetic spectrum avoids the eye danger problem, provided the frequency is sufficiently far from the visible, and, since it will not be seen, it will not be annoying. Infrared also has the proper resolution so that pattern recognition technologies can be employed to recognize various objects, such as vehicles, in the reflected image. Infrared has another advantage from the object recognition perspective. All objects radiate and reflect infrared. The hot engine or tires of a moving vehicle in particular are recognizable signals. Thus, if the area around a vehicle is observed with both passive and active infrared, more information can be obtained than from radar, for example. Infrared is less attenuated by fog than optical frequencies, although it is not as good as radar. Infrared is also attenuated by snow but at the proper frequencies it has about five times the range of human sight. Note, as with radar, Infrared can be modulated with noise, pseudonoise, or other distinctive signal to permit the separation of various reflected signals from different transmitting vehicles.

An example of such an instrument is made by Sumitomo Electric and is sufficient for the purpose here. The Sumitomo product has been demonstrated to detect leaves of a tree at a distance of about 300 meters. The product operates at a 1.5 micron wavelength.

This brings up a philosophical discussion about the trade-offs between radar with greater range and infrared laser radar with more limited range but greater resolution. At what point should driving during bad weather conditions be prohibited? If the goal of zero fatalities is to be realized, then people should not be permitted to operate their vehicles during dangerous weather conditions. This may require closing roads and highways prior to the start of such conditions. Under such a policy, a system which accurately returns images of obstacles on the roadway that are two to five times the visual distance should be adequate. In such a case, radar would not be necessary.

Laser Radar Scanning System

The digital map can be used to define the field that the laser radar scanner will interrogate. The laser radar scanner will return information as to distance to an object in the scanned field. This will cover all objects that are on or adjacent to the highway. The laser pulse can be a pixel that is one inch in diameter at 100 feet, for example. The scanner must scan the entire road at such a speed that the motion of the car can be considered insignificant. Alternately, a separate aiming system that operates at a much lower speed, but at a speed to permit compensation for the car angle changes. Such an aiming system is also necessary due to the fact that the road curves up and down. Therefore two scanning methods, one a slow, but for large angle motion and the other fast but for small angles may be required. The large angular system requires a motor drive while the small angular system can be accomplished through the use of an acoustic wave system, such as Lithium Niobate ($LiNbO_3$), which is used to drive a crystal which has a large refractive index such as Tellurium dioxide. Other acoustic optical systems can also be used as scanners.

Alternately, two systems can be used, a radar system for interrogating large areas and a laser radar for imaging small areas. Either or both systems can be range gated and noise or pseudonoise modulated.

The laser radar scanner can be set up in conjunction with a range gate so that once it finds a object the range can be narrowed so that only that object and other objects at the same range, 65 to 75 feet for example, are allowed to pass to the receiver. In this way, an image of a vehicle can be separated from the rest of the scene for identification by pattern recognition software. Once the image of the particular object has been captured, the range gate is broadened, to about 20 to 500 feet for example, and the process repeated for another object. In this manner, all objects in the field of interest to the vehicle can be separated and individually imaged and identified. The field of interest, of course, is the field where all objects with which the vehicle can potentially collide reside. Particular known and mapped features on the highway can be used as aids to the scanning system so that the pitch and perhaps roll angles of the vehicle can be taken into account.

Prior to the time that all vehicles are equipped with the RtZF™ system described above, roadways will consist of a mix of vehicles. In this period, it will not be possible to totally eliminate accidents. It will be possible to minimize the probability of having an accident however, if a laser radar system similar to that described in Shaw (U.S. Pat. No. 5,529,138) with some significant modifications is used. It is correctly perceived by Shaw that the dimensions of a radar beam are too large to permit distinguishing various objects which may be on the roadway in the path of the instant vehicle. Laser radar provides the necessary resolution that is not provided by radar. Laser radar as used in the present invention however would acquire significantly more data than anticipated by Shaw. Sufficient data in fact would be attained to permit the acquisition of a 3-dimensional image of all objects in the field of view. The X and Y dimensions of such objects would, of course, be determined knowing the angular orientation of the laser radar beam. The longitudinal or Z dimension would be obtained by the time-of-flight of the laser beam to a particular point on the object and reflected back to the detector or by phase methods.

At least two methods are available for resolving the longitudinal dimension for each of the pixels in the image. In one method, a laser radar pulse having a pulse width of one nanosecond, for example, could be transmitted toward the area of interest and as soon as the reflection was received and the time-of-flight determined, a new pulse would be sent at a slightly different angular orientation. The laser, therefore, would be acting as a scanner covering the field of interest. A single detector could then be used since it would know which pixel was being illuminated. The distance to the reflection point could be determined by time-of-flight thus giving the longitudinal distance to all points in view on the object.

Alternately, the entire area of interest can be illuminated and an image focused on a CCD or CMOS array. By checking the time-of-flight to each pixel, one at a time, the distance to that point on the vehicle would be determined. A variation of this would be to use a garnet crystal as a pixel shutter and only a single detector. In this case, the garnet crystal would permit the illumination to pass through one pixel at a time through to a detector.

Other methods of associating a distance to a particular reflection point, of course, can now be conceived by those skilled in the art including variations of the above ideas using a pixel mixing device or variations in pixel illumination and shutter open time to determine distance through comparison of range gated received reflected light. In the laser scanning cases, the total power required of the laser is significantly less than in the area of illuminated design. However, the ability to correctly change the direction of the laser beam in a sufficiently short period of time complicates the scanning design. The system would work approximately as follows: The entire area in front of the instant vehicle, perhaps as much as a full 180 degree arc in the horizontal plane would be scanned for objects using either radar or laser radar. Once one or more objects had been located, the scanning range would be severely limited to basically cover that particular object and some surrounding space using laser radar. Based on the range to that object, a range gate can be used to eliminate all background and perhaps interference from other objects. In this manner, a very clear picture or image of the object of interest can be obtained as well as its location and, through the use of a neural network pattern of recognition system, the identity of the object can be ascertained as to whether it is a sign, a truck, an animal, a person, an automobile or other object. The identification of the object will permit an estimate to be made of the object's mass and thus the severity of any potential collision.

Once a pending collision is identified, this information can be made available to the driver and if the driver ceases to heed the warning, control of the vehicle could be taken from him or her by the system. The actual usurpation of vehicle control, however, is unlikely initially since there are many situations on the highway where the potential for a collision cannot be accurately ascertained. Consequently, this system can be thought of as an interim solution until all vehicles have the RtZF™ system described above.

To use the laser radar in a scanning mode requires some means of changing the direction of the emitted pulses of light. One acoustic-optic method of using a ultrasonic wave to change the diffraction angle of a Tellurium dioxide crystal is disclosed above. This can also be done in a variety of other ways such as through the use of a spinning mirror, such as is common with laser scanners and printers. This mirror would control the horizontal scanning, for example, with the vertical scanning controlled though a stepping motor. Alternately, one or more piezoelectric materials can be used to cause the laser radar transmitter to rotate about a pivot point. A rotating system, such as described in Shaw is the least desirable of the available methods due to the difficulty in obtaining a good electrical connection between the laser and the vehicle while the laser is spinning at a very high angular velocity. Another promising technology is to use MEMS mirrors to deflect the laser beam in one or two dimensions.

Although the system described above is intended for collision avoidance or at least the notification of a potential collision, when the roadway is populated by vehicles having the RtZF™ system and vehicles which do not, its use is still desirable after all vehicles are properly equipped. It can also be used to search for animals or other objects which may be on or crossing the highway, a box dropping off of a truck for example, a person crossing the road who is not paying attention to traffic. Naturally motorcycles, bicycles, and other vehicles can also be monitored.

One significant problem with all previous collision avoidance systems which use radar or laser radar systems to predict impacts with vehicles, is the inability to know whether the vehicle that is being interrogated is located on the highway or is off the road. In the system of the present invention, the location of the road at any distance ahead of the vehicle would be known precisely from the sub-meter accuracy maps, so that the scanning system can ignore, for example, all vehicles on lanes where there is a physical barrier separating the lanes from the lane on which the subject vehicle is traveling. This, of course, is a common situation on super highways. Similarly, a parked car on the side of the car would not be confused with a parked car that is in the lane of travel of the subject vehicle when the road is curving. This permits the subject invention to be used for automatic cruise control. In contrast with radar systems, it does not require that vehicles in the path of the subject vehicle to be moving, so that high speed impacts into stalled traffic can be avoided.

If a system with a broader beam to illuminate a larger area on the road in front of the subject vehicle is used, with the subsequent focusing of this image onto a CCD or CMOS array, this has an advantage of permitting a comparison of the passive infrared signal and the reflection of the laser radar active infrared. Metal objects, for example appear cold to passive infrared. This permits another parameter to be used to differentiate metallic objects from non-metallic objects such as foliage or animals such as deer. The breadth of the beam can be controlled and thereby a particular object can be accurately illuminated. With this system, the speed with which the beam steering is accomplished can be much slower. Naturally, both systems can be combined into the maximum amount of information to be available to the system.

Through the use of range gating, objects can be relatively isolated from the environment surrounding it other than for the section of highway which is at the same distance. For many cases, a properly trained neural network can use this data and identify the objects. An alternate approach is to use the Fourier transform of the scene as input to neural network. The advantages of this latter approach are that the particular location of the vehicle in the image is not critical for identification.

In the future, when the system can take control of the vehicle, it will be possible to have much higher speed travel.

In such cases all vehicles on the controlled roadway will need to have the RtZF™ system as described above. Fourier transforms of the objects of interest can be done optically though the use of a diffraction system. The Fourier transform of the scene can then be compared with the library of the Fourier transforms of all potential objects and, through a system used in military target recognition, multiple objects can be recognized and the system then focused onto one at time to determine the degree of threat that it poses.

6. ITS+ADAPTIVE CRUISE CONTROL 6.1 Problem—Traffic Congestion

The world is experiencing an unacceptable growth in traffic congestion and attention is increasingly turning to smart highway systems to solve the problem. It has been estimated that approximately $240 billion will be spent on smart highways over the next 20 years. All of the initiatives currently being considered involve a combination of vehicle-mounted sensors and sensors and other apparatus installed in or on the roadway. Such systems are expensive to install, difficult and expensive to maintain and will thus only be used on major highways, if at all. Although there will be some safety benefit from such systems, it will be limited to the highways which have the system and perhaps to only a limited number of lanes.

The RtZF™ system in accordance with the invention eliminates the shortcomings of the prior art by providing a system that does not require modifications to the highway. The information as to the location of the highway is determined, as discussed above, by mapping the edges of the roadway and the edges of the lanes of the roadway using a process whereby the major roads of the entire country can be mapped at very low cost. Thus, the system has the capability of reducing congestion as well as saving lives on all major roads, not just those which have been selected as high-speed guided lanes.

6.2 Description

According to U.S. Pat. No. 5,506,584 the stated goals of the US DOT IVHS system are:

improving the safety of surface transportation increasing the capacity and operational efficiency of the surface transportation system enhancing personal mobility and the convenience and comfort of the surface transportation system reducing the environmental and energy impacts of the surface transportation system The RtZF™ system in accordance with the present invention satisfies all of these goals at a small fraction of the cost of prior art systems. The safety benefits have been discussed above. The capacity increase is achieved by confining vehicles to corridors where they are then permitted to travel at higher speeds. This can be achieved immediately where carrier phase DGPS is available or with the implementation of the highway located precise location systems as shown in FIG. 11. An improvement is to add the capability for the speed of the vehicles to be set by the highway or highway control system. This is a simple additional few bytes of information that can be transmitted along with the road edge location map, thus, at very little initial cost. To account for the tolerances in vehicle speed control systems, the scanning laser radar, or other technology system, which monitors for the presence of vehicles without RtZF™ is also usable as an adaptive cruise control system. Thus, if a faster moving vehicle approaches a slower moving vehicle, it will automatically slow down to keep a safe separation distance from the leading, slower moving vehicle. Although the system is not planned for platooning, that will be the automatic result in some cases. The maximum packing of vehicles is automatically obtained and thus the maximum vehicle flow rate is also achieved with a very simple system.

For the Intelligent Highway System (ITS) application, some provision is required to prevent unequipped vehicles from entering the restricted lanes. In most cases, a barrier will be required since if an errant vehicle did enter the controlled lane, a serious accident could result. Vehicles would be checked while traveling down the road or at a tollbooth, or similar station, that the RtZF™ system was in operation without faults and with the latest updated map for the region. Only those vehicles with the RtZF™ system in good working order would be permitted to enter. The speed on the restricted lanes would be set according to the weather conditions and fed to the vehicle information system automatically, as discussed above. Automatic tolling based on the time of day or percentage of highway lane capacity in use can also be easily implemented.

For ITS use, there needs to be a provision whereby a driver can signal an emergency, for example, by putting on the hazard lights. This would permit the vehicle to leave the roadway and enter the shoulder when the vehicle velocity is below some level. Once the driver provides such a signal, the roadway information system, or the network of vehicle based control systems, would then reduce the speed of all vehicles in the vicinity until the emergency has passed. This roadway information system need not be actually associated with the particular roadway and also need not require any roadway infrastructure. It is a term used here to represent the collective system as operated by the network of nearby vehicles and the inter-vehicle communication system. Eventually, the occurrence of such emergency situations will be eliminated by vehicle based failure prediction systems such as described in U.S. Pat. No. 5,809,437 which is incorporated by reference herein in its entirety.

6.3 Enhancements—Vehicle

Emergency situations will develop on intelligent highways. It is difficult to access the frequency or the results of such emergencies. The industry has learned from airbags that if a system is developed which saves many lives but causes a few deaths, the deaths will not be tolerated. The ITS system, therefore, must operate with a very high reliability, that is approaching zero fatalities. Since the brains of the system will reside in each vehicle, which is under the control of individual owners, there will be malfunctions and the system must be able to adapt without causing accidents.

The spacing of the vehicles is the first line of defense. Secondly, each vehicle with a RtZF™ system has the ability to automatically communicate to all adjacent vehicles and thus immediately issue a warning when an emergency event is occurring. Finally, with the addition of a total vehicle diagnostic system, such as disclosed in U.S. Pat. No. 5,809,437 (Breed), "On Board Vehicle Diagnostic System", potential emergencies can be anticipated and thus eliminated with high reliability.

Although the application for ITS envisions a special highway lane and high speed travel, the potential exists in the invention to provide a lower measure of automatic guidance where the operator can turn control of the vehicle over to the RtZF™ system for as long as the infrastructure is available. In this case, the vehicle would operate in normal lanes but would retain its position in the lane and avoid collisions until a decision requiring operator assistance is required. At that time, the operator would be notified and if he or she did not assume control of the vehicle, an orderly stopping of the vehicle on the side of the road would occur.

For all cases where vehicle steering control is assumed by the RtZF™ system, an algorithm for controlling the steering should be developed using neural networks or neural fuzzy systems. This is especially true for the emergency cases discussed above where it is well known that operators frequently take the wrong actions and at the least, they are slow to react. Algorithms developed by other non-pattern recognition techniques do not in general have the requisite generality or complexity and are also likely to make the wrong decisions (although the use of such systems is not precluded in the invention). When the throttle and breaking functions are also handled by the system, an algorithm based on neural networks or neural fuzzy systems is even more important.

For the ITS, the driver will enter his or her destination so that the vehicle knows ahead of time where to exit. Alternately, if the driver wishes to exit, he merely turns on his turn signal, which tells the system and other vehicles that he or she is about to exit the controlled lane.

7. OTHER FEATURES 7.1 Blind Spot Detection

The RtZF™ system of this invention also can eliminate the need for blind spot detectors such as disclosed in U.S. Pat. No. 5,530,447 to Henderson. Alternately, if a subset of the complete RtZF™ system is implemented, as is expected in the initial period, the RtZF™ system can be made compatible with the blind spot detector described in the '447 patent.

7.2 Incapacitated Driver

As discussed above, the RtZF™ system of this invention also handles the problem of the incapacitated driver thus eliminating the need for sleep sensors that appear in numerous U.S. patents. Such systems have not been implemented because of their poor reliability. The RtZF™ system senses the result of the actions of the operator, which could occur for a variety of reasons including inattentiveness cause by cell phone use, old age, drunkenness, heart attacks, drugs as well as falling asleep.

7.3 Emergencies—Car Jacking, Crime

Another enhancement that is also available is to prevent car jacking in which case the RtZF™ system can function like the Lojack™ system. In the case where a car-jacking occurs, the location of the vehicle can be monitored and if an emergency button is pushed, the location of the vehicle with the vehicle ID can be transmitted.

7.4 Headlight Dimmer

The system also solves the automatic headlight dimmer problem. Since the RtZF™ system equipped vehicle knows where all other RtZF™ system equipped vehicles are located in its vicinity, it knows when to dim the headlights. Since it is also interrogating the environment in front of the vehicle, it also knows the existence and approximate location of all non-RtZF™ system equipped vehicles. This is one example of a future improvement to the system. The RtZF™ system is a system which lends itself to continuous improvement without having to change systems on an existing vehicle.

7.5 Rollover

It should be obvious from the above discussion that rollover accidents should be effectively eliminated by the RtZF™ system. In the rare case where one does occur, the RtZF™ system has the capability to sense that event since the location and orientation of the vehicle is known.

For large trucks that have varying inertial properties depending on the load that is being hauled, sensors can be placed on the vehicle that measure the angular and linear acceleration of a part of the vehicle. Since the geometry of the road is known, the inertial properties of the vehicle with load can be determined and thus the tendency of the vehicle to roll over can be determined. Again, since the road geometry is known the speed of the truck can be limited to prevent rollovers.

8. ANTICIPATORY SENSING—SMART AIRBAGS, EVOLUTION OF THE SYSTEM

The RtZF™ system is also capable of enhancing other vehicle safety systems. In particular, through knowing the location and velocity of other vehicles, for those cases where an accident cannot be avoided, the RtZF™ system will in general be able to anticipate a crash and make an assessment of the crash severity using, for example, neural network technology. Even with a limited implementation of the RtZF™ system, a significant improvement in smart airbag technology results when used in conjunction with a collision avoidance system such as described in Shaw (U.S. Pat. Nos. 5,314,037 and 5,529,138) and a neural network anticipatory sensing algorithm such as disclosed in U.S. Pat. No. 6,343,810 to Breed. A further enhancement would be to code the signal from RtZF™ system equipped vehicles with information that includes the size and approximate weight of the vehicle. Then, if an accident is inevitable, the severity can also be accurately anticipated and the smart airbag tailored to the pending event. Such a device can be implemented as an RFID tag and made part of the license plate.

It can be seen from the above discussion that the RtZF™ system will evolve in solving many safety, vehicle control and ITS problems. Even such technologies as steering and drive by wire will be enhanced by the RtZF™ system in accordance with invention since it will automatically adjust for failures in these systems and prevent accidents.

9. OTHER ADVANTAGES & ENHANCEMENTS 9.1 GPS and Other Measurement Improvements One of the possible problems with the RtZF™ system described herein is operation in large cities such as downtown New York. In such locations, unless there are a plurality of local pseudolites or precise position location system installations, the signals from the GPS satellites can be significantly blocked. Also there is a severe multipath problem. A solution is to use the LORAN system as a backup for such locations. The accuracy of LORAN can be comparable to DGPS. Naturally, the use of multiple roadway located Precise Positioning Systems would be a better solution or a complementary solution. Additionally, some location improvement can result from application of the SnapTrack system as described in U.S. Pat. No. 5,874,914, which is incorporated herein by reference, and other patents to Krasner of SnapTrack.

The use of geo-synchronous satellites as a substitute for earth bound base stations in a DGPS system, with carrier phase enhancements for sub-meter accuracies, is also a likely improvement to the RtZF™ system that can have a significant effect in downtown areas.

Another enhancement that would be possible with dedicated satellites and/or earth bound pseudolites results from the greater control over the information transmitted than is available from the present GPS system. Recognizing that this system could save in excess of 40,000 lives per year in the U.S. alone, the cost of deploying such special purpose stations can easily be justified. For example, say there exists a modulated wave that is 10000 kilometers long, another one which is 1000 km long etc. down to 1 cm. It would then be easy to determine the absolute distance from one point to the other. The integer ambiguity of RTK DGPS would be eliminated. Other types of modulation are of course possible to achieve the desired result of simply eliminating the carrier integer uncertainty that is discussed in many U.S. patents and other literature. This is not meant to be a recommendation but to illustrate that once the decision has been made to provide information to every vehicle that will permit it to always know its location within 10 cm, many technologies will be there to make it happen. The cost savings resulting from eliminating fatalities and serious injuries will easily cover the cost of such technologies many times over. The provision of additional frequencies can also enhance the system and render differential corrections unnecessary. Each frequency from a satellite is diffracted differently by the ionosphere. The properties of the ionosphere can thus be determined if multiple frequencies are transmitted. This will partially be achieved with the launch of the European Galileo GPS satellite system in combination with the US GPS system.

9.2 Vehicle Enhancements

The RtZF™ system can now be used to improve the accuracy of other vehicle based instruments. The accuracy of the odometer and yaw rate sensors can be improved over time, for example, by regression against the DGPS data. The basic RtZF™ system contains an IMU which comprises three accelerometers and three gyroscopes. This system is always being updated by the DGPS system, odometer, vehicle speed sensor, magnetic field and field vector sensors, PPS and other available sensors through a Kalman filter and in some cases a neural network.

9.3 Highway Enhancements

Enhancements to the roadways that result from the use of the RtZF™ system include traffic control. The timing of the stoplights can now be automatically adjusted based on the relative traffic flow. The position of every vehicle within the vicinity of the light can be known from the communication system discussed above. When all vehicles have the RtZF™ system, many stoplights will no longer be necessary since the flow of traffic through an intersection can be accurately controlled to avoid collisions.

Since the road conditions will now be known to the system, an enhanced RtZF™ system will be able to advise an operator not to travel or, alternately, it can pick an alternate route if certain roads have accidents or have iced over, for example. Some people may decide not drive if there is bad weather or congestion. The important point here is that sensors will be available to sense the road condition as to both traffic and weather, this information will be available automatically and not require reporting from weather stations which usually have only late and inaccurate information. Additionally, pricing for the use of certain roads can be based on weather, congestion, time of day, etc. That is, pricing can by dynamically controlled.

The system lends itself to time and congestion based allocation of highway facilities. A variable toll can automatically be charged to vehicles based on such considerations since the vehicle can be identified. In fact, automatic toll systems now being implemented will likely become obsolete as will all toll booths.

Finally, it is important to recognize that the RtZF™ system is not a "sensor fusion" system. Sensor fusion is based on the theory that you can take inputs from different sensors and combine them in such a way as to achieve more information from the combined sensors than from treating the sensor outputs independently in a deterministic manner. The ultimate sensor fusion system is based on artificial neural networks, sometimes combined with fuzzy logic to form a neural fuzzy system. Such systems are probabilistic. Thus there will always be some percentage of cases where the decision reached by the network will be wrong. The use of such sensor fusion, therefore, is inappropriate for the "Zero Fatalities" goal of the invention, although several of the sub-parts of the system may make use of neural networks.

9.4 Map Enhancements

Once the road edge and lane locations, and other roadway information, are transmitted to the operator, it requires very little additional bandwidth to include other information such as the location of all businesses that a traveler would be interested in such as gas stations, restaurants etc. which could be done on a subscription basis. This concept was partially disclosed in the '482 patent discussed above and partially implemented in existing map databases.

Naturally, the communication of information to the operator could be done either visually or orally as described in U S. Pat. No. 5,177,685 or U.S. patent application Ser. No. 09/645,709 filed Aug. 14, 2000, both of which are incorporated by reference herein. Finally, the addition of a route guidance system as described in other patents becomes even more feasible since the exact location of a destination can be determined. The system can be configured so that a vehicle operator could enter a phone number, for example, or an address and the vehicle would be automatically and safely driven to that location. Since the system knows the location of the edge of every roadway, very little, if any, operator intervention would be required. Even a cell phone number can be used if the cell phone has the SnapTrack GPS location system as soon to be provided by Qualcomm.

9.5 Other Uses

The RtZF™ system can replace vehicle crash and rollover sensors for airbag deployment and other sensors now on or being considered for automobile vehicles including pitch, roll and yaw sensors. This information is available from the IMU and is far more accurate than these other sensors. It can also be found by using carrier phase GPS by adding more antennas to the vehicle. Additionally, once the system is in place for land vehicles, there will be many other applications such as surveying, vehicle tracking and aircraft landing which will benefit from the technology and infrastructure improvements. The automobile safety issue and ITS will result in the implementation of a national system which provides any user with low cost equipment the ability to know precisely where he is within centimeters on the face of the earth. Many other applications will undoubtedly follow.

10. THE RtZF™ SYSTEM

The design of this system is now occurring. From the above discussion, two conclusions should be evident. There are significant advantages in accurately knowing where the vehicle, the roadway and other vehicles are and that possession of this information is the key to reducing fatalities to zero. Second, there are many technologies that are already in existence that can provide this information to each vehicle. Once there is a clear direction that this is the solution then many new technologies will emerge. There is nothing inherently expensive about these technologies and once the product life cycle is underway, the added cost to vehicle purchasers will be minimal. Roadway infrastructure costs will be minimal and system maintenance costs almost nonexistent.

Most importantly, the system has the capability of reducing fatalities to zero!

10.1 Technical Issues

The accuracy of DGPS has been demonstrated numerous times in small controlled experiments, most recently by the University of Minnesota and SRI.

The second technical problem is the integrity of the signals being received and the major cause of the lack of integrity is the multi-path effect. Considerable research has gone into solving the multi-path effect and Trimble, for example, claims that this problem is no longer an issue.

The third area is availability of GPS and DGPS signals to the vehicle as it is driving down the road. The system is designed to tolerate temporary losses of signal, up to a few minutes. That is the prime function of the inertial navigation system (INS). Prolonged absence of the GPS signal will significantly degrade system performance. There are two primary causes of lack of availability, namely, temporary causes and permanent causes. Temporary causes result from a car driving between two trucks for an extended period of time, blocking the GPS signals. The eventual solution to this problem is to change the laws to prevent trucks from traveling on both sides of an automobile. If this remains a problem, a warning will be provided to the driver that he/she is losing system integrity and therefore he/she should speed up or slow down to regain a satellite view. This could also be done automatically.

Permanent blockage of the GPS signals, as can come from operating the vehicle in a tunnel or in the downtown of a large city, can be corrected through the use of pseudolites or other guidance systems such as the SnapTrack system or the PPS described here. This is not a serious problem since very few cars run off the road in a tunnel or in downtown Manhattan. Eventually it is expected that the PPS will become ubiquitous thereby rendering GPS as the backup system.

The final technical impediment is the operation of the diagnostic system that verifies that the system is operating properly. This requires an extensive failure mode and effect analysis and the design of a diagnostic system that answers all of the concerns of the FMEA.

10.2 Cost Issues

The primary cost impediment is the cost of the DGPS hardware. A single base station and roving receiver that will give an accuracy of 2 centimeters (1 σ) currently costs about $25,000. This is a temporary situation brought about by low sales volume. Since there is nothing exotic in the receiving unit, the cost can be expected to follow typical automotive electronic life-cycle costs and therefore the projected high volume production cost of the electronics for the DGPS receivers is below $100 per vehicle. In the initial implementation of the system, an OmniSTAR™ DGPS system will be used providing an accuracy of 6 cm. The US national DGPS system is now coming on line and thus the cost of the DGPS corrections will soon approach zero.

A similar argument can be made for the inertial navigation system. Considerable research and development effort is ongoing to reduce the size, complexity and cost of these systems. Three technologies are vying for this rapidly growing market: laser gyroscopes, fiber-optic lasers, and MEMS systems. The cost of these units today range from a few hundred to ten thousand dollars each, however, once again this is due to the very small quantity being sold. Substantial improvements are being made in the accuracies of the MEMS systems and it now appears that such a system will be accurate enough for RtZF™ purposes. The cost of these systems in high-volume production is expected to be below ten dollars each. This includes at least a yaw rate sensor with three accelerometers and probably three angular rate sensors. The accuracy of these units is currently approximately 0.003 degrees per second. This is a random error which can be corrected somewhat by the use of multiple vibrating elements. A new laser gyroscope has recently been announced by Intellisense Corporation which should provide a dramatic cost reduction and accuracy improvement.

Eventually, when most vehicles on the road have the RtZF™ system, then communication between the vehicles can be used to substantially improve the location accuracy of each vehicle as described above.

The cost of mapping the continental United States (CONUS) is largely an unknown at this time. OmniSTAR has stated that they will map any area with sufficient detail at a cost of $300 per mile. They have also indicated the cost will drop substantially as the number of miles to be mapped increases. This mapping would be done by helicopter using cameras and their laser ranging system. Another method is to outfit a ground vehicle with equipment that will determine the location of the lane and shoulder boundaries of road and other information. Such a system has been used for mapping a Swedish highway. One estimate is that the mapping of a road will be reduced to approximately $50 per mile for major highways and rural roads and a somewhat higher number for urban areas. The goal is to map the country to an accuracy of 2 to 10 centimeters (1 σ).

Related to the costs of mapping is the cost of converting the raw data acquired either by helicopter or by ground vehicle into a usable map database. The cost for manually performing this vectorization process has been estimated at $100 per mile by OmniSTAR. This process can be substantially simplified through the use of raster to vector conversion software. Such software is currently being used for converting hand drawings into CAD systems, for example. The Intergraph Corp. provides hardware and software for simplifying this task. It is therefore expected that the cost for vectorization of the map data will follow proportionately a similar path to the cost of acquiring the data and may eventually reach $10 to $20 per mile for the rural mapping and $25 to a $50 per mile for urban areas. Considering that there are approximately four million miles of roads in the CONUS, and assuming we can achieve an average of $150 for acquiring the data and converting the data to a GIS database can be achieved, the total cost for mapping all of the roads in United States will amount to $600 million. This cost would obviously be spread over a number of years and thus the cost per year is manageable and small in comparison to the $215 billion lost every year due to death, injury and lost time from traffic congestion.

Another cost factor is the lack of DGPS base stations. The initial analysis indicated that this would be a serious problem as using the latest DGPS technology requires a base station every 30 miles. Upon further research, however, it has been determined that the OmniSTAR company has now deployed a nationwide WADGPS system with 6 cm accuracy. The initial goal of the RtZF™ system was to achieve 2 cm accuracy for both mapping and vehicle location. The 2 cm accuracy can be obtained in the map database since temporary differential base stations will be installed for the mapping purposes. By relaxing the 2 cm requirement to 6 cm, the need for base stations every 30 miles disappears and the cost of adding a substantial number of base stations is no longer a factor.

The next impediment is the lack of a system for determining when changes are planned for the mapped roads. This will require communication with all highway and road maintenance organizations in the mapped area.

A similar impediment to the widespread implementation of this RtZF™ system is the lack of a communication system for supplying map changes to the equipped vehicles.

10.3 Educational Issues

A serious impediment to the implementation of this system that is related to the general lack of familiarity with the system, is the belief that significant fatalities and injuries on the U.S. highways are a fact of life. This argument is presented in many forms such as "the perfect is the enemy of the good". This leads to the conclusion that any system that portends to reduce injury should be implemented rather than taking the viewpoint that driving an automobile is a process and as such it can be designed to achieve perfection. As soon as it is admitted that perfection cannot be achieved, then any fatality gets immediately associated with this fact. This of course was the prevailing view among all manufacturing executives until the zero defects paradigm shift took place. The goal of the "Zero Fatalities" program is not going to be achieved in a short period of time. Nevertheless, to plan anything short of zero fatalities is to admit defeat and to thereby allow technologies to enter the market that are inconsistent with a zero fatalities goal.

10.4 Potential Benefits when the System is Deployed.

10.4.1 Assumptions for the Application Benefits Analysis

The high volume incremental cost of an automobile will be $200.

The cost of DGPS correction signals will be a onetime charge of $50 per vehicle.

The benefits to the vehicle owner from up-to-date maps and to the purveyors of services located on these maps. will cover the cost of updating the maps as the roads change.

The cost of mapping substantially all roads in the Continental U.S. will be $600 million.

The effects of phasing in the system will be ignored.

There are 15 million vehicles sold in the U.S. each year.

Of the 40,000 plus people killed on the roadways, at least 10% are due to road departure, yellow line infraction, stop sign infraction, excessive speed and other causes which will be eliminated by the Phase Zero deployment.

$165 billion are lost each year due to highway accidents.

The cost savings due to secondary benefits will be ignored.

10.4.2 Analysis Methods Described.

The analysis method will be quite simple. Assume that 10% of the vehicles on the road will be equipped with RtZF™ systems in the first year and that this will increase by 10 percent each year. Ten percent or 4000 lives will be saved and a comparable percentage of injuries. Thus, in the first year, one percent of $165 billion dollars will be saved or $1.65 billion. In the second year, this saving will be $3.3 billion and the third year $4.95 billion. The first-year cost of implementation of the system will be $600 million for mapping and $3.75 billion for installation onto vehicles. The first year cost therefore will be $4.35 billion and the cost for the second and continuing years will be $3.75 billion. Thus, by the third year the benefits exceed the costs and by the 10th year the benefits will reach $16.5 billion compared with costs of $3.75 billion yielding a benefits to cost ratio of more than 4.

Before the fifth year of deployment, it is expected that the other parts of the RtZF™ system will begin to be deployed and that the benefits therefore are substantially understated. It is also believed that the $250 price for the Phase Zero system on a long-term basis is high and it is expected that the price to drop substantially. No attempt has been made to estimate the value of the time saved in congestion or efficient operation of the highway system. Estimates that have been presented by others indicate that as much as a two to three times improvement in traffic through flow is possible. Thus, a substantial portion of the $50 billion per year lost in congestion delays will also be saved when the full RtZF™ system is implemented.

It is also believed that the percentage reduction of fatalities and injuries has been substantially understated. For the first time, there will be some control over the drunk or otherwise incapacitated driver. If the excessive speed feature is implemented, then gradually the cost of enforcing the nation's speed limits will begin to be substantially reduced. Since it is expected that large trucks will be among first vehicles to be totally covered with the system, perhaps on a retrofit basis, it is expected that the benefits to commercial vehicle owners and operators will be substantial. Naturally, the retrofit market may rapidly develop and the assumptions of vehicles with deployed systems may be low. None of these effects have been taken into account in the above analysis.

The automated highway systems resulting from RtZF™ implementation is expected to double or even triple in effective capacity by increasing speeds and shortening distances between vehicles. Thus, the effect on highway construction cost could be significant.

10.5 Initial System Deployment

The initial implementation of the RtZF™ system would include the following services:

1. A warning is issued to the driver when the driver is about to depart from the road.

2. A warning is issued to the driver when the driver is about to cross a yellow line or other lane boundary.

3. A warning is provided to the driver when the driver is exceeding a safe speed limit for the road geometry.

4. A warning is provided to the driver when the driver is about to go through a stop sign without stopping.

5. A warning is provided to the driver when the driver is about run the risk of a rollover.

6. A warning will be issued prior to a rear end impact by the equipped vehicle.

7. In-vehicle signage will be provided for highway signs (perhaps with a multiple language option).

8. A recording will be logged whenever a warning is issued.

11. DETAILED DESCRIPTION OF THE ILLUSTRATIONS

FIG. 1 shows the current GPS satellite system associated with the earth and including 24 satellites 2, each satellite revolving in a specific orbital path 4 around the earth. By means of such a GPS satellite system, the position of any object can be determined with varying degrees of precision as discussed in detail above. A similar system will appear when the European Galileo system is launched perhaps doubling the number of satellites.

Figure 2:
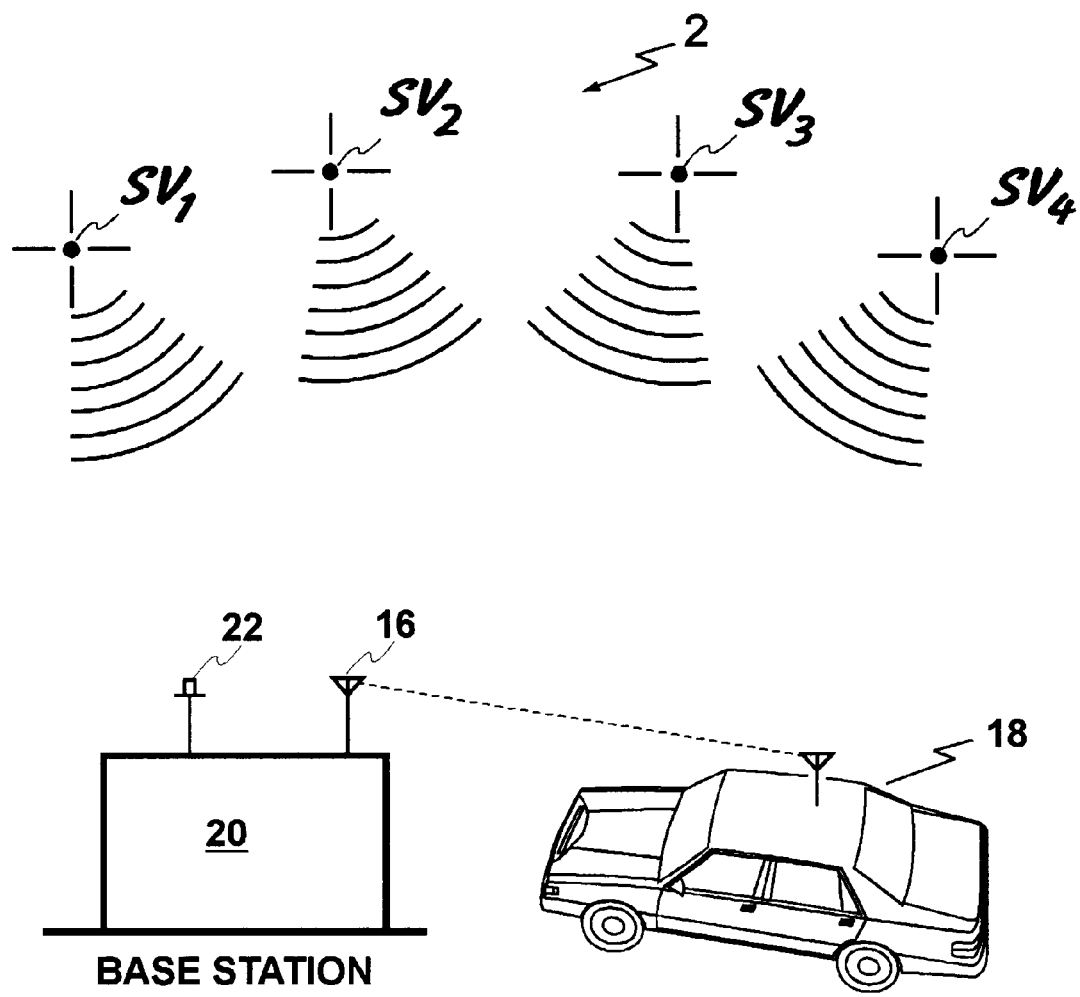
FIG. 2 illustrates four GPS satellites transmitting position information to a vehicle and to a base station which in turn transmits the differential correction signal to the vehicle.

FIG. 2 shows an arrangement of four satellites 2 designated $SV_1$, $SV_2$, $SV_3$ and $SV_4$ of the GPS satellite system shown in FIG. 1 transmitting position information to receiver means of a base station 20, such as an antenna 22, which in turn transmits a differential correction signal via transmitter means associated with that base station, such as a second antenna 16, to a vehicle 18.

Additional details relating to FIGS. 1–2 can be found in U.S. Pat. No. 5,606,506 to Kyrtsos.

Figure 3:
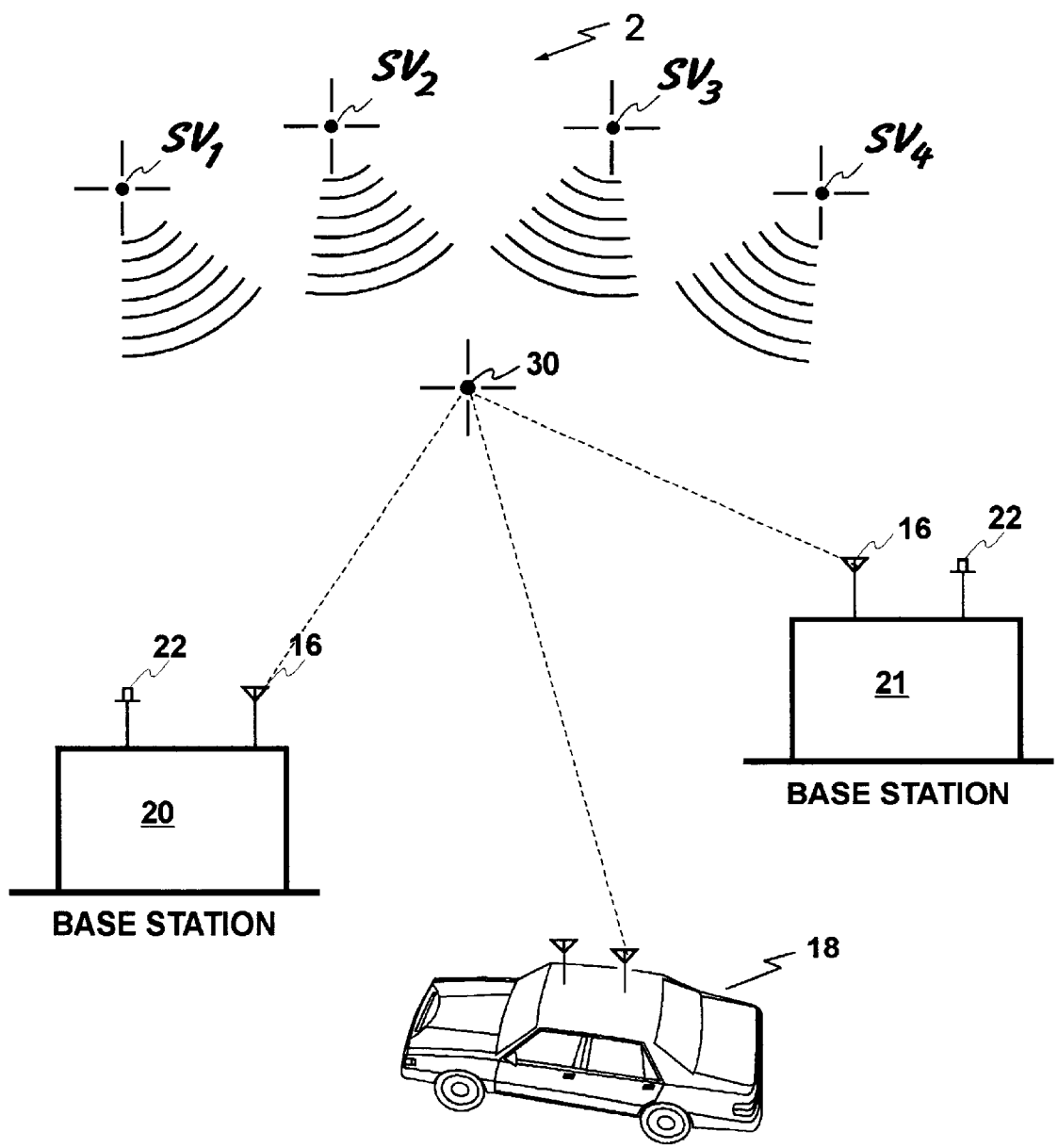
FIG. 3 illustrates a WADGPS system with four GPS satellites transmitting position information to a vehicle and to a base station which in turn transmits the differential correction signal to the vehicle.

FIG. 3 shows an arrangement of four satellites 2 designated $SV_1$, $SV_2$, $SV_3$ and $SV_4$ of the GPS satellite system as in FIG. 2 transmitting position information to receiver means of base stations 20 and 21, such as an antenna 22, which in turn transmit a differential correction signal via transmitter means associated with that base stations, such as a second antenna 16, to a geocentric or low earth orbiting (LEO) satellite 30 which in turn transmits the differential correction signals to vehicle 18. In this case, one or more of the base stations 20,21 receives and performs a mathematical analysis on all of the signals received from a number of base stations that cover the area under consideration and forms a mathematical model of the errors in the GPS signals over the entire area. For the continental United States, for example, a group of 13 base stations are operated by OmniStar that are distributed around the country. By considering data from the entire group of such stations, the errors in the GPS signals for the entire area can be estimated resulting in a position accuracy of about 6–10 cm over the entire area. The corrections are then uploaded to the geocentric or low earth orbiting satellite 30 for retransmission to vehicles on the roadways. In this way, such vehicles are able to determine their absolute position to within about 6–10 centimeters. This is known as Wide Area Deferential GPS or WADGPS.

The WAAS system is another example of WADGPS for use with airplanes. The U.S. Government estimates that the accuracy of the WAAS system is about 1 meter in three dimensions. Since the largest error is in the vertical direction, the horizontal error is much less.

Figure 4:
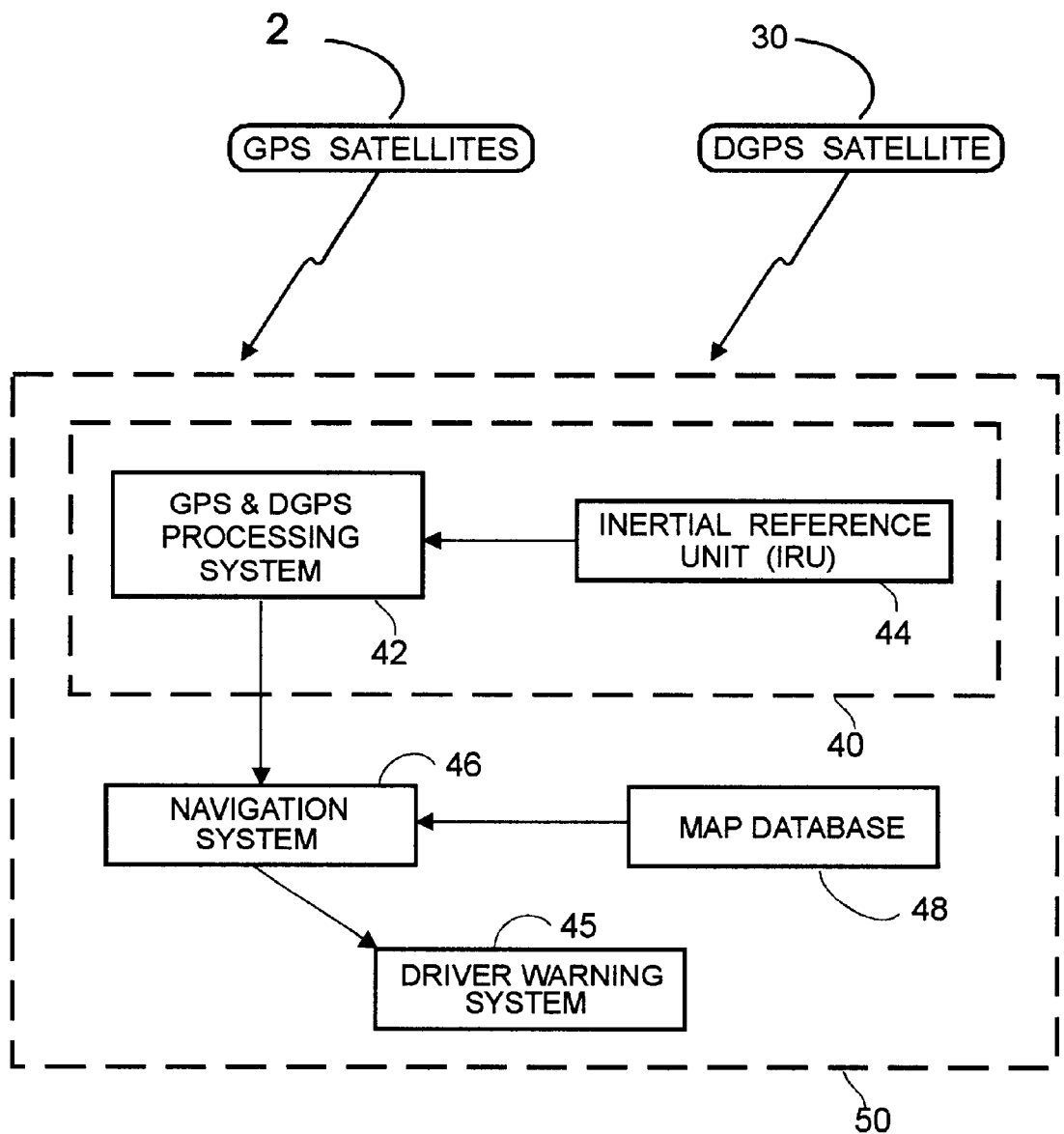
FIG. 4 is a logic diagram showing the combination of the GPS system and an inertial navigation system.

FIG. 4 is a logic diagram of the system 50 in accordance with the invention showing the combination 40 of the GPS and DGPS processing systems 42 and an inertial reference unit (IRU) or inertial navigation system (INS) 44. The GPS system includes a unit for processing the received information from the satellites 2 of the GPS satellite system, the information from the satellites 30 of the DGPS system and data from the inertial reference unit 44. The inertial reference unit 44 contains accelerometers and laser or MEMS gyroscopes.

The system shown in FIG. 4 is a minimal RtZF™ system that can be used to prevent road departure, lane crossing and intersection accidents, which together account for more than about 50% of the fatal accidents in the United States.

Map database 48 works in conjunction with a navigation system 46 to provide a warning to the driver when he or she is about to run off the road, cross a yellow line, run a stop sign, or run a red stoplight. The map database 48 contains a map of the roadway to an accuracy of 2 cm (1 sigma), i.e., data on the edges of the lanes of the roadway and the edges of the roadway, and the location of all stop signs and stoplights and other traffic control devices such as other types of road signs. Another sensor, not shown, provides input to the vehicle indicating that an approaching stoplight is red, yellow or green. Navigation system 46 is coupled to the GPS and DGPS processing system 42. For this simple system, the driver is warned if any of the above events is detected by a driver warning system 45 coupled to the navigation system 46. The driver warning system 45 can be an alarm, light, buzzer or other audible noise, or, preferably, a simulated rumble strip for yellow line and "running off of road" situations and a combined light and alarm for the stop sign and stoplight infractions.

FIG. 5 is a block diagram of the more advanced accident avoidance system of this invention and method of the present invention illustrating system sensors, transceivers, computers, displays, input and output devices and other key elements.

As illustrated in FIG. 5, the vehicle accident avoidance system is implemented using a variety of microprocessors and electronic circuits 100 to interconnect and route various signals between and among the illustrated subsystems. GPS receiver 52 is used to receive GPS radio signals as illustrated in FIG. 1. DGPS receiver 54 receives the differential correction signals from one or more base stations either directly or via a geocentric stationary or LEO satellite, an earth based station or other means. Inter-vehicle communication subsystem 56 is used to transmit and receive information between various nearby vehicles. This communication will in general take place via broad band or ultra-broad band communication techniques, or on dedicated frequency radio channels, or in the preferred mode, noise communication system as described above. This communication may be implemented using multiple access communication methods including frequency division multiple access (FDMA), timed division multiple access (TDMA), or code division multiple access (CDMA), or noise communication system, in a manner to permit simultaneous communication with and between a multiplicity of vehicles. Naturally, other forms of communication between vehicles are possible such as through the Internet. This communication will consist of such information as the precise location of a vehicle, the latest received signals from the GPS satellites in view, other road condition information, emergency signals, hazard warnings, vehicle velocity and intended path, and any other information which is useful to improve the safety of the vehicle road system.

Infrastructure communication system 58 permits bi-directional communication between the host vehicle and the infrastructure and includes such information transfer as updates to the digital maps, weather information, road condition information, hazard information, congestion information, temporary signs and warnings, and any other information which can improve the safety of the vehicle highway system.

Cameras 60 are used generally for interrogating environment nearby the host vehicle for such functions as blind spot monitoring, backup warnings, anticipatory crash sensing, visibility determination, lane following, and any other visual information which is desirable for improving the safety of the vehicle highway system. Generally, the cameras will be sensitive to infrared and/or visible light, however, in some cases a passive infrared camera will the used to detect the presence of animate bodies such as deer or people on the roadway in front of the vehicle. Frequently, infrared or visible illumination will be provided by the host vehicle.

Radar 62 is primarily used to scan an environment close to and further from the vehicle than the range of the cameras and to provide an initial warning of potential obstacles in the path of the vehicle. The radar 62 can also be used when conditions of a reduced visibility are present to provide advance warning to the vehicle of obstacles hidden by rain, fog, snow etc. Pulsed, continuous wave, noise or micropower impulse radar systems can be used as appropriate. Also Doppler radar principles can be used to determine the object to host vehicle relative velocity.

Laser radar 64 is primarily used to illuminate potential hazardous objects that are in the path of the vehicle. Since the vehicle will be operating on accurate mapped roads, the precise location of objects discovered by the radar or camera systems can be determined using range gating and scanning laser radar as described above or by phase techniques.

The driver warning system 66 provides visual and audible warning messages to the driver or others that a hazard exists. In addition to activating a warning system within the vehicle, this system can activate sound and light systems to warn other people, animals, or vehicles of a pending hazardous condition. In such cases, the warning system could activate the vehicle headlights, tail lights, horn and/or the vehicle to vehicle, internet or infrastructure communication system to inform other vehicles, a traffic control station or other base station. This system will be important during the early stages of implementation of RtZF, however as more and more vehicles are equipped with the system, there will be less need to warn the driver or others of potential problems.

Map database subsystem 68, which could reside on an external memory module, will contain all of the map information such as road edges up to 2 cm accuracy, the locations of stop signs, stoplights, lane markers etc. as described in detail above. The fundamental map data can be organized on read-only magnetic or optical memory with a read/write associated memory for storing map update information. Alternatively, the map information can be stored on rewritable media that can be updated with information from the infrastructure communication subsystem 58. This updating can take place while the vehicle is being operated or, alternatively, while the vehicle is parked in a garage or on the street.

Three servos are provided for controlling the vehicle during the later stages of implementation of the RtZF™ product and include the brake servo 70, the steering servo 72, and the throttle servo 74. The vehicle can be controlled using deterministic, fuzzy logic, neural network or, preferably, neural-fuzzy algorithms.

As a check on the inertial system, a velocity sensor 76 based on a wheel speed sensor, or ground speed monitoring system using lasers, radar or ultrasonics, for example, can be provided for the system. A radar velocity meter is a device which transmits a noise modulated radar pulse toward the ground at an angle to the vertical and measures the Doppler velocity of the returned signal to provide an accurate measure of the vehicle velocity relative to the ground. Another radar device can be designed which measures the displacement of the vehicle. Naturally other modulation techniques and other radar systems can be used to achieve similar results. Other systems are preferably used for this purpose such as the GPS/DGPS or precise position systems.

The inertial navigation system (INS), sometimes called the inertial reference unit or IRU, comprises one or more accelerometers 78 and one or more gyroscopes 80. Usually, three accelerometers would be required to provide the vehicle acceleration in the latitude, longitude and vertical directions and three gyroscopes would be required to provide the angular rate about the pitch, yaw and roll axes. In general, a gyroscope would measure the angular rate or angular velocity. Angular acceleration may be obtained by differentiating the angular rate.

A gyroscope 80, as used herein in the IRU, includes all kinds of gyroscopes such as MEMS based gyroscopes, fiber optic gyroscopes (FOG) and accelerometer based gyroscopes.

Accelerometer-based gyroscopes encompass a situation where two accelerometers are placed apart and the difference in the acceleration is used to determine angular acceleration and a situation where an accelerometer is placed on a vibrating structure and the Coriolis effect is used to obtain the angular velocity.

The possibility of an accelerometer-based gyroscope 80 in the IRU is made possible by construction of a suitable gyroscope by Interstate Electronics Corporation (IEC). IEC manufactures IMUs in volume based on μSCIRAS (micromachined Silicon Coriolis Inertial Rate and Acceleration Sensor) accelerometers. Detailed information about this device can be found at IEC website at iechome.com.

There are two ways of measuring the angular velocity (acceleration) using accelerometers. The first way involves installing the accelerometers at a distance from one another and calculating the angular velocity by the difference of readings of the accelerometers using dependencies between the centrifugal and tangential accelerations and the angular velocity/acceleration. This way requires significant accuracy of the accelerometers.

The second way is based on the measurement of the Coriolis acceleration that arises when the mass of the sensing element moves at a relative linear speed and the whole device performs a transportation rotation about the perpendicular axis. This principle is a basis of all mechanical gyroscopes, including micromachined ones. The difference of this device is that the micromachined devices aggregate the linear oscillation excitation system and the Coriolis acceleration measurement system, while two separate devices are used in the proposed second method. The source of linear oscillations is the mechanical vibration suspension, and the Coriolis acceleration sensors are the micromachined accelerometers. On one hand, the presence of two separate devices makes the instrument bigger, but on the other hand, it enables the use of more accurate sensors to measure the Coriolis acceleration. In particular, compensating accelerometer systems could be used which are more accurate by an order of magnitude than open structures commonly used in micromachine gyroscopes.

Significant issues involved in the construction of an accelerometer-based gyroscope are providing a high sensitivity of the device, a system for measuring the suspension vibration, separating the signals of angular speed and linear acceleration; filtering noise in the output signals of the device at the suspension frequency, providing a correlation between errors in the channels of angular speed and linear acceleration, considering the effect of nonlinearity of the accelerometers and the suspension on the error of the output signals.

A typical MEMS based gyroscope uses a quartz tuning fork. The vibration of the tuning fork, along with applied angular rotation (yaw rate of the car), creates Coriolis acceleration on the tuning fork. An accelerometer or strain gage attached to the tuning fork measures the minute Coriolis force. Signal output is proportional to the size of the tuning fork. To generate enough output signal, the tuning fork must vibrate forcefully. Often, this can be accomplished with a high Q structure. Manufacturers often place the tuning fork in a vacuum to minimize mechanical damping by air around the tuning fork. High Q structures can be fairly fragile.

The gyroscope often experiences shock and vibration because it must be rigidly connected to the car to accurately measure yaw rate. This mechanical noise can introduce signals to the Coriolis pick-off accelerometer that is several orders of magnitude higher than the tuning-fork generated Coriolis signal. Separating the signal from the noise isn't easy. Often, the shock or vibration saturates the circuitry and makes the gyroscope output unreliable for a short time.

Conventional MEMS based gyroscopes are usually bulky (100 cm$^3$ or more is not uncommon). This is partly the result of the addition of mechanical antivibration mounts, which are incorporated to minimize sensitivity to external vibration.

New MEMS based gyroscopes avoid these shortcomings, though. For example, Analog Devices' iMEMS gyro is expected to be 7 by 7 by 3 mm (0.15 cm$^3$). Rather than quartz, it uses a resonating polysilicon beam structure, which creates the velocity element that produces the Coriolis force when angular rate is presented to it. At the outer edges of the polysilicon beam, orthogonal to the resonating motion, a capacitive accelerometer measures the Coriolis force. The gyroscope has two sets of beams in antiphase that are placed next to each other, and their outputs are read differentially, attenuating external vibration sensitivity.

An accelerometer 78, as used herein in the IRU, includes conventional piezoelectric based accelerometers, MEMS based accelerometers (such as made by Analog Devices) and the type as described in U.S. Pat. No. 6,182,509 entitled "Accelerometer without proof mass", incorporated by reference herein in its entirety.

Display subsystem 82 includes an appropriate display driver and either a heads-up or other display system for providing system information to the vehicle operator. The information can be in the form of non-critical information such as the location of the vehicle on a map, as chosen by the vehicle operator and/or it can consist of warning or other emergency messages provided by the vehicle subsystems or from communication with other vehicles or the infrastructure. An emergency message that the road has been shed out ahead, for example, would be an example of such a message.

Generally, the display will make use of icons when the position of the host vehicle relative to obstacles or other vehicles is displayed. Occasionally, as the image can be displayed especially when the object cannot be identified.

A general memory unit 84 which can comprise read-only memory or random access memory or any combination thereof, is shown. This memory module, which can be either located at one place or distributed throughout the system, supplies the information storage capability for the system.

For advanced RtZF™ systems containing the precise positioning capability, subsystem 86 provides the capability of sending and receiving information to infrastructure-based precise positioning tags or devices which may be based on noise or micropower impulse radar technology, radar reflector or RFIR technology or equivalent.

In some locations where weather conditions can deteriorate and degrade road surface conditions, various infrastructure-based sensors can be placed either in or adjacent to the road surface. Subsystem 88 is designed to interrogate and obtained information from such road-based systems. An example of such a system would be an RFID tag containing a temperature sensor. This device may be battery-powered or, preferably, would receive its power from the vehicle-mounted interrogator, or other host vehicle-mounted source, as the vehicle passes nearby the device. In this manner, the vehicle can obtain the temperature of the road surface and receive advanced warning when the temperature is approaching conditions which could cause icing of the roadway, for example. An RFID based on a surface acoustic wave (SAW) device is one preferred example of such a sensor, see U.S. patent application Ser. No. 10/079,065 filed Feb. 19, 2002, incorporated by reference herein. An infrared sensor on the vehicle can also be used to determine the road temperature and the existence of ice or snow.

In order to completely eliminate automobile accidents, a diagnostic system is required on the vehicle that will provide advanced warning of any potential vehicle component failures. Such a system is described in U.S. Pat. No. 5,809,437 (Breed), incorporated by reference herein.

For some implementations of the RtZF™ system, stoplights will be fitted with transmitters which will broadcast a signal when the light is red. Such a system could make use of the vehicle noise communication system as described above. This signal can be then received by a vehicle that is approaching the stoplight provided that vehicle has the proper sensor as shown as 92. Alternatively, a camera can be aimed in the direction of stoplights and, since the existence of the stoplight will be known by the system as it will have been recorded on the map, the vehicle will know when to look for a stoplight and determine the color of the light.

Although atomic clocks are probably too expensive to the deployed on automobiles, nevertheless there has been significant advances recently in the accuracy of clocks to the extent that it is now feasible to place a reasonably accurate clock as a subsystem 94 to this system. Since the clock can be recalibrated from each DGPS transmission, the clock drift can be accurately measured and used to predict the precise time even though the clock by itself may be incapable of doing so. To the extent that the vehicle contains an accurate time source, the satellites in view requirement can temporarily drop from 4 to 3. An accurate clock also facilitates the carrier phase DGPS implementations of the system as discussed above.

Naturally, power must be supplied to the system as shown by power subsystem 96. Certain operator controls are also permitted as illustrated in subsystem 98.

The control processor or central processor and circuit board subsystem 100 to which all of the above components 52–98 are coupled, performs such functions as GPS ranging, DGPS corrections, image analysis, radar analysis, laser radar scanning control and analysis of received information, warning message generation, map communication, vehicle control, inertial navigation system calibrations and control, display control, precise positioning calculations, road condition predictions, and all other functions needed for the system to operate according to design.

With respect to warning message generation, a display could be provided visible to the driver and/or passengers of the vehicle. The warning could also be in the form of an audible tone, a simulated rumble strip and light and other similar ways to attract the attention of the driver and/or passengers. With respect to vehicle control, this also encompasses control over the vehicle to prevent accidents. By considering information from the map database 48 of the navigation system 46, and the position of the vehicle obtained via GPS systems, a determination can be made whether the vehicle is about to run off the road, cross a yellow line and run a stop sign, as well as the existence or foreseen occurrence of other potential crash situations. The color of an approaching stoplight can also be factored in the vehicle control.

Figure 5A:
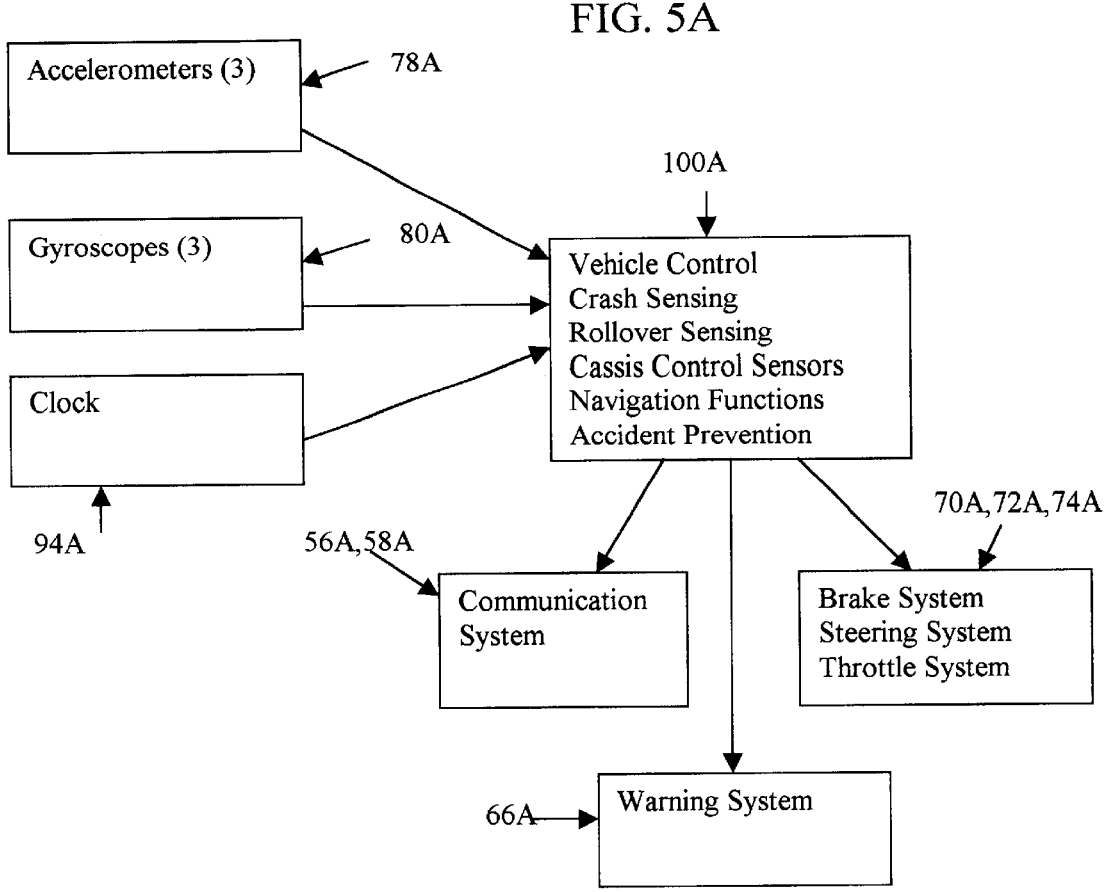
FIG. 5A is a block diagram of a representative accident avoidance, warning and control system.

FIG. 5A shows a selected reduced embodiment of the accident avoidance system shown in FIG. 5. The system includes an inertial reference unit including a plurality of accelerometers and gyroscopes, namely accelerometers 78A, preferably three of any type disclosed above, and gyroscopes 80A, preferably three of any type disclosed above. A clock 94A is provided to obtain a time base or time reference. This system will accurately determine the motion (displacement, acceleration and/or velocity) of the vehicle in 6 degrees of freedom (3 displacements (longitudinal, lateral and vertical) via the accelerometers 78A and three rotations (pitch, yaw and roll) via the gyroscopes 80A. As such, along with a time base from clock 94A, the processor 100A can determine that there was an accident and precisely what type of accident it was in terms of the motion of the vehicle (frontal, side, rear and rollover). This system is different from a crash sensor in that this system can reside in the passenger compartment of the vehicle where it is protected from actually being in the accident crush and/or crash zones and thus it does not have to forecast the accident severity. It knows the resulting vehicle motion and therefore exactly what the accident was and what the injury potential is. A typical crash sensor can get destroyed or at least rotated during the crash and thus will not determine the real severity of the accident.

Processor 100A is coupled to the inertial reference unit and also is capable of performing the functions of vehicle control, such as, crash sensing, rollover sensing, cassis control sensing, navigation functions and accident prevention, as discussed herein, via control of the brake system 70A, steering system 72A and throttle system 74A.

Preferably a Kalman filter is used to optimize the data from the inertial reference unit as well as other input sources of data, signals or information. Also, a neural network, fuzzy logic or neural-fuzzy system could be used to reduce the data obtained from the various sensors to a manageable and optimal set. The actual manner in which a Kalman filter can be constructed and used in the invention would be left to one skilled in the art.

Further, the information from the accelerometers 78A and gyroscopes 80A in conjunction with the time base or reference is transmittable via the communication system 56A, 58A to other vehicles, possibly for the purpose of enabling other vehicles to avoid accidents with the host vehicle, and/or to infrastructure.

One particularly useful function would be for the processor to send data from, or data derived from, the accelerometers and gyroscopes relating to a crash, i.e., indicative of the severity of the accident with the potential for injury to occupants, to a monitoring location for the dispatch of emergency response personnel, i.e., an EMS facility or fire station. Other telematics functions could also be provided.

Figure 6:
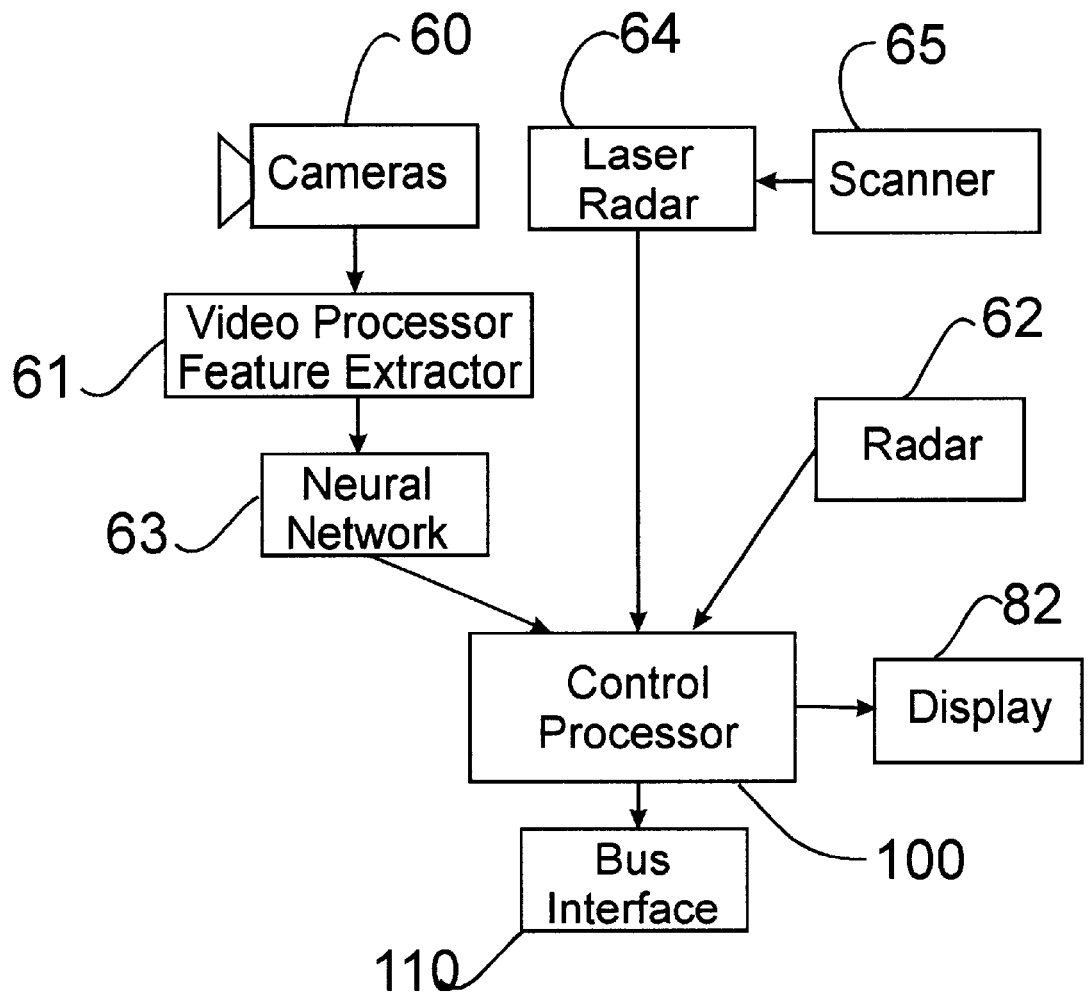
FIG. 6 is a block diagram of an image analysis computer of the type that can be used in the accident avoidance system and method of this invention.

FIG. 6 is a block diagram of the host vehicle exterior surveillance system. Cameras 60 are primarily intended for observing the immediate environment of the vehicle. They are used for recognizing objects that could be most threatening to the vehicle, i.e., closest to the vehicle. These objects include vehicles or other objects that are in the vehicle blind spot, objects or vehicles that are about to impact the most vehicle from any direction, and objects either in front of or behind the host vehicle which the host vehicle is about to impact. These functions are normally called blind spot monitoring and collision anticipatory sensors.

As discussed above, the cameras 60 can use naturally occurring visible or infrared radiation or they may be supplemented with sources of visible or infrared illumination from the host vehicle. The cameras 60 used are preferably high dynamic range cameras that have a dynamic range exceeding 60 db and preferably exceeding 100 db. Such commercially available cameras include those manufactured by the Photobit Corporation in California and the IMS Chips Company in Stuttgart Germany. Alternately, various other means exist for increasing the effective dynamic range through shutter control or illumination control using a Kerr or Pokel cell, modulated illumination, external pixel integration etc.

These cameras are based on CMOS technology and can have the important property that pixels are independently addressable. Thus, the control processor may decide which pixels are to be read at a particular time. This permits the system to concentrate on certain objects of interest and thereby make more effective use of the available bandwidth.

Video processor printed circuit boards 61 can be located adjacent and coupled to the cameras 60 so as to reduce the information transferred to the control processor. The video processor boards 61 can also perform the function of feature extraction so that all values of all pixels do not need to be sent to the neural network for identification processing. The feature extraction includes such tasks as determining the edges of objects in the scene and, in particular, comparing and subtracting one scene from another to eliminate unimportant background images and to concentrate on those objects which had been illuminated with infrared radiation, for example, from the host vehicle. By these and other techniques, the amount of information to be transferred to the neural network is substantially reduced.

The neural network 63 receives the feature data extracted from the camera images by the video processor feature extractor 61 and uses this data to determine the identification of the object in the image. The neural network 63 has been previously trained on a library of images that can involve as many as one million such images. Fortunately, the images seen from one vehicle are substantially the same as those seen from another vehicle and thus the neural network 63 in general does not need to be trained for each host vehicle type.

As the number of image types increases, modular neural networks can be used to simplify the system.

Although the neural network 63 has in particular and described above and will be described in more detail below, other pattern recognition techniques are also applicable. One such technique uses the Fourier transform of the image and utilizes either optical correlation techniques or a neural network trained on the Fourier transforms of the images rather than on the image itself. In one case, the optical correlation is accomplished purely optically wherein the Fourier transform of the image is accomplished using diffraction techniques and projected onto a display, such as a garnet crystal display, while a library of the object Fourier transforms is also displayed on the display. By comparing the total light passing through the display, an optical correlation can be obtained very rapidly. Although such a technique has been applied to scene scanning by military helicopters, it has heretofore not been used in automotive applications.

The laser radar system 64 is typically used in conjunction with a scanner 65. The scanner 65 is typically comprised of two oscillating mirrors, or a MEMS mirror capable of oscillating in two dimensions, which cause the laser light to scan the two dimensional angular field. Alternately, the scanner can be a solid-state device utilizing a crystal having a high index of refraction which is driven by an ultrasonic vibrator as discussed above or rotating mirrors. The ultrasonic vibrator establishes elastic waves in the crystal which diffracts and changes the direction of the laser light.

The laser beam can be frequency, amplitude or noise modulated so that the distance to the object reflecting the light can be determined. The laser light strikes an object and is reflected back where it is guided onto a pin diode, or other high speed photo detector. Since the direction of laser light is known, the angular location of the reflected object is also known and since the laser light is modulated the distance to the reflected point can be determined. By varying modulation frequency of the laser light, or through noise modulation, the distance can be very precisely measured.

Alternatively, the time-of-flight of a short burst of laser light can be measured providing a direct reading of the distance to the object that reflected the light. By either technique, a three-dimensional map can be made of the surface of the reflecting object. Objects within a certain range of the host vehicle can be easily separated out using the range information. This can be done electronically using a technique called range gating, or it can be accomplished mathematically based on the range data. By this technique, an image of an object can be easily separated from other objects based on distance from the host vehicle.

Since the vehicle knows its position accurately and in particular it knows the lane on which it is driving, a determination can be made of the location of any reflective object and in particular whether or not the reflective object is on the same lane as the host vehicle. This fact can be determined since the host vehicle has a map and the reflective object can be virtually placed on that map to determine its location on the roadway, for example.

The laser radar system will generally operate in the near infrared part of the electromagnetic spectrum. The laser beam will be of relatively high intensity compared to the surrounding radiation and thus even in conditions of fog, snow, and heavy rain, the penetration of the laser beam and its reflection will permit somewhat greater distance observations than the human driver can perceive. Under the RtZF™ plan, it is recommended that the speed of the host vehicle be limited such that vehicle can come to a complete stop in one half or less of the visibility distance. This will permit the laser radar system to observe and identify threatening objects that are beyond the visibility distance, apply the brakes to the vehicle if necessary causing the vehicle to stop prior to an impact, providing an added degree of safety to the host vehicle.

Radar system 62 is mainly provided to supplement laser radar system. It is particularly useful for low visibility situations where the penetration of the laser radar system is limited. The radar system, which is most probably a noise or pseudonoise modulated continuous wave radar, can also be used to provide a crude map of objects surrounding the vehicle. The most common use for automotive radar systems is for adaptive cruise control systems where the radar monitors the distance and, in some cases, the velocity of the vehicle immediately front of the host vehicle. The radar system 62 is controlled by the control processor 100.

The display system 82 was discussed previously and can be either a heads up or other appropriate display.

The control processor 100 can be attached to a vehicle special or general purpose bus 110 for transferring other information to and from the control processor to other vehicle subsystems.

Figure 7:
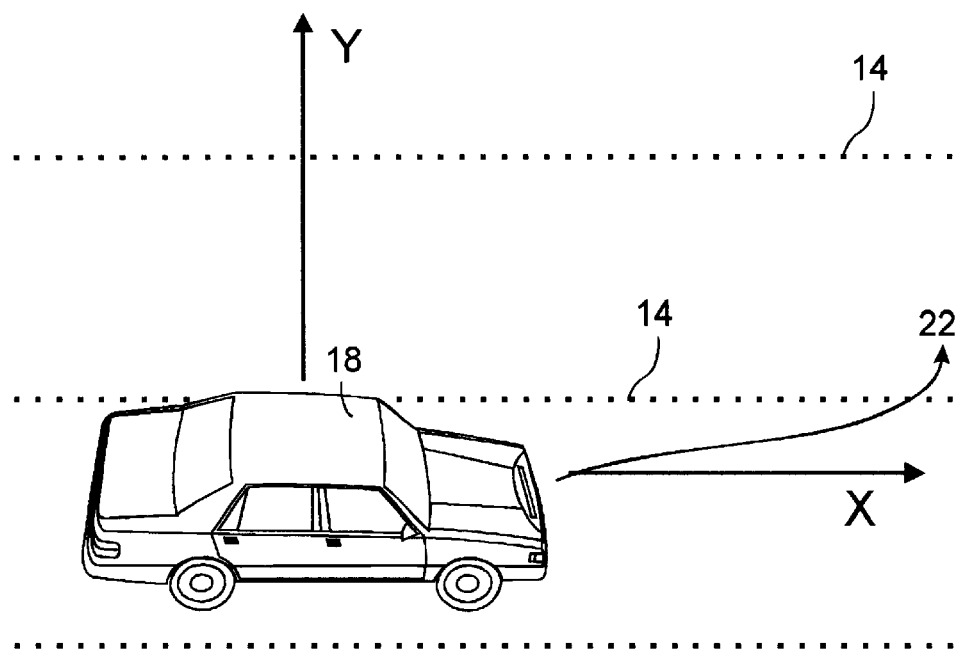
FIG. 7 illustrates a vehicle traveling on a roadway in a defined corridor.

FIG. 7 shows the implementation of the invention in which a vehicle 18 is traveling on a roadway in a defined corridor in the direction X. Each corridor is defined by lines 14. If the vehicle is traveling in one corridor and strays in the direction Y so that it moves along the line 22, e.g., the driver is falling asleep, the system on board the vehicle in accordance with the invention will activate a warning. More specifically, the system continually detects the position of the vehicle, such as by means of the GPS, DGPS and/or PPS, and has the locations of the lines 14 defining the corridor recorded in its map database. Upon an intersection of the position of the vehicle and one of the lines 14 as determined by a processor, the system may be designed to sound an alarm to alert the driver to the deviation or possibly even correct the steering of the vehicle to return the vehicle to within the corridor defined by lines 14.

FIG. 8 shows the implementation of the invention in which a pair of vehicles 18, 26 are traveling on a roadway each in a defined corridor defined by lines 14 and each is equipped with a system in accordance with the invention. The system in each vehicle 18,26 will receive data informing it of the position of the other vehicle and prevent accidents from occurring, e.g., if vehicle 18 moves in the direction of arrow 20. This can be accomplished via direct wireless broadband communication or any of the other communication methods described above, or through another path such as via the Internet or through a base station, wherein each vehicle transmits its best estimate of its absolute location on the earth along with an estimate of the accuracy of this location. If one of the vehicles has recently passed a precise positioning station, for example, then it will know its position very accurately to within a few centimeters. Each vehicle can also send the latest satellite messages that it received permitting each vehicle to precisely determine its relative location to the other since the errors in the signals will be the same for both vehicles. To the extent that both vehicles are near each other, even the carrier phase ambiguity can be determined and each vehicle will know its position relative to the other to within better than a few centimeters. As more and more vehicles become part of the community and communicate their information to each other, each vehicle can even more accurately determine its absolute position and especially if one vehicle knows its position very accurately, if it recently passed a PPS for example, then all vehicles will know their position with approximately the same accuracy and that accuracy will be able to be maintained for as long as a vehicle keeps its lock on the satellites in view. If that lock is lost temporarily, the INS system will fill in the gaps and, depending on the accuracy of that system, the approximate 2 centimeter accuracy can be maintained even if the satellite lock is lost for up to approximately five minutes.

A five minute loss of satellite lock is unlikely expect in tunnels or in locations where buildings or geological features interfere with the signals. In the building case, the problem can be eliminated through the placement of PPS stations and the same would be true for the geological obstruction case except in remote areas where ultra precise positioning accuracy is probably not required. In the case of tunnels, for example, the cost of adding PPS stations is insignificant compared with the cost of building and maintaining the tunnel.

FIG. 9 is a schematic diagram illustrating a neural network of the type useful in image analysis. Data representing features from the images from the CMOS cameras 60 are input to the neural network circuit 63, and the neural network circuit 63 is then trained on this data. More specifically, the neural network circuit 63 adds up the feature data from the CMOS cameras 60 with each data point multiplied by an associated weight according to the conventional neural network process to determine the correlation function.

In this embodiment, 141 data points are appropriately interconnected at 25 connecting points of layer 1, and each data point is mutually correlated through the neural network training and weight determination process. In some implementations, each of the connecting points of the layer 1 has an appropriate threshold value, and if the sum of measured data exceeds the threshold value, each of the connecting points will output a signal to the connecting points of layer 2. In other cases, an output value or signal will always be outputted to layer 2 without thresholding.

The connecting points of the layer 2 comprises 20 points, and the 25 connecting points of the layer 1 are appropriately interconnected as the connecting points of the layer 2. Similarly, each data value is mutually correlated through the training process and weight determination as described above and in the above referenced neural network texts. Each of the 20 connecting points of the layer 2 can also have an appropriate threshold value, if thresholding is used, and if the sum of measured data exceeds the threshold value, each of the connecting points will output a signal to the connecting points of layer 3.

The connecting points of the layer 3 comprises 3 points in this example, and the connecting points of the layer 2 are interconnected at the connecting points of the layer 3 so that each data is mutually correlated as described above.

The value of each connecting point is determined by multiplying weight coefficients and summing up the results in sequence, and the aforementioned training process is to determine a weight coefficient Wj so that the value (ai) is a previously determined output.

$$ai = \Sigma Wj \cdot Xj \ (j=1 \ to \ N) + W_0$$

wherein Wj is the weight coefficient,
Xj is the data
N is the number of samples and
$W_0$ is bias weight associated with each node.

Based on this result of the training, the neural network circuit 63 generates the weights and the bias weights for the coefficients of the correlation function or the algorithm.

At the time the neural network circuit 63 has learned from a suitable number of patterns of the training data, the result of the training is tested by the test data. In the case where the rate of correct answers of the object identification unit based on this test data is unsatisfactory, the neural network circuit 63 is further trained and the test is repeated. Typically about 200,000 feature patterns are used to train the neural network 63 and determine all of the weights. A similar number is then used for the validation of the developed network. In this simple example chosen, only three outputs are illustrated. These can represent another vehicle, a truck and a pole or tree. This might be suitable for an early blind spot detector design. The number of outputs depends on the number of classes of objects that are desired. However, too many outputs can result in an overly complex neural network and then other techniques such as modular neural networks can be used to simplify the process. When a human looks at a tree, for example, he or she might think "what kind of tree is that?" but not "what kind of tiger is that". The human mind operates with modular neural networks where the object to be identified is first determined to belong to a general class and then to a subclass etc. Object recognition neural networks can frequently make use of this principle with a significant simplification resulting.

In the above example, the image was first subjected to a feature extraction process and the feature data was input to the neural network. In other cases, especially as processing power continues to advance, the entire image is input to the neural network for processing. This generally requires a larger neural network. Alternate approaches use data representing the difference between two frames and the input data to the neural network. This is especially useful when a moving object of interest is in an image containing stationary scenery that is of no interest. This technique can be used even when everything is moving by using the relative velocity as a filter to remove unwanted pixel data. Naturally, any variations are possible and will now be obvious to those skilled in the art. Alternately, this image can be filtered based on range, which will also significantly reduce the number of pixels to be analyzed.

In another implementation, the scenes are differenced based on illumination. If infrared illumination is used, for example, the illumination can be turned on and off and images taken and then differenced. If the illumination is known only to illuminate an object of interest then such an object can be extracted from the background by this technique. A particularly useful method is to turn the illumination on and off for alternate scan lines in the image. Adjacent scan lines can then be differenced and the resulting image sent to the neural network system for identification.

The neural network can be implemented as an algorithm on a general-purpose microprocessor or on a dedicated parallel processing DSP, neural network ASIC or other dedicated parallel or serial processor. The processing speed is generally considerably faster when parallel processors are used and this can also permit the input of the entire image for analysis rather than using feature data. Naturally, a combination of feature and pixel data can also be used.

Neural networks have certain known defects that various researchers have attempted to eliminate. For example, if data representing an object that is totally different from those objects present in the training data is input to the neural network, an unexpected result can occur which, in some cases, can cause a system failure. To solve this and other neural network problems, researchers have resorted to adding in some other computational intelligence principles such as fuzzy logic resulting in a neural-fuzzy system, for example. As the RtZF™ system evolves, such refinements will be implemented to improve the accuracy of the system. Thus, although pure neural networks are currently being applied to the problem, hybrid neural networks such as modular, ensemble and fuzzy neural networks will undoubtedly evolve.

A typical neural network processing element known to those skilled in the art is shown in FIG. 10 where input vectors, (X1, X2 . . . Xn) are connected via weighing elements 120 (W1, W2 . . . Wn) to a summing node 130. The output of node 130 is passed through a nonlinear processing element 140, typically a sigmoid function, to produce an output signal, Y. Offset or bias inputs 125 can be added to the inputs through weighting circuit 128. The output signal from summing node 130 is passed through the nonlinear element 140 which has the effect of compressing or limiting the magnitude of the output Y.

Neural networks used in the accident avoidance system of this invention are trained to recognize roadway hazards including automobiles, trucks, animals and pedestrians. Training involves providing known inputs to the network resulting in desired output responses. The weights are automatically adjusted based on error signal measurements until the desired outputs are generated. Various learning algorithms may be applied with the back propagation algorithm with the Delta Bar rule as a particularly successful method.

FIG. 11 shows the implementation of the invention using the Precise Positioning System (PPS) 151, 152, 153, in which a pair of vehicles 18, 26 are traveling on a roadway each in a defined corridor delineated by lines 14 and each is equipped with a system in accordance with the invention and in particular, each is equipped with PPS receivers. Three versions of the PPS system will now be described. This invention is not limited to these two examples but they will serve to illustrate the principals involved.

Vehicle 18 contains two receivers 160,161 for the micropower impulse radar (MIR) implementation of the invention. MIR transmitter devices are placed at 151,152 and 153 respectively. They are linked together with a control wire, not shown, or by a wireless connection such that each device transmits a short radar pulse that a precise timing relative to the others. These pulses can be sent simultaneously or at a precise known delay. Vehicle 18 knows from its map database the existence and location of the three MIR transmitters. The transmitters 151,152 and 153 can either transmit a coded pulse or non-coded pulse. In the case of the coded pulse, the vehicle PPS system will be able to verify that the three transmitters are in fact the ones that appear on the map database. Since the vehicle will know reasonably accurately it's location and it is unlikely that other PPS transmitters will be nearby or within range, the coded pulse may not be necessary. Two receivers 160 and 161 are illustrated on vehicle 18. For the MIR implementation, only a single receiver is necessary since the position of the vehicle will be uniquely determined by the time of arrival of the three MIR pulses. A second receiver can be used for redundancy and also to permit the vehicle to determine the angular position of the MIR transmitters as a further check on the system accuracy. This can be done since the relative time of arrival of a pulse from one of the transmitters 151,152,153 can be used to determine is the distance to each transmitter and by geometry it's angular position relative to the vehicle 18. If the pulses are coded, then the direction to the MIR devices 151,152,153 will also be determinable.

The micropower impulse radar units require battery or other power to operate. Since they may be joined together with a wire in order to positively control the timing of the three pulses, a single battery can be used to power all three units. This battery can also be coupled with a solar panel to permit maintenance free operation of-the system. Since the MIR devices use very small amounts of power, they can operate for many years on a single battery.

Although the MIR systems are relatively inexpensive, on the order of ten dollars each, the installation cost of the system will be significantly higher than the RFID and radar reflector solutions discussed next. The MIR system is also significantly more complex than the RFID system; however, its accuracy can be checked by each vehicle that uses the system. Tying the MIR system to a GPS receiver and using the accurate clock on the GPS satellites as the trigger for the sending of the radar pulses can add additional advantages and complexity. This will permit vehicles passing by to additionally accurately set their clocks to be in synchronization with the GPS clocks. Since the MIR system will know its precise location, all errors in the GPS signals can be automatically corrected and in that case, the MIR system becomes a differential GPS base station. For most implementations, this added complexity is not necessary since the vehicle themselves will be receiving GPS signals and they will also know precisely their location from the MIR transmitter triad 151,152,153.

A considerably simpler alternate approach to the MIR system described above utilizes reflective RFID tags. These tags when interrogated by an interrogator type of receiver 160,161, reflect a modified RF signal with the modification being the identification of the tag. Such tags are described in many patents on RFID technology and can be produced for substantially less than one dollar each. The implementation of the RFID system would involve the accurate placement of these tags on known objects on the infrastructure. These objects could be spots on the highway, posts, signs, sides of buildings, poles, or structures that are dedicated specifically for this purpose. In fact, any structure that is rigid and unlikely to change position can be used for mounting RFID tags. In downtown Manhattan, building sides, street lights, stoplights, or other existing structures are ideal locations for such tags. A vehicle 18 approaching a triad of such RFID tags represented by boxes 151,152,153 would transmit an interrogation pulse from interrogator 160 or 161. The pulse would reflect off of each tag within range and the reflected signal would be received by the same interrogator(s) 160, 161 or other devices on the vehicle. Once again, a single interrogator is sufficient.

Electronic circuitry, not shown, associated with the interrogator 160 or 161 would determine the precise distance from the vehicle to the RFID tag 151,152,153 based on the round trip time of flight. This will provide the precise distance is to the three RFID tags 151, 152, 153. Once again, a second interrogator 161 can also be used, in which case, it could be a receiver only and would provide redundancy information to the main interrogator 160 and also provide a second measure of the distance to each of the RFID tags. Based on the displacement of the two receivers 160, 161, the angular location of each of the RFID tags relative into the vehicle can be determined providing further redundant information as to the position of the vehicle relative to the tags.

Radar corner reflectors can be placed on poles or other convenient places such that a radar beam pointed upwards at an angle such as 30 to 45 degreed from the vehicle will cause the beam to illuminate the reflector and thereby cause a reflection to return to the vehicle. Through well-known methods, the distance to the reflector can be accurately measured with pulse radar, modulated radar and phase measurements or noise radar and correlations measurements. In such a manner, the host vehicle can determine its position relative to one or more such reflectors and if the location of the reflector(s) is known and recorded on the map database, the vehicle can determine its position to within about 2 centimeters. Naturally, the more reflectors that are illuminated the better the accuracy of vehicle location determination. The reflectors can be simple corner reflectors or a group of reflectors can be provided giving a return code to the host vehicle.

Using the PPS system, a vehicle can precisely determine its location within two centimeters or better relative to the MIR, RFID tags or radar and reflectors and since the precise location of these devices has previously been recorded on the map database, the vehicle will be able to determine its precise location on the surface of the earth. With this information, the vehicle will be thereafter able to use the carrier wave phase to maintain its precise knowledge of its location, as discussed above, until the locks on the satellites are lost. Similarly, the vehicle 18 can broadcast this information to vehicle 26, for example, permitting a vehicle that has not passed through the PPS triad to also greatly improve the accuracy with which it knows its position. Each vehicle that has recently passed through a PPS triad now becomes a differential GPS station for as long as the satellite locks are maintained. Therefore, through inter-vehicle communications, all vehicles in the vicinity can also significantly improve their knowledge of their position accuracy resulting in a system which is extremely redundant and therefore highly reliable and consistent with the "Road to Zero Fatalities"™ process. Once this system is operational, it is expected that the U.S. and other governments will launch additional GPS type satellites, each with more civilian readable frequencies, or other similar satellite systems, further strengthening the system and adding further redundancy eventually resulting in a highly interconnected system that approaches 100% reliability and, like the Internet, cannot be shut down.

As the system evolves, the problems associated with urban canyons, tunnels, and other obstructions to satellite view will be solved by the placement of large numbers of PPS stations, or other devices providing similar location information.

Although the system has been illustrated for use with automobiles, naturally the same system would apply for all vehicles including trucks, trains an even airplanes taxing on runways. It also would be useful for use with cellular phones and other devices carried by humans. The combination of the PPS system and cellular phones permits the precise location of a cellular phone to be determined within centimeters by an emergency operator receiving a 911 call, for example. Such RFID tags can be inexpensively placed both inside and outside of buildings, for example.

The range of RFID tags is somewhat limited to approximately 10 meters for current technology. If there are obstructions preventing a clear view of the RFID tag by the interrogator, the distance becomes less. For some applications where it is desirable to use larger distances, battery power can be provided to the RFID tags. In this case, the interrogator would send a pulse to the tag that would turn on the tag and at a precise time later the tag would transmit an identification message. In some cases, the interrogator itself can provide the power to drive the RFID circuitry, in which case the tag would again operate in the transponder mode as opposed to the reflective mode.

The RFID tags discussed herein can be either the electronic circuit or SAW designs.

From the above discussion, those skilled in the art will think of other devices that can be interrogated by a vehicle traveling down the road. Such devices might include various radar types or designs of reflectors, mirrors, other forms of transponders, or other forms of energy reflectors. All such devices are contemplated by this invention and the invention is not limited to be specific examples described.

Any communication device can be coupled with an interrogator that utilizes the MIR, radar or RFID PPS system described above. Many devices are now being developed that make use of the Bluetooth communication specification. All such Bluetooth enabled devices can additionally be outfitted with a PPS system permitting the location of the Bluetooth device to be positively determined. This enabling technology will permit a base station to communicate with a Bluetooth-enabled device whose location is unknown and have the device transmit back its precise location on the surface of the earth. As long as the Bluetooth-enabled device is within the range of the base station, its location can be precisely determine. Thus, the location of mobile equipment in a factory, packages within the airplane cargo section, laptop computers, cell phones, PDAs, and eventually even personal glasses or car keys or any device upon which a Bluetooth enabled device can be attached can be determined. Actually, this invention is not limited to Bluetooth devices but encompasses any device that can communicate with any other devices.

Once the location of an object can be determined, many other services can be provided. These include finding the device, or the ability to provide information to that device or to the person accompanying that device such as the location of the nearest bathroom, restaurant, or the ability to provide guided tours or other directions to people in traveling to other cities, for example.

FIG. 12a is a flow chart of the method in accordance with the invention. The absolute position of the vehicle is determined at 130, e.g., using a GPS, DGPS PPS system, and compared to the edges of the roadway at 134, which is obtained from a memory unit 132. Based on the comparison at 134, it is determined whether the absolute position of the vehicle is approaching close to or intersects an edge of the roadway at 136. If not, then the position of the vehicle is again obtained, e.g., at a set time interval thereafter, and the process continues. If yes, an alarm or warning system will be activated or the system will take control of the vehicle (at 140) to guide it to a shoulder of the roadway or other safe location.

FIG. 12b is another flow chart of the method in accordance with the invention similar to FIG. 12a. Again the absolute position of the vehicle is determined at 130, e.g., using a GPS, DGPS PPS system, and compared to the location of a roadway yellow line at 142 (or possibly another line which indicates an edge of a lane of a roadway), which is obtained from a memory unit 132. Based on the comparison at 144, it is determined whether the absolute position of the vehicle is approaching close to or intersects the yellow line 144. If not, then the position of the vehicle is again obtained, e.g., at a set time interval thereafter, and the process continues. If yes, an alarm will sound or the system will take control of the vehicle (at 146) to control the steering or guide it to a shoulder of the roadway or other safe location.

FIG. 12c is another flow chart of the method in accordance with the invention similar to FIG. 12a. Again the absolute position of the vehicle is determined at 130, e.g., using a GPS, DGPS PPS system, and compared to the location of a roadway stoplight at 150, which is obtained from a memory unit 132. Based on the comparison at 150, it is determined whether the absolute position of the vehicle is approaching close to a stoplight. If not, then the position of the vehicle is again obtained, e.g., at a set interval thereafter, and the process continues. If yes, a sensor determines whether the stoplight is red (e.g., a camera) and if so, an alarm will sound or the system will take control of the vehicle (at 154) to control the brakes or guide it to a shoulder of the roadway or other safe location. A similar flow chart can be now drawn by those skilled in the art for other conditions such as stop signs, vehicle speed control, collision avoidance etc.

FIG. 13 illustrates an intersection of a major road 170 with a lesser road 172. The road 170 has the right of way and stop signs 174 have been placed to control the traffic on the lesser road 172. Vehicles 18 and 26 are proceeding on road 172 and vehicle 25 is proceeding on road 170. A very common accident is caused when vehicle 18 ignores the stop sign 174 and proceeds into the intersection where it is struck in the side by vehicle 25 or strikes vehicle 25 in the side.

Using the teachings of this invention, vehicle 18 will know of the existence of the stop sign and if the operator attempts to proceed without stopping, the system will sound a warning and if that warning is not heeded, the system will automatically bring the vehicle 18 to a stop preventing it from intruding into the intersection.

Another common accident is where vehicle 18 does in fact stop but then proceeds forward without noticing vehicle 25 thereby causing an accident. Since in the fully deployed RtZF™ system, vehicle 18 will know through the vehicle-to-vehicle communication the existence and location of vehicle 25 and can calculate its velocity, the system can once again take control of vehicle 18 if a warning is not heeded and prevent vehicle from 18 from proceeding into the intersection and thereby prevent the accident.

In the event that the vehicle 25 is not equipped with the RtZF™ system, vehicle 18 will still sense the present of vehicle 25 through the laser radar, radar and camera systems. Once again, when the position and velocity of vehicle 25 is sensed, appropriate action can be taken by the system in vehicle 18 to eliminate the accident.

In another scenario where vehicle the 18 does properly stop at the stop sign, but vehicle 26 proceeds without observing the presence of the stopped vehicle 18, the laser radar, radar and camera systems will all operate to warn the driver of vehicle 26 and if that warning is not heeded, the system in vehicle 26 will automatically stop the vehicle 26 prior to its impacting vehicle 18. Thus, in the scenarios described above the "road to zero fatalities"™ system and method of this invention will prevent common intersection accidents from occurring.

FIG. 14 is a view of an intersection where traffic is controlled by stoplights 180. If the vehicle 18 does not respond in time to a red stoplight, the system as described above will issue a warning and if not heeded, the system will take control of the vehicle 18 to prevent it from entering the intersection and colliding vehicle 25. In this case, the stoplight 180 will either emit a signal indicating its color, such as by way of the communication system, or vehicle 18 will have a camera mounted such that it can observe the color of the stoplight. In this case buildings 182 obstruct the view from car 18 to car 25 thus an accident can still be prevented even when the operators are not able to visually see the threatening vehicle. Naturally, if both vehicles have the RtZF™ system they will be communicating and their presence and relative positions will be known to both vehicles.

FIG. 15 illustrates the case where vehicle 18 is about to execute a left-hand turn into the path of vehicle 25. This accident will be prevented if both cars have the RtZF™ system since the locations and velocities of both vehicles 18,25 will be known to each other. If vehicle 25 is not equipped and vehicle 18 is, then the camera, radar, and laser radar subsystems will operate to prevent vehicle 18, turning into the path of vehicle 25. Thus, once again common intersection accidents are prevented by this invention.

The systems described above can be augmented by infrastructure based sensing and warning systems. Camera, laser radar or radar subsystems such as placed on the vehicle can also be placed at intersections to warn the oncoming traffic if a collision is likely to occur. Additionally, simple sensors that sense the signals emitted by oncoming vehicles, including radar, thermal radiation, etc., can be used to operate warning systems that notify oncoming traffic of potentially dangerous situations. Thus, many of the teachings of this invention can be applied to infrastructure-based installations in addition to the vehicle resident systems.

An important part of some embodiments of the invention is the digital map that contains relevant information relating to the road on which the vehicle is traveling. The digital map usually includes the location of the edge of the road, the edge of the shoulder, the elevation and surface shape of the road, the character of the land beyond the road, trees, poles, guard rails, signs, lane markers, speed limits, etc. as discussed in more detail elsewhere herein. This data or information is acquired in a unique manner for use in the invention and the method for acquiring the information and its conversion to a map database that can be accessed by the vehicle system is part of the invention. The acquisition of the data for the maps will now be discussed. It must be appreciated though that the method for acquiring the data and forming the digital map can also be used in other inventions.

Local area differential GPS can be utilized to obtain maps with an accuracy of 2 cm (one sigma). Temporary local differential stations are available from such companies as Trimble Navigation. These local differential GPS stations can be placed at an appropriate spacing for the road to be mapped, typically every 30 kilometers. Once a local differential GPS station is placed, it requires several hours for the station to determine its precise location. Therefore, sufficient stations are required to cover the area that is to be mapped within, for example, four hours. This may require as many as 10 or more such differential stations for efficient mapping.

A mapping vehicle 200, such as shown in FIGS. 16A, 16B and 17, is used and the mapping vehicle obtains its location from GPS satellites and its corrections from the local differential stations. Such a system is capable of providing the 2 cm accuracy desired for the map database. Typically, at least two GPS receivers 226 are mounted on the mapping vehicle 200. Each GPS receiver 226 is contained within or arranged in connection with a respective data acquisition module 202, which data acquisition modules 202 also contain a GPS antenna 204, an accurate inertial measurement unit (IMU) 206, a forward-looking video camera 208, a downward and outward looking linear array camera 210 and a scanning laser radar 212. The relative position of these components in FIG. 17 is not intended to limit the invention A processor including a printed circuit board 224 is coupled to the GPS receivers 226, the IMUs 206, the video cameras 208, the linear cameras 210 and the scanning laser radars 212. The processor receives information regarding the position of the vehicle from the GPS receivers 226, and optionally the IMUs 206, and the information about the road from both linear cameras 210 or from both laser radars 212, or from all of the linear cameras 210 and laser radars 212, and forms the road map database. Information about the road can also come from one or both of the video cameras 208 and be incorporated into the map database.

The map database can be of any desired structure or architecture. Preferred examples of the database structure are of the type disclosed in U.S. Pat. No. 6,144,338 (Davies) and U.S. Pat. No. 6,247,019 (Davies), incorporated by reference herein in their entirety.

The data acquisition modules 202 are essentially identical and each mounts to the vehicle roof on an extension assembly 214 which extends forward of the front bumper. Extension assembly 214 includes a mounting bracket 216 from the roof of the vehicle 200 forward to each data acquisition module 210, a mounting bracket 218 extending from the front bumper upward to each data acquisition module 202 and a cross mounting bracket 220 extending between the data acquisition modules 202 for support. Since all of the data acquisition equipment is collocated, its precise location is accurately determined by the IMU and the differential GPS system.

The forward-looking video cameras 208 provide views of the road as shown in FIG. 18. These cameras 208 permit the database team to observe the general environment of the road and to highlight any anomalies. They also permit the reading of traffic signs and other informational displays all of which can be incorporated into the database. The cameras 208 can be ordinary color video cameras, high-speed video cameras, wide angle or telescopic cameras, black and white video cameras, infrared cameras, etc. or combinations thereof. In some cases, special filters are used to accentuate certain features. For example, it has been found that lane markers frequently are more readily observable at particular frequencies, such as infrared. In such cases, filters can be used in front of the camera lens or elsewhere in the optical path to block unwanted frequencies and pass desirable frequencies. Polarizing lenses have also been found to be useful in many cases. Normally, natural illumination is used in the mapping process, but for some particular cases, particularly in tunnels, artificial illumination can also be used in the form of a floodlight or spotlight that can be at any appropriate frequency of the ultraviolet, visual and infrared portions of the electromagnetic spectrum or across many frequencies. Laser scanners can also be used for some particular cases when it is desirable to illuminate some part of the scene with a bright spot. In some cases, a scanning laser rangefinder can be used in conjunction with the forward-looking cameras 204 to determine the distance to particular objects in the camera view.

The video camera system can be used by itself with appropriate software as is currently being done by Lamda Tech International Inc. of Waukesha, Wis., to obtain the location of salient features of a road. However, such a method to obtain accurate maps is highly labor intensive and therefore expensive. The cameras and associated equipment in the present invention are therefore primarily used to supplement the linear camera and laser radar data acquisition systems to be described now.

The mapping vehicle data acquisition modules will typically contain both a linear camera and a scanning laser radar, however, for some applications one or the other may be omitted.

The linear camera 210 is a device that typically contains a linear CCD, CMOS or other light sensitive array of, for example, four thousand pixels. An appropriate lens provides a field of view to this camera that typically extends from approximately the center of the vehicle out to the horizon. This camera records a one-dimensional picture covering the entire road starting with approximately the center of the lane and extending out to the horizon. This linear array camera 210 therefore covers slightly more than 90 degrees. Typically, this camera operates using natural illumination and produces effectively a continuous picture of the road since it obtains a linear picture, or column of pixels, for typically every one-inch of motion of the vehicle. Thus, a complete two-dimensional panoramic view of the road traveled by the mapping vehicle is obtained. Since there are two such measurement units, a 180 degree view is obtained. This camera will typically record in full color thus permitting the map database team to have a complete view of the road looking perpendicular from the vehicle. The view is recorded in a substantially vertical plane. This camera will not be able to read text on traffic signs, thus the need for the forward-looking cameras 208. Automated software can be used with the images obtained from these cameras to locate the edge of the road, lane markers, the character of land around and including the road and all areas that an errant vehicle may encounter. The full color view allows the characterization of the land to be accomplished automatically with minimal human involvement.

The scanning laser radar 212 is typically designed to cover a 90 degree or less scan thus permitting a rotating mirror to acquire at least four such scans per revolution. The scanning laser radar 212 can be coordinated or synchronized with the linear camera so that each covers the same field of view with the exception that the camera typically will cover more than 90 degrees. Naturally, the scanning laser radar can be designed to cover more or less than 90 degrees as desired for a particular installation. The scanning laser radar can operate in any appropriate frequency from ultraviolet to the far infrared. Typically, it will operate in the eye-safe portion of the infrared spectrum for safety reasons. The scanning laser radar 212 can operate either as a pulse-modulated or a tone-modulated laser as is known in the art. If operating in the tone-modulated regime, the laser light will be typically modulated with three or more frequencies in order to eliminate distance ambiguities. Naturally, noise radar can also be used.

For each scan, the laser radar 212 provides the distance from the scanner to the ground for up to several thousand points in a vertical plane extending from approximately the center of the lane out to near the horizon. This device therefore provides precise distances and elevations to all parts of the road and its environment. The precise location of signs that were observed with the forward-looking cameras 204, for example, can now be easily and automatically retrieved. The scanning laser radar therefore provides the highest level of mapping automation.

Scanning laser radars have been used extensively for mapping purposes from airplanes and in particular from helicopters where they have been used to map portions of railway lines in the United States. This is the first known use of the scanning laser radar system for mapping roadways where the radar is mounted onto a vehicle that is driving the road.

Ideally, all of the above-described systems are present on the mapping vehicle. Although there is considerable redundancy between the linear camera and the scanning laser radar, the laser radar operates at one optical frequency and therefore does not permit the automatic characterization of the roadway and its environment.

As with the forward-looking cameras, it is frequently desirable to use filters and polarizing lenses for both the scanning laser radar and the linear camera. In particular, reflections from the sun can degrade the laser radar system unless appropriate filters are used to block all frequencies except frequency chosen for the laser radar.

Laser radars are frequently also referred to as ladars and lidars. All such devices that permit ranging to be accomplished from a scanning system, including radar, are considered equivalent for the purposes of this invention.

A particularly important enhancement to the above-described system uses precise positioning technology independent of GPS. The precise positioning system, also known as the calibration system, generally permits a vehicle to precisely locate itself independently of the IMU or DGPS systems.

One example of this technology involves the use of a radar and reflector system wherein radar transceivers are placed on the vehicle that send radar waves to reflectors that are mounted at the side of road. The location of reflectors either is already precisely known or is determined by the mapping system during data acquisition process. The radar transceivers transmit a pulse or frequency or noise modulated radar signal to the road-mounted reflectors, typically corner reflectors, which reflect a signal back to the radar transceiver. This permits the radar system to determine the precise distance from the transceiver to the reflector by either time-of-flight or phase methods.

In one possible implementation, each vehicle is equipped with two radar devices operating in the 24–77 GHz portion of the spectrum. Each radar unit will be positioned on the vehicle and aimed outward, slightly forward and up toward the sides of the roadway. Poles would be positioned along the roadway at appropriate intervals and would have multiple corner cube radar reflectors mounted thereon to thereto, possibly in a vertical alignment. The lowest reflector on the pole would be positioned so that the vehicle radar will illuminate the reflector when the vehicle is in the lane closest to the pole. The highest reflector on the pole would be positioned so that the vehicle radar will illuminate the reflector when the vehicle is in the lane most remote from the pole. The frequency of the positioning of the poles will be determined by such considerations as the availability of light poles or other structures currently in place, the probability of losing access to GPS satellites, the density of vehicle traffic, the accuracy of the IMU and other similar considerations. Initially rough calculations have found that a spacing of about ¼ mile would likely be acceptable.

If the precise location of the reflectors has been previously determined and is provided on a road map database, then the vehicle can use this information to determine its precise location on the road. In the more typical case, the radar reflectors are installed and the mapping vehicle knows its location precisely from the differential GPS signals and the IMU, which for the mapping vehicle is typically of considerably higher accuracy then will be present in the vehicles that will later use the system. As a result, the mapping vehicle can also map a tunnel, for example, and establish the locations of radar reflectors that will later be used by non-mapping vehicles to determine their precise location when the GPS and differential GPS signals are not available. Similarly, such radar reflectors can be located for an appropriate distance outside of the tunnel to permit an accurate location determination to be made by a vehicle until it acquires the GPS and differential GPS signals. Such a system can also be used in urban canyons and at all locations where the GPS signals can be blocked or are otherwise not available. Since the cost of radar reflectors is very low, it is expected that eventually they will be widely distributed on the 4 million miles of roads in the U.S.

The use of radar and reflectors for precise positioning is only one of many systems being considered for this purpose. Others include markings on roadway, RFID tags, laser systems, laser radar and reflectors, magnetic tags embedded in the roadway, magnetic tape, etc. The radar and reflector technology has advantages over some systems in that it is not seriously degraded by bad weather conditions, is not affected if covered with snow, does not pose a serious maintenance problem, and other cost and durability features. Any movement in the positioning of the reflectors can be diagnosed from vehicle PPS mounted systems.

The radar transceivers used are typically mounted on either side of vehicle and pointed upward at between 30 and 60 degrees. They are typically aimed so that they project across the top of the vehicle so that several feet of vertical height can be achieved prior to passing over adjacent lanes where the signal could be blocked by the truck, for example. Naturally, other mounting and aiming systems can be used.

The radar reflectors are typically mounted onto a pole, building, overpass, or other convenient structure. They can provide a return code by the placement of several such reflectors such that the reflected pulse contains information that identifies this reflector with a particular reflector on the map database. This can be accomplished in numerous ways including the use of a collection of radar reflectors in a spaced apart geometric configuration on a radius from the vehicle. The presence or absence of a reflector can provide a returned binary code, for example.

The operation of the system is as follows. A vehicle traveling down a roadway in the vicinity of the reflector poles would transmit radar pulses at a frequency of perhaps once per microsecond. These radar pulses would be encoded, perhaps with noise modulation, so that each vehicle knows exactly what radar returns are from its transmissions. As the vehicle approaches a reflector pole, it will begin to receive reflections based on the speed of the vehicle. By observing a series of reflections, the vehicle software can select either the maximum amplitude reflection or the average or some other scheme to determine the proper reflection to consider. The radar pulse will also be modulated to permit a distance to the reflector calculation to be made based on the phase of the returned signal or through correlation. Thus, as a vehicle travels down the road and passes a pair of reflector poles, it will be able to determine its longitudinal position on the roadway based on the pointing angle of the radar devices and the chosen maximum return as described above. It will also be able to determine its lateral position on the roadway based on the measured distance from the radar to the reflector.

Each reflector pole will have multiple reflectors determined by intersections of the radar beam from the vehicle traveling in the closest and furthest lanes. The spacing of reflectors on the pole would be determined by the pixel diameter of the radar beam. For example, a typical situation may require radar reflectors beginning at 4 m from the ground and ending at 12 m with a reflector every one-meter. For the initial demonstrations it is expected that existing structures will be used. The corner cube radar reflectors are very inexpensive so therefore the infrastructure investment will be small as long as existing structures can be used. In the downtown areas of cities, buildings etc. can also be used as reflector locations.

To summarize this aspect of the invention, an inexpensive infrastructure installation concept is provided which will permit a vehicle to send a radar pulse and receive a reflection wherein the reflection is identifiable as the reflection from the vehicle's own radar and contains information to permit an accurate distance measurement. The vehicle can thus locate itself accurately longitudinally and laterally along the road.

FIG. 19 shows a variety of roads and vehicles operating on those roads that are in communication with a vehicle that is passing through a Precise Positioning Station. The communication system used is based on noise modulated spread spectrum technologies such as described in the above listed papers by Lukin et al.

FIG. 20 shows a schematic of the operation of a communication system in accordance with the invention. Transmitters are provided, either at fixed locations or in vehicles and data about each transmitter, such as its location and an identification marker, are generated at 240. The location of the transmitter is preferably its GPS coordinates. The data may include, when the transmitter is a moving vehicle, the velocity and direction of travel of the vehicle. The data is encoded at 242 using the coding techniques described above, e.g., phase modulation of distance or time between code transmissions, phase or amplitude modulation of the code sequences themselves, changes of the polarity of the entire code sequence or the individual code segments, or bandwidth modulation of the code sequence. The coded data is transmitted at 244 using, e.g., noise radar.

A vehicle 246 includes an antenna 248 coupled to a processor or computer 250. The antenna 248 receives transmissions including transmissions 252 when in range of the transmitters. The processor 250 analyzes the transmissions 252. Such analysis may include a determination whether any are from transmitters within a pre-determined distance from the vehicle. Other analyses could be whether any are from particular transmitters which might be dedicated to the transmission of road conditions data, traffic data, map data and the like. Once the processor ascertains a particular transmission of interest, it extracts the information coded in the transmission. It knows the code because the code is provided by the transmission, i.e., the initial part of the transmission 252a contacts data on the location of the transmitter and the code is based on the location of the transmitter. As such, once the initial part of the transmission is received and the location of the transmitter extracted, the code for the remainder of the transmission 252b can be obtained.

Further, the antenna 248 serves as a transmitter for transmitting noise signals generated by the processor 250. The processor 248 is constructed or programmed to generate transmissions or noise signals based on its location, determined by a position determining device 254 in any known manner including those disclosed herein, and encode information about the vehicle in the noise signals. The information may be an identification marker, the type of vehicle, its direction, its velocity, its proposed course, its occupancy, etc. The processor 248 can encode the information in the noise signals in a variety of methods as disclosed above in the same manner that the data about the transmitter is encoded. Thus, the processor 248 not only interprets noise signals and extracts information, it also is designed to generate appropriate noise signals which are then sent from the antenna 248.

In sum, disclosed above is a computer controlled vehicle and obstacle location system and method which includes the steps of receiving continuously from a network of satellites on a first communication link at one of a plurality of vehicles, GPS ranging signals for initially accurately determining, in conjunction with centimeter accurate maps, the host vehicle's position on a roadway on a surface of the earth; receiving continuously at the host vehicle on a second communication link from a station, another vehicle or satellite, DGPS auxiliary range correction signals for correcting propagation delay errors in the GPS ranging signals; determining continuously at the host vehicle from the GPS, DGPS, and accurate map database signals host vehicle's position on the surface of the earth with centimeter accuracy; communicating the host vehicle's position to another one of the plurality of vehicles, and receiving at the host vehicle, location information from at least one of a plurality of other vehicles; determining whether the other vehicle represents a collision threat to the host vehicle based on its position relative to the roadway and the host vehicle and generating a warning or vehicle control signal response to control the vehicles motion laterally or longitudinally to prevent a collision with the other vehicle. In some implementations, the detecting step includes detecting objects by scanning with one or more cameras, radars or laser radars located on the host vehicle. The analyzing step includes processing and analyzing digital signals indicative of video images detected by the one or more cameras, radars or laser radars, and processing and analyzing the digital signals using pattern recognition and range determination algorithms. The objects detected may include fixed or moving, or known or unknown obstacles, people, bicycles, animals, or the like.

An optional feature of this embodiment of the invention is to operate one or more of the following systems depending on the kind of response determined by the neural fuzzy logic control system: a brake pedal, accelerator pedal, steering system (e.g., steering wheel), horn, light, mirror, defogger and communication systems.

The first phase of implementation of this invention can be practiced with only minor retrofit additions to the vehicle. These include the addition of a differential GPS system, an inertial measurement unit (IMU) and appropriate circuitry, and an accurate map database. In this first phase, the driver will only be warned when he or she is about to depart from the road surface. During the second phase of practicing this invention, the system will be augmented with a system that will prevent the operator from leaving the assigned corridor and in particular leaving the road at high speed. In further phases of the implementation of this invention, additional systems will be integrated which will scan the roadway and act to prevent accidents with vehicles that do not have the system installed. Also communication systems will be added to permit the subject vehicle to communicate its position, velocity, etc., to other nearby vehicles that are also equipped with a system. This communication system is the main focus herein.

A primary preferred embodiment of the system, therefore, is to equip a vehicle with a DGPS system, an inertial guidance system (or IMU), vehicle steering, throttle and brake control apparatus, a sub-meter accurate digital map system with the relevant maps (or ability to access the relevant maps), a scanning pulsed infrared laser radar, a system for sensing or receiving signals from a highway-based precise position determination system, and communications systems for (1) sending and receiving data from similarly equipped vehicles, (2) receiving updated maps and map status information, and (3) receiving weather and road condition information. A preferred embodiment for the infrastructure enhancements includes a DGPS system, a radar reflector based, Radio Frequency Identification (RFID) based or equivalent precise position determining system and local weather and road condition determination and transmission system.

Also disclosed above are methods and apparatus for preventing vehicle accidents. To this end, a vehicle is equipped with a differential GPS (DGPS) navigational system as well as an inertial navigation subsystem. Part of the system can be an array of infrastructure stations that permit the vehicle to exactly determine its position at various points along its path. Such stations would typically be located at intervals such as every 50 miles along the roadway, or more or less frequently depending on requirements as described below. These stations permit the vehicle to become its own DGPS station and thus to correct for the GPS errors and to set the position of the vehicle based initial guidance system. It also provides sufficient information for the vehicle to use the carrier frequency to determine its absolute position to within a few centimeters or better for as long as satellite locks are maintained. Data is also available to the vehicle that provides information as to the edges of the roadway, and edges of the lanes of the roadway, at the location of the vehicle so that the vehicle control system can continuously determine its location relative to the roadway edges and/or lane edges. In the initial implementation, the operator operates his or her vehicle and is unaware of the presence of the accident avoidance system. If, however, the operator falls asleep or for some other reason attempts to drive off the roadway at high speed, the system will detect that the vehicle is approaching an edge of the roadway and will either sound an alarm or prevent the vehicle from leaving the roadway when doing so would lead to an accident. In some cases, the system will automatically reduce the speed of the vehicle and stop it on the shoulder of the roadway.

It is important to note that the invention as described in the above paragraph is in itself a significant improvement to automotive safety. Approximately half of all fatal accidents involve only a single vehicle that typically leaves the roadway and impacts with a roadside obstacle, cross a yellow line or run a red light or stop sign. This typically happens when the driver in under the influence of alcohol or drugs, has a medical emergency or simply falls asleep. If this cause of accidents could be eliminated, the potential exists for saving many thousands of deaths per year when all vehicles are equipped with the system of this invention. This would make this the single greatest advance in automotive safety surpassing both seatbelts and airbags in lifesaving potential.

A first improvement to this embodiment of the invention is to provide the vehicle with a means using radar, laser radar, optical or infrared imaging, or a similar technology, to determine the presence, location and velocity of other vehicles on the roadway that are not equipped with the accident avoidance system. The accident avoidance system (RtZF™) of this invention will not be able to avoid all accidents with such vehicles for the reasons discussed above, but will be able to provide a level of protection which is believed to surpass all known prior art systems. Some improvement over prior art systems will result from the fact that the equipped vehicle knows the location of the roadway edges, as well as the lane boundaries, not only at the location of the equipped vehicle but also at the location of the other nearby vehicles. Thus, the equipped vehicle will be able to determine that an adjacent vehicle has already left its corridor and warn the driver or initiate evasive action. In prior art systems, the location of the roadway is not known leading to significantly less discrimination ability.

A second improvement is to provide communication ability to other nearby similarly equipped vehicles permitting the continuous transmission and reception of the locations of all equipped vehicles in the vicinity. With each vehicle knowing the location, and thus the velocity, of all potential impacting vehicles which are equipped with the RtZF, collisions between vehicles can be reduced and eventually nearly eliminated when all vehicles are equipped with the RtZF. One such communication system involves the use of spread spectrum carrier less communication channels that make efficient use of the available bandwidth and permit the simultaneous communication of many vehicles.

A third improvement comprises the addition of software to the system that permits vehicles on specially designated vehicle corridors for the operator to relinquish control of the vehicle to the vehicle-based system, and perhaps to a roadway computer system. This then permits vehicles to travel at high speeds in a close packed formation thereby substantially increasing the flow rate of vehicles on a given roadway. Naturally, in order to enter the designated corridors, a vehicle would be required to be equipped with the RtZF. Similarly, this then provides an incentive to vehicle owners to have their vehicles so equipped so that they can enter the controlled corridors and thereby shorten their travel time. Close packed travel is facilitated in the invention and thus supportive of the drag reduction advantages of such travel. But, such travel, although it can be automatically achieved through implementation of the proper algorithms in a very simple manner, is not required.

Prior art systems require expensive modifications to highways to permit such controlled high speed close packed travel. Such modifications also require a substantial infrastructure to support the system. The RtZF™ of the present invention, in its simplest form, does not require any modification to the roadway but rather relies primarily on the GPS or similar satellite system. The edge and lane boundary information is either present within the vehicle RtZF™ memory or transmitted to the vehicle as it travels along the road. The permitted speed of travel is also communicated to the vehicles on the restricted corridor and thus each vehicle travels at the appointed speed. Since each vehicle knows the location of all other vehicles in the vicinity, should one vehicle slow down, due to an engine malfunction, for example, appropriate action can be taken to avoid an accident. Vehicles do not need to travel in groups as suggested and required by some prior art systems. Rather, each vehicle may independently enter the corridor and travel at the system defined speed until it leaves, which may entail notifying the system of a destination.

Another improvement involves the transmission of additional data concerning weather conditions, traffic accidents etc. to the equipped vehicle so that the speed of that vehicle can be limited to a safe speed depending on road conditions, for example. If moisture is present on the roadway and the temperature is dropping to the point that ice might be building up on the road surface, the vehicle can be notified by the roadway information system and prevented from traveling at an unsafe speed.

In contrast to some prior art systems, with the RtZF™ system in accordance with the invention, especially when all vehicles are appropriately equipped, automatic braking of the vehicle should rarely be necessary and steering and throttle control should in most cases be sufficient to prevent accidents. In most cases, braking means the accident wasn't anticipated.

It is important to understand that this is a process control problem. The process is designed so that it should not fail and thus all accidents should be eliminated. Events that are troublesome to the system include a deer running in front of the vehicle, a box falling off of a truck, a rock rolling onto the roadway and a catastrophic failure of a vehicle. Continuous improvement to the process is thus required before these events are substantially eliminated. Each vehicle, individual driver and vehicle control system is part of the system and upon observing that such an event has occurred he or she should have the option of stopping the process to prevent or mitigate an emergency. All equipped vehicles therefore have the capability of communicating that the process is stopped and therefore that the vehicle speed, for example, should be substantially reduced until the vehicle has passed the troubled spot or until the problem ceases to exist. In other words, each vehicle and each driver is part of the process.

The RtZF™ system in accordance with the invention will thus start simple by reducing single vehicle accidents and evolve. The system has the capability to solve the entire problem by eliminating automobile accidents.

Furthermore, disclosed above are methods and apparatus for eliminating accidents by accurately determining the position of a vehicle, accurately knowing the position of the road and communicating between vehicles and between the vehicle and the infrastructure supporting travel. People get into accidents when they go too fast for the conditions and when they get out of their corridor. This embodiment eliminates these and other causes of accidents. In multilane highways, this system prevents people from shifting lanes if there are other vehicles in the blind spot, thus, solving the blind spot problem. The vehicle would always be traveling down a corridor where the width of the corridor may be a lane or the entire road width or something in between depending on road conditions and the presence of other vehicles. This embodiment is implemented through the use of both an inertial navigation system (INS) and a DGPS, in some cases with carrier frequency enhancement. Due to the fact that the signals from at least four GPS or GLONASS satellites are not always available and to errors caused by multiple path reception from a given satellite, the DGPS systems cannot be totally relied upon. Therefore the INS is a critical part of the system. This will improve as more satellites are launched and additional ground stations are added. It will also significantly improve when the WAAS and LAAS systems are implemented and refined to work with land vehicles as well as airplanes. It will also be improved with the implementation of PPS.

Also disclosed above is a method for transferring information between a vehicle and a transmitter which comprises the steps of transmitting a unique pseudorandom noise signal by the transmitter in a carrier-less fashion composed of frequencies within a pre-selected band, encoding information in the noise signal relating to an identification of the transmitter and a position of the transmitter and providing the vehicle with means for extracting the information from the noise signal. The code to use for encoding the noise signal may be selected based on the position of the transmitter so that analysis of the code, or a portion thereof, provides an indication of the position of the transmitter. Information about accidents, weather conditions, road conditions, map data and traffic control devices and about errors in a GPS signal can also be encoded in the noise signals. The information may be encoded in the noise signal in various ways, including but not limited to phase modulation of distance or time between code transmissions, phase or amplitude modulation of the code sequences, changes of the polarity of the entire code sequence or the individual code segments, or bandwidth modulation of the code sequence. The information may be encoded in the noise signal sequentially from general information to specific information about the position of the transmitter, e.g., from the country in which the transmitter is positioned to the actual square meter in which the transmitter is located. The transmitter may be arranged in a moving object such as a vehicle to provide vehicle-to-vehicle communications, in which case, the velocity and optionally direction of travel of the vehicle is also encoded in the noise signal, or at a fixed location. In the latter case, the location can be used to correct GPS signals. In this regard, the information encoded in the noise signal may be the GPS coordinate location of the transmitter.

In a related arrangement, an antenna is arranged on the vehicle to receive noise signals and a processor is coupled to the antenna. The processor may be constructed or programmed to analyze the received noise signals in order to determine whether any received noise signals originate from transmitters within a pre-determined distance from the vehicle. Such analysis can be based on an initial portion of the noise signals, i.e., the processor can scan through multiple the noise signals reading only the initial part of each to assess which noise signal(s) is/are particularly important and then obtain and, process only those of interest.

While the invention has been illustrated and described in detail in the drawings and the foregoing description, the same is to be considered as illustrative and not restrictive in character, it being understood that only the preferred embodiments have been shown and described and that all changes and modifications that come within the spirit of the invention are desired to be protected.

We claim:

1. A control system for controlling a warning system of a vehicle, comprising:
    an inertial reference unit including three accelerometers and three gyroscopes which provide data on vehicle motion;
    a processor coupled to said inertial reference unit; and
    a navigation system coupled to said processor and arranged to provide information about a roadway on which the vehicle is traveling from a map database to said processor.
    said processor being arranged to process the data on vehicle motion provided by said inertial reference unit and the roadway information provided by said navigation system and control the warning system to provide a warning to the driver upon detection of a potential crash situation.

2. The control system of claim 1, further comprising a Kalman filter coupled to said processor for optimizing the data on vehicle motion from said inertial reference unit.

3. The control system of claim 1, wherein said processor is structured and arranged to consider the vehicle being about to run off a road, cross a yellow line and run a stop sign as potential crash situations.

4. The control system of claim 1, further comprising a sensor for obtaining input on the color of an approaching stoplight, said processor being structured and arranged to consider the vehicle being about to run off a road, cross a yellow line, run a stop sign and run a red stoplight as potential crash situations.

5. The control system of claim 1, wherein said warning system is at least one of an alarm, a light, a buzzer, an audible noise generator and a simulated rumble strip.

6. The control system of claim 1, wherein said processor is arranged to control the movement of the vehicle based on the data on vehicle motion.

7. The control system of claim 1, wherein said processor is arranged to control a display in the vehicle based on the data on vehicle motion.

8. The control system of claim 1, further comprising a GPS receiver arranged to receive positioning signals relating to the position of the vehicle, said processor being coupled to said GPS receiver and arranged to process the data on vehicle motion provided by said inertial reference unit and signals relating to the position of the vehicle received by said GPS receiver and control the warning system based thereon.

9. The control system of claim 8, further comprising a Kalman filter coupled to said processor for optimizing the data on vehicle motion provided by said inertial reference unit and the signals relating to the position of the vehicle received by said GPS receiver.

10. The control system of claim 8, wherein said processor is arranged to process the data on vehicle motion provided by said inertial reference unit, the signals relating to the position of the vehicle received by said GPS receiver and the roadway information provided by said navigation system and control the warning system to provide a warning to the driver upon detection of a potential crash situation.

11. The control system of claim 10, wherein said processor is structured and arranged to consider the vehicle being about to run off a road, cross a yellow line and run a stop sign as potential crash situations.

12. The control system of claim 10, further comprising a sensor for obtaining input on the color of an approaching stoplight, said processor being structured and arranged to consider the vehicle being about to run off a road, cross a yellow line, run a stop sign and run a red stoplight as potential crash situations.

13. The control system of claim 10, wherein said warning system is at least one of an alarm, a light, a buzzer, an audible noise generator and a simulated rumble strip.

14. The control system of claim 8, wherein said processor is arranged to control the movement of the vehicle based on the data on vehicle motion and signals relating to the position of the vehicle.

15. The control system of claim 8, wherein said processor is arranged to control a display in the vehicle based on the data on vehicle motion and signals relating to the position of the vehicle.

16. The control system of claim 1, wherein a first one of said accelerometers is arranged to sense vehicle acceleration in a latitude direction, a second one of said accelerometers is arranged to sense vehicle acceleration in a longitudinal direction and a third one of said accelerometers is arranged to sense vehicle acceleration in a vertical direction.

17. The control system of claim 1, wherein a first one of said gyroscopes is arranged to sense angular rate about the pitch axis, a second one of said gyroscopes is arranged to sense angular rate about the yaw axis and a third one of said gyroscopes is arranged to sense angular rate about the roll axis.

18. A control system for controlling a warning system of a vehicle, comprising:
- an inertial reference unit including three accelerometers and three gyroscopes which provide data on vehicle motion;
- a GPS receiver arranged to receive positioning signals relating to the position of the vehicle;
- a processor coupled to said inertial reference unit and to said GPS receiver;
- a Kalman filter coupled to said processor for optimizing the data on vehicle motion from said inertial reference unit and the signals relating to the position of the vehicle from said GPS receiver; and
- a navigation system coupled to said processor and arranged to provide information about a roadway on which the vehicle is traveling from a map database to said processor,
- said processor being arranged to process the data on vehicle motion provided by said inertial reference unit, the signals relating to the position of the vehicle received by said GPS receiver and the roadway information provided by said navigation system and control the warning system to provide a warning to the driver upon detection of a potential crash situation.

19. The control system of claim 18, wherein said processor is structured and arranged to consider the vehicle being about to run off a road, cross a yellow line and run a stop sign as potential crash situations.

20. The control system of claim 18, further comprising a sensor for obtaining input on the color of an approaching stoplight, said processor being structured and arranged to consider the vehicle being about to run off a road, cross a yellow line, run a stop sign and run a red stoplight as potential crash situations.

21. The control system of claim 18, wherein said warning system is at least one of an alarm, a light, a buzzer, an audible noise generator and a simulated rumble strip.

22. The control system of claim 18, wherein said processor is arranged to control the movement of the vehicle based on the data on vehicle motion provided by said inertial reference unit and signals relating to the position of the vehicle received by said GPS receiver.

23. The control system of claim 18, wherein said processor is arranged to control a display in the vehicle based on the data on vehicle motion provided by said inertial reference unit and signals relating to the position of the vehicle received by said GPS receiver.

24. The control system of claim 18, wherein a first one of said accelerometers is arranged to sense vehicle acceleration in a latitude direction, a second one of said accelerometers is arranged to sense vehicle acceleration in a longitudinal direction and a third one of said accelerometers is arranged to sense vehicle acceleration in a vertical direction.

25. The control system of claim 18, wherein a first one of said gyroscopes is arranged to sense angular rate about the pitch axis, a second one of said gyroscopes is arranged to sense angular rate about the yaw axis and a third one of said gyroscopes is arranged to sense angular rate about the roll axis.

26. A method for controlling a warning system a vehicle, comprising the steps of:
- arranging an inertial reference unit including three accelerometers and three gyroscopes on the vehicle;
- obtaining data on vehicle motion from the inertial reference unit;
- arranging a navigation system on the vehicle including a map database;
- obtaining information about a roadway on which the vehicle is traveling from the map database;
- controlling the warning system based on the data on vehicle motion obtained from the inertial reference unit and the roadway information obtained from the map database to provide a warning to the driver upon detection of a potential crash situation.

27. The method of claim 26, further comprising the step of utilizing a Kalman filter to optimize the data on vehicle motion from the inertial reference unit.

28. The method of claim 26, further comprising the step of determining whether the vehicle is about to run off a road, cross a yellow line and run a stop sign, the warning system being controlled in light of the determination.

29. The method of claim 26, further comprising the steps of:
- obtaining input on the color of an approaching stoplight; and
- determining whether the vehicle is about to run off a road, cross a yellow line, run a stop sign and run a red stoplight, the warning system being controlled in light of the determination.

30. The method of claim 26, further comprising the steps of:
- arranging a GPS receiver on the vehicle to receive positioning signals relating to the position of the vehicle; and
- controlling the warning system based on the data on vehicle motion from the inertial reference unit and signals relating to the position of the vehicle received by the GPS receiver.

31. The method of claim 30, further comprising the step of utilizing a Kalman filter to optimize the data on vehicle motion from the inertial reference unit and the signals relating to the position of the vehicle received by the GPS receiver.

32. A control system for controlling a vehicle display, comprising:
- an inertial reference unit including three accelerometers and three gyroscopes which provide data on vehicle motion;
- a processor coupled to said inertial reference unit and the display;
- a GPS receiver arranged to receive positioning signals relating to the position of the vehicle; and
- a navigation system coupled to said processor and arranged to provide information about a roadway on which the vehicle is traveling from a map database to said processor,
- said processor being arranged to process the data on vehicle motion provided by said inertial reference unit, the signals relating to the position of the vehicle received by said GPS receiver and the roadway information provided by said navigation system in order to ascertain potential crash situations and control the display to provide an indication to the driver of the status of the vehicle upon detection of a potential crash situation.

33. The control system of claim 32, wherein said processor is structured and arranged to consider the vehicle being about to run off a road, cross a yellow line and run a stop sign as potential crash situations.

34. The control system of claim 32, further comprising a sensor for obtaining input on the color of an approaching stoplight, said processor being structured and arranged to consider the vehicle being about to run off a road, cross a yellow line, run a stop sign and run a red stoplight as potential crash situations.

35. A control system for controlling a vehicle component which affects the movement of the vehicle, comprising:
   an inertial reference unit including three accelerometers and three gyroscopes which provide data on vehicle motion;
   a processor coupled to said inertial reference unit and the component;
   a GPS receiver arranged to receive positioning signals relating to the position of the vehicle; and
   a navigation system coupled to said processor and arranged to provide information about a roadway on which the vehicle is traveling from a map database to said processor,
   said processor being arranged to process the data on vehicle motion provided by said inertial reference unit, the signals relating to the position of the vehicle received by said GPS receiver and the roadway information provided by said navigation system in order to ascertain potential crash situations and generates control signals to control the component upon detection of a potential crash situation.

36. The control system of claim 35, wherein said processor is structured and arranged to consider the vehicle being about to run off a road, cross a yellow line and run a stop sign as potential crash situations.

37. The control system of claim 35, further comprising a sensor for obtaining input on the color of an approaching stoplight, said processor being structured and arranged to consider the vehicle being about to run off a road, cross a yellow line, run a stop sign and run a red stoplight as potential crash situations.

* * * * *